US012809059B2

(12) United States Patent
Hart et al.

(10) Patent No.: US 12,809,059 B2
(45) Date of Patent: Nov. 24, 2026

(54) ARTICLE WITH A VARIABLE THICKNESS OPTICAL COATING ON PORTIONS OF A SUBSTRATE THAT PRESENT DIFFERENT SURFACE NORMALS

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 446 days.

(21) Appl. No.: 18/237,464

(22) Filed: Aug. 24, 2023

(65) Prior Publication Data

US 2024/0069246 A1 Feb. 29, 2024

Related U.S. Application Data

(60) Provisional application No. 63/529,884, filed on Jul. 31, 2023, provisional application No. 63/401,179, filed on Aug. 26, 2022.

(51) Int. Cl.
*G02B 1/11* (2015.01)
*G02B 1/115* (2015.01)

(52) U.S. Cl.
CPC ................ *G02B 1/11* (2013.01); *G02B 1/115* (2013.01)

(58) Field of Classification Search
CPC ................................. G02B 1/115; G02B 1/11
See application file for complete search history.

(56) References Cited

U.S. PATENT DOCUMENTS 4,483,700 A 11/1984 Forker et al.
5,674,790 A 10/1997 Araujo
(Continued)

FOREIGN PATENT DOCUMENTS

WO 2022/125846 A1 6/2022

OTHER PUBLICATIONS

Corning Inc., "Information Related to Coatings on Commercially Available Tablet Devices—Supplying data related to the Apple ipad Air 2 (released Oct. 2014), Apple ipad Pro 2nd Generation (released Jun. 2017), and Apple ipad Air 4th Generation (released Oct. 2020)" 28 pages. This document has not been published in a book, magazine, journal, etc.
(Continued)

*Primary Examiner* — Jia X Pan
(74) *Attorney, Agent, or Firm* — William J. Tucker

(57) ABSTRACT

An article is described herein that includes an optical coating on both a first portion and a second portion of a first major surface of a substrate. The first portion and the second portion face in different directions. The optical coating forms an anti-reflective surface, has a total thickness of less than 1000 nm, and is thicker over the first portion than over the second portion. The optical coating exhibits a first surface reflected color characterized by International Commission on Illumination ("CIE") L*a*b* color space values of: (i) a*, from −6.0 to +4.5, and (ii) b*, from −11.0 to +6.0 at all viewing angles within a range of from 0 degrees to 10 degrees relative to a normal of the first major surface at both (i) the first portion and (ii) the second portion where the total thickness of the optical coating is 75% to 90% of the maximum value of the total thickness.

21 Claims, 22 Drawing Sheets

(56) References Cited

U.S. PATENT DOCUMENTS

| | | | | |
|---|---|---|---|---|
| 7,666,511 | B2 | 2/2010 | Ellison et al. | |
| 8,312,739 | B2 | 11/2012 | Lee et al. | |
| 8,561,429 | B2 | 10/2013 | Allan et al. | |
| 10,802,179 | B2 | 10/2020 | Bellman et al. | |
| 10,948,629 | B2 | 3/2021 | Hart et al. | |
| 11,500,130 | B2 | 11/2022 | Hart et al. | |
| 11,567,237 | B2 | 1/2023 | Hart et al. | |
| 2013/0038834 | A1* | 2/2013 | Cado | G02C 7/104 351/159.62 |
| 2014/0113083 | A1 | 4/2014 | Lee et al. | |
| 2015/0322270 | A1* | 11/2015 | Amin | C03C 17/3435 428/141 |
| 2016/0003982 | A1* | 1/2016 | Avetisian | G02B 1/113 359/360 |
| 2018/0011225 | A1 | 1/2018 | Bellman et al. | |
| 2020/0126512 | A1 | 4/2020 | Amin et al. | |
| 2020/0158916 | A1 | 5/2020 | Hart et al. | |
| 2020/0408954 | A1 | 12/2020 | Koch, III et al. | |
| 2021/0122671 | A1* | 4/2021 | Hart | C03C 17/3441 |
| 2021/0286106 | A1* | 9/2021 | Kim | G02B 1/11 |
| 2022/0128737 | A1 | 4/2022 | Hart et al. | |
| 2023/0010461 | A1* | 1/2023 | Hart | G02B 5/0278 |
| 2023/0034541 | A1 | 2/2023 | Hart et al. | |
| 2023/0221467 | A1 | 7/2023 | Bellman et al. | |
| 2023/0244004 | A1 | 8/2023 | Amin et al. | |
| 2023/0273345 | A1* | 8/2023 | Amin | C03C 21/002 359/601 |
| 2023/0301002 | A1 | 9/2023 | Amin et al. | |
| 2023/0359074 | A1* | 11/2023 | Amin | G02B 1/115 |
| 2024/0036236 | A1 | 2/2024 | Fahey et al. | |
| 2024/0191099 | A1 | 6/2024 | Adib et al. | |

OTHER PUBLICATIONS

Charles Kittel, "Introduction to Solid State Physics", seventh edition, John Wiley & Sons, Inc., NY, 1996, pp. 611-627.
James F. Shackelford, "Introduction to Materials Science for Engineers", Sixth Edition, Pearson Prentice Hall, New Jersey, 2005, pp. 404-418.
Oliver, W.C., et al., "An improved technique for determining hardness and elastic modulus using load and displacement sensing indentation experiments", J. Mater. Res., vol. 7, No. 6, 1992, pp. 1564-1583.
Oliver, W.C., et al., "Measurement of Hardness and Elastic Modulus by Instrument Indentation: Advances in Understanding and Refinements to Methodology", J. Mater. Res., vol. 19, No. 1, 2004, pp. 3-20.
Smart and Moore, "Solid State Chemistry, An Introduction", Chapman & Hall University and Professional Division, London, 1992, pp. 136-151.
PCT/ISA/206; PCT/US2023/031004; dated Dec. 20, 2023; 10 pages; European Patent Office.
Oliver, "An improved technique for determining hardness and elastic modulus using load and displacement sensing indentation experiments", Journal of materials research 7.6 (1992), pp. 1564-1583.
U.S. Appl. No. 63/169,376, titled "Transparent Glass-Ceramic Articles and Display Devices With the Same", filed Apr. 1, 2021.

* cited by examiner

ARTICLE WITH A VARIABLE THICKNESS OPTICAL COATING ON PORTIONS OF A SUBSTRATE THAT PRESENT DIFFERENT SURFACE NORMALS

CROSS-REFERENCE TO RELATED APPLICATIONS

This application claims the benefit of priority under 35 U.S.C. § 119 of U.S. Provisional Application No. 63/529,884 filed Jul. 31, 2023 and claims the benefit of priority under 35 U.S.C. § 119 of U.S. Provisional Application No. 63/401,179 filed Aug. 26, 2022, the content of which is incorporated herein by reference in its entirety.

FIELD OF THE DISCLOSURE

This disclosure generally relates to an article with a substrate having portions that face in different directions, such as a planar portion and a curved or faceted portion disposed adjacent to the planar portion, and an optical coating disposed on both portions that varies in thickness as function of position. Despite the differently facing portions of the substrate and variable thickness of the optical coating, the article exhibits substantially constant reflected color, and low reflectance with high transmittance across visible to infrared wavelength ranges.

BACKGROUND

A substrate that is relatively transparent to a desired wavelength range of electromagnetic radiation is sometimes utilized to separate a person or other sensor of the electromagnetic radiation from a source of the electromagnetic radiation. For example, devices with a visual display as the source of electromagnetic radiation sometimes incorporate a substrate relatively transparent to visible electromagnetic radiation disposed between the visual display and the person viewing the display. The substrate protects the visual display from potential damage. Such devices include smart phones, audio players, computer tablets, automotive dashboard displays, and smart watches, just to list a few. As another example, buildings and vehicles sometimes incorporate a substrate relatively transparent to visible electromagnetic radiation disposed between an interior of the building or vehicle and an external environment. The substrate protects the interior of the building or vehicle from potential damage that the external environment might cause. Another example includes a device with a sensor to detect electromagnetic radiation in the visible or infrared range, or both. Such a device can include a substrate relatively transparent to the electromagnetic radiation in the visible and/or infrared ranges disposed between the source of the electromagnetic radiation and the sensor, to protect the sensor and associated electronics.

Such substrates sometimes include an optical coating applied over the substrate to produce an article that has improved scratch resistance, improved abrasion resistance, improved transmittance of the desired wavelength range of electromagnetic radiation, improved reflection characteristics, or combinations thereof, relative to the substrates alone.

Such substrates sometimes include an external surface with a primary portion that is planar and then a curved or faceted portion disposed adjacent to the primary portion, such as along an edge of the substrate. A faceted portion presents a surface normal that is different that a surface normal that the primary portion of the substrate presents (e.g. the faceted portion and the primary portion face in different directions), while a curved portion presents a surface normal that varies as a function of position along the curved portion but in any event is different than the surface normal that the primary portion of the substrate presents. For example, the external surface of the substrate can include non-planar portions, in addition to substantially planar portions, or may be entirely non-planar.

An optical coating is typically applied on to an external surface of a substrate via a commercial coating process, such as sputtering, thermal evaporation, chemical vapor deposition ("CVD"), plasma-enhanced chemical vapor deposition ("PECVD"), and the like. These commercial coating processes rely upon a "line-of-sight" to depose the optical coating onto the external surface of the substrate. The thickness of the optical coating applied using such commercial coating processes depends on the angle of the external surface of the substrate relative to the source of the material being deposited. As a consequence, the optical coating applied onto the substrate tends to be thinner at curved or faceted portions of the external surface of the substrate than at primary, planar, portion of the external surface of the substrate. In other words, the coating process utilized to deposit the optical coating upon the substrate generates an optical coating with a thickness that varies as a function of position upon the external surface of the substrate.

However, there is a problem in that an optical coating with such a variable thickness causes the article with the optical coating upon the substrate to exhibit optical properties, such as color, reflectance, and transmittance, that changes as a function of surface angle, viewing angle, and local thickness of the optical coating. Color change, for example, can cause the user of the article to believe that the article is of low quality, and may negatively impact functional and aesthetic requirements of the article. In addition, there is a problem in that the optical coating may not adequately transmit both visible and infrared electromagnetic radiation.

SUMMARY

The present disclosure addresses the aforementioned problems, and other problems, by disclosing an article which in one exemplary embodiment has an optical coating over a planar portion and curved or faceted portion of a substrate that includes alternating layers of a low refractive index material and a high refractive index material, and a total thickness of the optical coating that is within a range of from 320 nm to 1000 nm. The layer of high refractive index material disposed furthest from the substrate has a thickness that is greater than or equal to 100 nm. High refractive index material makes up at least 40% of the top 250 nm of the optical coating. In some instances, the layer of low refractive index material that is disposed closest to the substrate has a thickness within a range of from 150 nm to 250 nm.

An article in accordance with the present disclosure with the optical coating disposed on the substrate exhibits a low perceived change in reflected color as a function of viewing angle and change in thickness of the optical coating as a function of position on the external surface of the substrate. In addition, the article with the optical coating disposed on the substrate exhibits low reflectance and high transmittance over a wide range of electromagnetic radiation (including wavelengths from the visible spectrum well into the infrared region) as a function of a wide range of incidence angles and change in thickness of the optical coating as a function of position on the external surface of the substrate. Finally, the optical coating imparts a high hardness to the article.

The optical coating herein described is relatively thin and incorporates relatively few layers. Thus, the optical coating is relatively inexpensive to produce. Further, because the optical coating is relatively thin, the optical coating appears to have a uniform thickness the across the entire substrate. Thus, the optical coating is superior to other optical coatings that are thicker and exhibit less optimal color, reflectance, and transmittance attributes.

According to a first aspect of the present disclosure, an article comprises (1) a substrate comprising a first major surface, the first major surface comprising a first portion and a second portion, wherein a first direction that is normal to the first portion of the first major surface is not the same as a second direction that is normal to the second portion of the first major surface; and (2) an optical coating disposed on both the first portion and the second portion of the first major surface, the optical coating forming an anti-reflective surface and comprising a total thickness, wherein (a) the total thickness of the optical coating (i) measured in the first direction normal to the first portion is less than 1000 nm, (ii) has a maximum value at the first portion, and (iii) measured in the second direction normal to the second portion is less than the maximum value measured in the first direction normal to the first portion; and (b) the optical coating disposed on the substrate exhibits a first surface reflected color characterized by International Commission on Illumination ("CIE") L*a*b* color space values of: (i) a*, from −6.0 to +4.5, and (ii) b*, from −11.0 to +6.0, under illumination from CIE standard illuminant D65, at all viewing angles within a range of from 0 degrees to 10 degrees relative to a normal of the first major surface at both (i) the first portion and (ii) the second portion where the total thickness of the optical coating is within a range of from 75% to 90% of the maximum value of the total thickness.

According to a second aspect of the present disclosure, the article of the first aspect is presented, wherein the optical coating disposed on the substrate exhibits a first surface reflected color characterized by International Commission on Illumination ("CIE") L*a*b* color space values of: (i) a*, from −6.0 to +6.0, and (ii) b*, from −12.0 to +7.5, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 75% to 90% of the maximum value of the total thickness.

According to a third aspect of the present disclosure, the article of the first aspect is presented, wherein the optical coating disposed on the substrate exhibits a first surface reflected color characterized by International Commission on Illumination ("CIE") L*a*b* color space values of: (i) a*, from −6.0 to +2.0, and (ii) b*, from −12.0 to +4.0, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 75% to 90% of the maximum value of the total thickness.

According to a fourth aspect of the present disclosure, the article of any one of the first through third aspects is presented, wherein (i) the article at the optical coating exhibits a first surface average photopic reflectance within a range of from 0.30% to 1.60% for any incidence angle within a range of from 0 degrees to 30 degrees relative to a normal of the first major surface at both (i) the first portion and (ii) the second portion where the total thickness of the optical coating is within a range of from 75% to 90% of the maximum value of the total thickness; and (ii) the article at the optical coating exhibits a first surface average photopic reflectance within a range of from 0.30% to 2.80% for any incidence angle within a range of from 0 degrees to 45 degrees relative to a normal of the first major surface at both (i) the first portion and (ii) the second portion where the total thickness of the optical coating is within a range of from 75% to 90% of the maximum value of the total thickness.

According to a fifth aspect of the present disclosure, the article of any one of the first through fourth aspects is presented, wherein (i) the article at the optical coating exhibits a first surface average reflectance within a range of from 0.5% to 2.0% across an entire wavelength range of from 840 nm to 860 nm for an incidence angle within a range of from 0 degrees to 6 degrees relative to a normal of the first portion; and (ii) the article at the optical coating exhibits a first surface average reflectance within a range from 1.0% to 5.0% across an entire wavelength range of from 930 nm to 950 nm for an incidence angle within a range of from 0 degrees to 6 degrees relative to a normal of the first portion.

According to a sixth aspect of the present disclosure, the article of any one of the first through fifth aspects is presented, wherein the article at the optical coating exhibits, for an incidence angle within a range of from 0 degrees to 6 degrees relative to a normal of the first portion, a first surface reflectance of: (i) less than 1.0% across an entire wavelength range of from 625 nm to 820 nm; (ii) less than 1.5% across an entire wavelength range of from 540 nm to 870 nm; and (iii) less than 2.0% across an entire wavelength range of from 440 nm to 900 nm.

According to a seventh aspect of the present disclosure, the article of any one of the first through sixth aspects is presented, wherein the article at the optical coating exhibits a first surface average photopic reflectance within a range of from 0.70% to 1.50% for an incidence angle within a range of from 0 degrees to 6 degrees relative to a normal of the first portion.

According to an eighth aspect of the present disclosure, the article of any one of the first through seventh aspects is presented, wherein for an incidence angle normal to the first portion, the article through the optical coating exhibits (i) a two surface average photopic transmittance within a range of from 94.5% to 95.5%, (ii) a two surface transmittance within a range of from 94.5% to 95.9% across an entire wavelength range of from 840 nm to 860 nm, and (iii) a two surface transmittance within a range of from 93.0% to 95.0% across an entire wavelength range of from 930 nm to 950 nm.

According to a ninth aspect of the present disclosure, the article of any one of the first through eighth aspects is presented, wherein (i) the optical coating comprises six or less layers that comprise a repeating period of a layer of a low refractive index material and a layer of a high refractive index material; (ii) the layer of the high refractive index material of the optical coating disposed furthest from the substrate has a thickness over the first portion of the substrate that is greater than or equal to 100 nm; (iii) at least 50%, by thickness, of a 250 nm thick portion of the total thickness of the optical coating over the first portion that is disposed furthest from the substrate is high refractive index material; and (iv) the total thickness of the optical coating disposed over the first portion of the substrate is within a range of from 320 nm to 800 nm.

According to a tenth aspect of the present disclosure, the article of the ninth aspect is presented, wherein the layer of low refractive index material of the optical coating disposed closest to the substrate has a thickness over the first portion of the first major surface that is within a range of from 150 nm to 250 nm.

According to an eleventh aspect of the present disclosure, the article of any one of the ninth through tenth aspects is presented, wherein the thickness of the layer of high refractive index material disposed furthest from the substrate, over the first portion of the first major surface, is within a range of from 140 nm to 170 nm.

According to a twelfth aspect of the present disclosure, the article of any one of the first through eighth aspects is presented, wherein the optical coating comprises: (a) a first layer disposed on the substrate, the first layer comprising (i) low refractive index material and (ii) a thickness within a range of from 150 nm to 250 nm on the first portion of the substrate; (b) a second layer disposed on the first layer, the second layer comprising (i) high refractive index material and (ii) a thickness within a range of from 10 nm to 25 nm on the first portion of the substrate; (c) a third layer disposed on the second layer, the third layer comprising (i) low refractive index material and (ii) a thickness within a range of from 30 nm to 50 nm on the first portion of the substrate; (d) a fourth layer disposed on the third layer, the fourth layer comprising (i) high refractive index material and (ii) a thickness within a range of from 100 nm to 250 nm on the first portion of the substrate; and (e) a fifth layer disposed on the fourth layer, the fifth layer comprising (i) low refractive index material and (ii) a thickness within a range of from 60 nm to 150 nm on the first portion of the substrate; and further wherein, the thicknesses of each of the first layer through the fifth layer are less on the second portion of the substrate than on the first portion of the substrate.

According to a thirteenth aspect of the present disclosure, the article of the twelfth aspect is presented, wherein the thickness of the fourth layer on the first portion of the substrate is within a range of from 100 nm to 200 nm.

According to a fourteenth aspect of the present disclosure, the article of any one of the ninth through thirteenth aspects is presented, wherein (i) the low refractive index material has a refractive index within a range of from 1.44 to 1.55; (ii) the high refractive index material has a refractive index within a range of from 1.8 to 2.5; and (iii) the number of layers of the optical coating is six or less.

According to a fifteenth aspect of the present disclosure, the article of any one of the first through fourteenth aspects is presented, wherein the total thickness of the optical coating over the first portion of the first major surface of the substrate is within a range of from 320 nm to 700 nm.

According to a sixteenth aspect of the present disclosure, the article of any one of the first through fifteenth aspects is presented, wherein the total thickness of the optical coating over the first portion of the first major surface of the substrate is within a range of from 320 nm to 360 nm.

According to a seventeenth aspect of the present disclosure, the article of any one of the first through sixteenth aspects is presented, wherein (i) the substrate comprises a glass or glass-ceramic composition, and the substrate is chemically strengthened; (ii) the first portion of the first major surface of the substrate is substantially planar; and (iii) the second portion of the first major surface of the substrate is curved or faceted.

According to a seventeenth plus aspect of the present disclosure. The article of any one of first through seventeenth aspects is presented, wherein: the article at the optical coating exhibits a first surface photopic average reflectance less than 1.6% for an incidence angle within a range of from 0 degrees to 10 degrees relative to a normal of the first portion; the article at the optical coating exhibits a first surface average reflectance within a range of from 0.2% to 1.6% across an entire wavelength range of from 840 nm to 860 nm for an incidence angle within a range of from 0 degrees to 10 degrees relative to a normal of the first portion; and the article at the optical coating exhibits a first surface average reflectance within a range from 0.2% to 2.0% across an entire wavelength range of from 930 nm to 950 nm for an incidence angle within a range of from 0 degrees to 10 degrees relative to a normal of the first portion.

According to an eighteenth aspect of the present disclosure, the article of any one of the first through seventeenth aspects is presented, wherein the article is of a consumer electronic product, the consumer electronic product further comprising: (a) a housing comprising a back surface and side surfaces; and (b) electrical components at least partially housed within the housing, the electrical components comprising a controller, memory, a display, and a sensor, wherein (i) the article and the housing cooperate to separate the electrical components from an environment external to the consumer electronic product, (ii) the display is configured to transmit visible electromagnetic radiation through the article to the environment external to the consumer electronic product, and (iii) the sensor is configured to detect electromagnetic radiation having a wavelength within a range of from 800 nm to 1000 nm that transmits through the article from the environment external to the sensor.

According to a nineteenth aspect of the present disclosure, an article comprises: (1) a substrate comprising a first major surface, the first major surface comprising a first portion and a second portion, wherein a first direction that is normal to the first portion is not the same as a second direction that is normal to the second portion; and (2) an optical coating disposed on both the first portion and the second portion of the first major surface, the optical coating forming an anti-reflective surface and comprising: (a) a number of layers that comprise a repeating period of a layer of a low refractive index material and a layer of a high refractive index material, wherein (i) the layer of the high refractive index material disposed furthest from the substrate has a thickness over the first portion of the first major surface that is greater than or equal to 100 nm and (ii) at least 40%, by thickness, of a 250 nm thick portion of the total thickness of the optical coating over the first portion that is disposed furthest from the substrate is high refractive index material; and (b) a total thickness (i) measured in the first direction normal to the first portion that is within a range of from 320 nm to 1000 nm, (ii) that has a maximum value at the first portion, and (iii) measured in the second direction normal to the second portion that is less than the maximum value measured in the first direction normal to the first portion.

According to a twentieth aspect of the present disclosure, the article of the nineteenth aspect is presented, wherein the optical coating disposed on the substrate exhibits a first surface reflected color characterized by International Commission on Illumination ("CIE") L*a*b* color space values of: (i) a*, from −6.0 to +6.0, and (ii) b*, from −12.0 to +7.5, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 75% to 90% of the maximum value of the total thickness.

According to a twenty-first aspect of the present disclosure, the article of any one of the nineteenth through twentieth aspects is presented, wherein the optical coating disposed on the substrate exhibits a first surface reflected color characterized by International Commission on Illumination ("CIE") L*a*b* color space values of: (i) a*, from −6.0 to +4.5, and (ii) b*, from −11.0 to +6.0, under illumination from CIE standard illuminant D65, at all viewing angles within a range of from 0 degrees to 10 degrees relative to a normal of the first major surface at both (i) the first portion and (ii) the second portion where the total thickness of the optical coating is within a range of from 75% to 90% of the maximum value of the total thickness.

According to a twenty-second aspect of the present disclosure, the article of any one of the nineteenth through twenty-first aspects is presented, wherein (i) the article at the optical coating exhibits a first surface average photopic reflectance within a range of from 0.30% to 1.60% at any incidence angle within a range of from 0 degrees to 30 degrees relative to a normal of the first major surface at both (i) the first portion and (ii) the second portion where the total thickness of the optical coating is within a range of from 75% to 90% of the maximum value of the total thickness; and (ii) the article at the optical coating exhibits a first surface average photopic reflectance within a range of from 0.30% to 2.80% for any incidence angle within a range of from 0 degrees to 45 degrees relative to a normal of the first major surface at both (i) the first portion and (ii) the second portion where the total thickness of the optical coating is within a range of from 75% to 90% of the maximum value of the total thickness.

According to a twenty-third aspect of the present disclosure, the article of any one of the nineteenth through twenty-second aspects is presented, wherein the article at the optical coating exhibits a first surface average photopic reflectance within a range of from 0.70% to 1.50% for an incidence angle within a range of from 0 degrees to 6 degrees relative to a normal of the first portion.

According to a twenty-fourth aspect of the present disclosure, the article of any one of the nineteenth through twenty-third aspects is presented, wherein (i) the article at the optical coating exhibits a first surface average reflectance within a range of from 0.5% to 2.0% across an entire wavelength range of from 840 nm to 860 nm for an incidence angle within a range of from 0 degrees to 6 degrees relative to a normal of the first portion; and (ii) the article at the optical coating exhibits a first surface average reflectance within a range from 1.0% to 5.0% across an entire wavelength range of from 930 nm to 950 nm for an incidence angle within a range of from 0 degrees to 6 degrees relative to a normal of the first portion.

According to a twenty-fifth aspect of the present disclosure, the article of any one of the nineteenth through twenty-fourth aspects is presented, wherein for an incidence angle normal to the first portion, the article through the optical coating exhibits (i) a two surface average photopic transmittance within a range of from 94.5% to 95.5%, (ii) a two surface transmittance within a range of from 94.5% to 95.9% across an entire wavelength range of from 840 nm to 860 nm, and (iii) a two surface transmittance within a range of from 93.0% to 95.0% across an entire wavelength range of from 930 nm to 950 nm.

According to a twenty-sixth aspect of the present disclosure, the article of any one of the nineteenth through twenty-fifth aspects is presented, wherein the article at the optical coating exhibits, for an incidence angle within a range of from 0 degrees to 6 degrees relative to a normal of the first portion, a first surface reflectance of: (i) less than 1.0% across an entire wavelength range of from 625 nm to 820 nm; (ii) less than 1.5% across an entire wavelength range of from 540 nm to 870 nm; and (iii) less than 2.0% across an entire wavelength range of from 440 nm to 900 nm.

According to a twenty-seventh aspect of the present disclosure, the article of any one of the nineteenth through twenty-sixth aspects is presented, wherein the layers of the optical coating comprise: (a) a first layer disposed on the substrate, the first layer comprising (i) low refractive index material and (ii) a thickness within a range of from 150 nm to 250 nm on the first portion of the substrate; (b) a second layer disposed on the first layer, the second layer comprising (i) high refractive index material and (ii) a thickness within a range of from 10 nm to 25 nm on the first portion of the substrate; (c) a third layer disposed on the second layer, the third layer comprising (i) low refractive index material and (ii) a thickness within a range of from 30 nm to 50 nm on the first portion of the substrate; (d) a fourth layer disposed on the third layer, the fourth layer comprising (i) high refractive index material and (ii) a thickness within a range of from 100 nm to 250 nm on the first portion of the substrate; and (e) a fifth layer disposed on the fourth layer, the fifth layer comprising (i) low refractive index material and (ii) a thickness within a range of from 60 nm to 150 nm on the first portion of the substrate; and further wherein, the thicknesses of each of the first layer through the fifth layer are each less on the second portion of the substrate than on the first portion of the substrate.

According to a twenty-eighth aspect of the present disclosure, the article of the twenty-sixth seventh is presented, wherein the thickness of the fourth layer on the first portion of the substrate is within a range of from 100 nm to 200 nm.

According to a twenty-ninth aspect of the present disclosure, the article of any one of the nineteenth through twenty-sixth aspects is presented, wherein the layer of low refractive index material of the optical coating disposed closest to the substrate has a thickness over the first portion of the first major surface that is within a range of from 150 nm to 250 nm.

According to a thirtieth aspect of the present disclosure, the article of any one of the nineteenth through twenty-sixth aspects is presented, wherein the layer of low refractive index material of the optical coating disposed closest to the substrate has a thickness over the first portion of the first major surface that is within a range of from 180 nm to 250 nm.

According to a thirty-first aspect of the present disclosure, the article of any one of the nineteenth through twenty-sixth aspects is presented, wherein the layer of low refractive index material of the optical coating disposed closest to the substrate has a thickness over the first portion of the first major surface that is within a range of from 200 nm to 250 nm.

According to a thirty-second aspect of the present disclosure, the article of any one of the nineteenth through thirty-first aspects are presented, wherein the total thickness of the optical coating over the first portion of the first major surface of the substrate is less than or equal to 600 nm.

According to a thirty-third aspect of the present disclosure, the article of any one of the nineteenth through thirty-second aspects are presented, wherein the total thickness of the optical coating over the first portion of the first major surface of the substrate is within a range of from 500 nm to 600 nm.

According to a thirty-fourth aspect of the present disclosure, the article of any one of the nineteenth through thirty-third aspects are presented, wherein the total thickness of the optical coating over the first portion of the first major surface of the substrate is within a range of from 500 nm to 550 nm.

According to a thirty-fifth aspect of the present disclosure, the article of any one of the nineteenth through twenty-sixth aspects is presented, wherein the total thickness of the optical coating over the first portion of the first major surface of the substrate is within a range of from 320 nm to 360 nm.

According to a thirty-sixth aspect of the present disclosure, the article of any one of the nineteenth through thirty-fifth aspects is presented, wherein the thicknesses of the layers of the high refractive index material over the first portion of the first major surface of the substrate comprises a percentage of the total thickness of the optical coating over the first portion of the first major surface of the substrate, and the percentage is within a range of from 28% to 35%.

According to a thirty-seventh aspect of the present disclosure, the article of any one of the nineteenth through thirty-sixth aspects is presented, wherein the thickness of the layer of high refractive index material disposed furthest from the substrate, over the first portion of the first major surface, is within a range of from 140 nm to 170 nm.

According to a thirty-eighth aspect of the present disclosure, the article of any one of the nineteenth through thirty-seventh aspects is presented, wherein the thickness of the layer of high refractive index material disposed furthest from the substrate, over the first portion of the first major surface, is within a range of from 145 nm to 155 nm.

According to a thirty-ninth aspect of the present disclosure, the article of any one the nineteenth through thirty-eighth aspects is presented, wherein at least 55%, by thickness, of a 250 nm thick portion of the total thickness of the optical coating over the first portion that is disposed furthest from the substrate is high refractive index material.

According to a fortieth aspect of the present disclosure, the article of any one of the nineteenth through thirty-ninth aspects are presented, wherein (i) the first portion of the first major surface of the substrate is substantially planar; and (ii) the second portion of the first major surface of the substrate is curved or faceted.

According to a forty-first aspect of the present disclosure, the article of any one of the nineteenth through fortieth aspects is presented, wherein (i) the low refractive index material has a refractive index within a range of from 1.44 to 1.55; and (ii) the high refractive index material has a refractive index within a range of from 1.8 to 2.5.

According to a forty-second aspect of the present disclosure, the article of any one of the nineteenth through forty-first aspects is presented, wherein (i) the low refractive index material is $SiO_2$ or doped $SiO_2$, and (ii) the high refractive index material is $SiN_x$ or $SiO_xN_y$.

According to a forty-third aspect of the present disclosure, the article of any one of the nineteenth through forty-second aspects is presented, wherein the number of layers of the optical coating is six or less.

According to a forty-fourth aspect of the present disclosure, the article of any one of the nineteenth through forty-third aspects further comprises a fluorinated silane layer disposed on the optical coating, the fluorinated silane layer comprising (i) a refractive index within a range of from 1.4 to 1.5 and (ii) a thickness within a range of from 1 nm to 10 nm.

According to a forty-fifth aspect of the present disclosure, the article of any one of the nineteenth through forty-fourth aspects is presented, wherein the substrate comprises a glass or glass-ceramic composition, and the substrate is chemically strengthened.

According to a forty-sixth aspect of the present disclosure, the article of any one of the nineteenth through forty-fifth aspects is presented, wherein he substrate comprises an aluminosilicate glass composition.

According to a forty-seventh aspect of the present disclosure, the article of any one of the nineteenth through forty-sixth aspects is presented, wherein the article is of a consumer electronic product, the consumer electronic product further comprising: (a) a housing comprising a back surface and side surfaces; and (b) electrical components at least partially housed within the housing, the electrical components comprising a controller, memory, a display, and a sensor, wherein (i) the article and the housing cooperate to separate the electrical components from an environment external to the consumer electronic product, (ii) the display is configured to transmit visible electromagnetic radiation through the article to the environment external to the consumer electronic product, and (iii) the sensor is configured to detect electromagnetic radiation having a wavelength within a range of from 800 nm to 1000 nm that transmits through the article from the environment external to the sensor.

According to a forty-eighth aspect of the present disclosure, any one of the nineteenth through forty-seventh aspects are presented, wherein the article at the optical coating exhibits a maximum hardness within in a range of from 8.5 GPa to 15 GPa.

According to a forty-ninth aspect of the present disclosure, an article comprises: (1) a substrate comprising a first major surface, the first major surface comprising a first portion and a second portion, wherein a first direction that is normal to the first portion of the first major surface is not the same as a second direction that is normal to the second portion of the first major surface; and (2) an optical coating disposed on both the first portion and the second portion of the first major surface, the optical coating forming an anti-reflective surface and comprising a total thickness, wherein (a) the total thickness of the optical coating (i) measured in the first direction normal to the first portion is less than or equal to 800 nm, (ii) has a maximum value at the first portion, and (iii) measured in the second direction normal to the second portion is less than the maximum value measured in the first direction normal to the first portion; (b) the article at the optical coating exhibits a first surface average reflectance within a range of from 0.5% to 2.0% across an entire wavelength range of from 840 nm to 860 nm for an incidence angle within a range of from 0 degrees to 6 degrees relative to a normal of the first portion; and (c) the article at the optical coating exhibits a first surface average reflectance within a range from 1.0% to 5.0% across an entire wavelength range of from 930 nm to 950 nm for an incidence angle within a range of from 0 degrees and 6 degrees relative to a normal of the first portion; wherein, the article at the optical coating exhibits a maximum hardness within in a range of from 8.5 GPa to 15 GPa.

A fiftieth aspect. The article of Aspect 49, wherein the article at the optical coating exhibits a first surface reflectance of less than 1.25% for an incidence angle within a range of from 0 degrees to 10 degrees relative to a normal of the first portion, for all wavelengths across an entire wavelength range of at least from 430 nm to 900 nm.

According to a fifty first aspect of the present disclosure, an article comprising: a substrate comprising a first major surface, the first major surface comprising a first portion and a second portion, wherein a first direction that is normal to the first portion of the first major surface is not the same as a second direction that is normal to the second portion of the first major surface; and an optical coating disposed on both the first portion and the second portion of the first major surface, the optical coating forming an anti-reflective surface and comprising a total thickness, wherein the total thickness of the optical coating (i) measured in the first direction normal to the first portion is less than or equal to 800 nm, (ii) has a maximum value at the first portion, and (iii) measured in the second direction normal to the second portion is less than the maximum value measured in the first direction normal to the first portion; the article at the optical coating exhibits a first surface photopic average reflectance less than 1.6% for an incidence angle within a range of from 0 degrees to 10 degrees relative to a normal of the first portion; and the article at the optical coating exhibits a first surface average reflectance within a range of from 0.2% to 1.6% across an entire wavelength range of from 840 nm to 860 nm for an incidence angle within a range of from 0 degrees to 10 degrees relative to a normal of the first portion; and the article at the optical coating exhibits a first surface average reflectance within a range from 0.2% to 2.0% across an entire wavelength range of from 930 nm to 950 nm for an incidence angle within a range of from 0 degrees to 10 degrees relative to a normal of the first portion; wherein, the article at the optical coating exhibits a maximum hardness within in a range of from 8.5 GPa to 15 GPa.

Fifty second aspect. The article of Aspect 51, wherein the total thickness of the optical coating measured in the first direction normal to the first portion is less than or equal to 600 nm, and the article at the optical coating exhibits a first surface photopic average reflectance less than 1.2% for an incidence angle within a range of from 0 degrees to 10 degrees relative to a normal of the first portion.

Fifty third aspect. The article of any one of Aspects 51-52, wherein the optical coating disposed on the substrate exhibits a first surface reflected color characterized by International Commission on Illumination ("CIE") L*a*b* color space values of: (i) a*, from −4.0 to +4.0, and (ii) b*, from −4.0 to +4.0, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 70% to 95% of the maximum value of the total thickness.

Fifty fourth aspect. The article of any one of Aspects 51-53, wherein the optical coating disposed on the substrate exhibits a first surface reflected color characterized by International Commission on Illumination ("CIE") L*a*b* color space values of: (i) a*, from −4.0 to +4.0, and (ii) b*, from −4.0 to +4.0, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 70% to 80% of the maximum value of the total thickness.

Fifty fifth aspect. The article of any one of Aspects 51-54, wherein the article at the optical coating exhibits a first surface reflectance of less than 1.25% for an incidence angle within a range of from 0 degrees to 10 degrees relative to a normal of the first portion, for all wavelengths across an entire wavelength range of at least from 430 nm to 900 nm.

DETAILED DESCRIPTION

Figure 1:
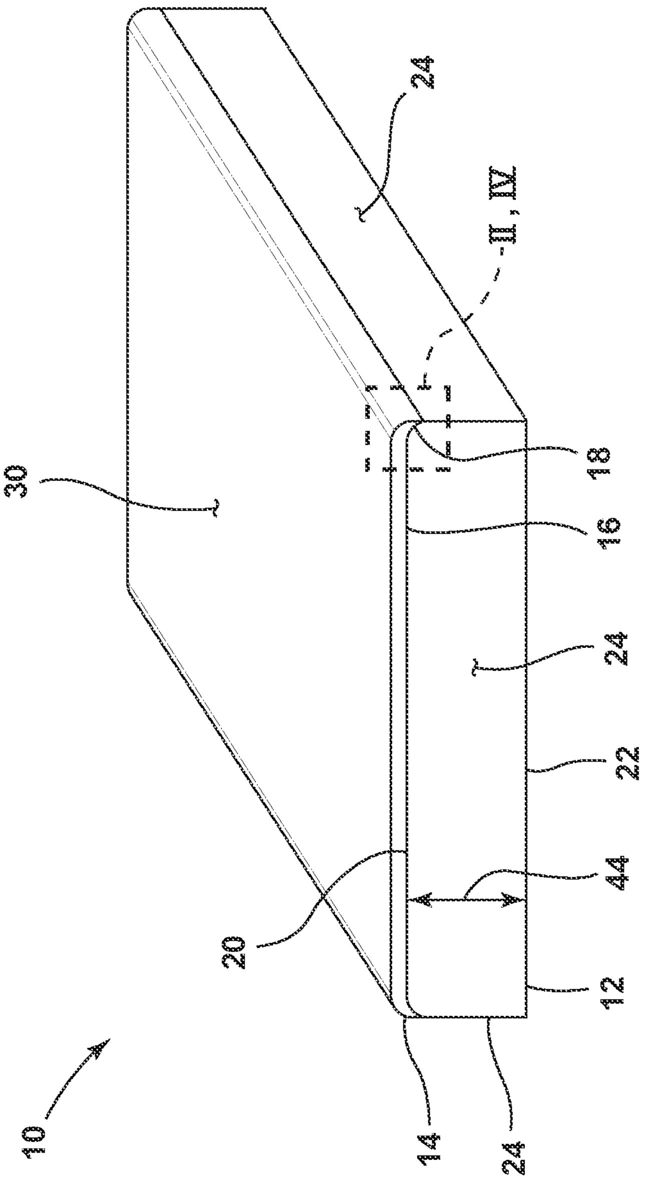
FIG. 1 is a perspective view of an article including a substrate, which includes a first portion that is substantially planar and a second portion that is curved and disposed along an edge of the substrate, and an optical coating disposed over both the first portion and the second portion of the substrate.
Figure 2:
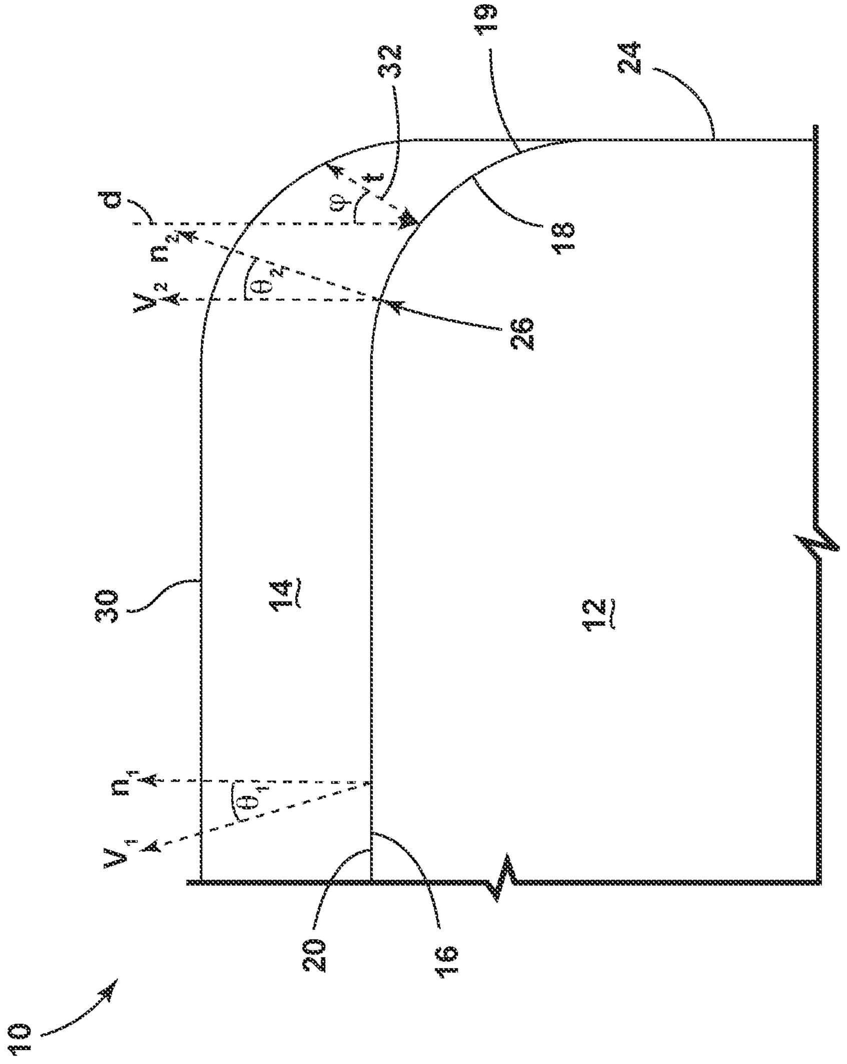
FIG. 2 is a close-up view of area II of FIG. 1, illustrating that the optical coating is deposited on the second portion (e.g., the curved or faceted portion) of the substrate at an angle φ that differs from the first portion (e.g., the planar portion) because the second portion is not perpendicular to the "line-of-sight" of the deposition process.

Referring now to FIGS. 1 and 2, an article 10 is depicted which includes a substrate 12 and an optical coating 14 disposed on the substrate 12. The substrate 12 includes a first portion 16 and a second portion 18. The optical coating 14 is disposed on both the first portion 16 and the second portion 18 of the substrate 12. In embodiments, the first portion 16 is substantially planar. In embodiments, the second portion 18 is curved (as illustrated) or faceted. "Faceted" means that the second portion 18 is locally planar but faces in a different direction than the first portion 16 (e.g., is angled relative to the first portion 16). In embodiments the second portion 18 is disposed along an edge 19 of the substrate 12. As used herein, the term "dispose," and any derivative thereof, includes coating, depositing, and/or forming a material onto a surface using any known method in the art. The disposed material may constitute a layer. The phrase "disposed on" includes the instance of forming a material onto a surface such that the material is in direct contact with the surface and also includes the instance where the material is formed on a surface, with one or more intervening material(s) between the disposed material and the surface.

In embodiments, the substrate 12 includes a first major surface 20 and a second major surface 22 that faces in a generally opposite direction as the first major surface 20, as well as minor surfaces 24 that face in generally opposite directions with respect to one another. In the embodiments illustrated at FIG. 1, the optical coating 14 is disposed on the first major surface 20 of the substrate 12. However, in other embodiments, the optical coating 14 is disposed on the second major surface 22 and/or one or more of the minor surfaces 24 of the substrate 12, in addition to or instead of being disposed on the first major surface 20 of the substrate 12. The first portion 16 and the second portion 18 are disposed at the first major surface 20.

As mentioned, the second portion 18 in embodiments includes a curved geometry, as FIG. 2 illustrates. In such instances, the second portion 18 is not geometrically flat in shape. The degree of curvature of the second portion 18 may vary. For example, embodiments of the second portion 18 may have a curvature measured by an approximate radius of about 1 mm to several meters (i.e., nearly planar), such as from about 3 mm to about 30 mm, or from about 5 mm to about 10 mm.

As mentioned, in embodiments, the first portion 16 of the substrate 12 is substantially planar. For example, the first portion 16 of a touch screen for a portable electronic device may be substantially planar at or near its center, while the second portion 18 is curved of faceted around its edges 19. Examples of such substrates 12 where the section portion 18 is curved include the cover glass from an Apple iPhone 6 smartphone or a Samsung Galaxy S6 Edge smartphone. While some embodiments of the substrate 12 with the first portion 16 and the second portion 18 are depicted as planar and curved, respectively, it should be understood that the substrate 12 may take on a wide variety of shapes, such as curved sheets, faceted sheets, sheets with angular surfaces, or even tubular sheets. The first portion 16 of the substrate 12 and the second portion 18 of the substrate 12 are not flat relative to each other. For example, the first portion 16 and the second portion 18 do not form a common plane.

In embodiments, as mentioned, the second portion 18 of the substrate 12 is curved or faceted in shape. A first direction $n_1$ is normal to the first portion 16 of the first major surface 20 and a second direction $n_2$ is normal to the second portion 18 at a first position 26 of the first major surface 20. The direction $n_1$ normal to the first portion 16 and the direction $n_2$ normal to the second portion 18 at the first position 26 are not the same (e.g., are different). It should be understood that, in embodiments where the second portion 18 is curved, the direction $n_2$, and numerous other directions $n_x$ (where x>2) etc., may be normal to the second portion 18 and differ from the direction $n_1$, i.e., the direction that is normal to the first portion 16 and from each other. In embodiments, the angular difference between $n_1$ and $n_2$ may be at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 70 degrees, at least about 80 degrees, at least about 90 degrees, at least about 120 degrees, at least about 150 degrees, or even at least about 180 degrees (e.g., the angle between $n_1$ and $n_2$ may be 180 degrees when the substrate 12 has a tubular shape). For example, the angular difference between $n_1$ and $n_2$ may be in a range from about 10 degrees to about 30 degrees, from about 10 degrees to about 45 degrees, from about 10 degrees to about 60 degrees, from about 10 degrees to about 75 degrees, from about 10 degrees to about 90 degrees, from about 10 degrees to about 120 degrees, from about 10 degrees to about 150 degrees, or from about 10 degrees to about 180 degrees. In additional embodiments, the angular difference between $n_1$ and $n_2$ may be in a range from about 10 degrees to about 80 degrees, from about 20 degrees to about 80 degrees, from about 30 degrees to about 80 degrees, from about 40 degrees to about 80 degrees, from about 50 degrees to about 80 degrees, from about 60 degrees to about 80 degrees, from about 70 degrees to about 80 degrees, from about 20 degrees to about 180 degrees, from about 30 degrees to about 180 degrees, from about 40 degrees to about 180 degrees, from about 50 degrees to about 180 degrees, from about 60 degrees to about 180 degrees, from about 70 degrees to about 150 degrees, or from about 80 degrees to about 180 degrees.

Electromagnetic radiation (e.g., visible, infrared, etc.) transmitted through or reflected by the article 10 may be measured in a viewing direction v (e.g., $v_1$ for $n_1$, $v_2$ for $n_2$, etc.), as FIG. 2 illustrates, which may be non-normal to the first major surface 20 of the substrate 12. Examples of such measurements include, and as will be explained herein, reflected color, transmitted color, average light reflectance, average light transmission, average photopic reflectance, and average photopic transmission. The viewing direction v defines an incident illumination angle θ, which is the angle between the direction n normal to the reference position on the first major surface 20 of the substrate 12 and the viewing direction v (e.g., $\theta_1$ is the incident illumination angle between normal direction $n_1$ and viewing direction $v_1$, and $\theta_2$ is the incident illumination angle between normal direction $n_2$ and viewing direction $v_2$, etc.). It should be understood that while FIG. 2 illustrates incident illumination angles that are not equal to 0 degrees, in some embodiments, the incident illumination angle may be equal to about 0 degrees such that the v is equal to n. Optical properties of a portion of the article 10 may be different when varying the incident illumination angle θ.

The optical coating 14 forms an anti-reflective surface 30. In embodiments, the anti-reflective surface 30 forms an air interface and generally defines the edge of the optical coating 14 as well as the edge of the article 10.

The optical coating 14 has a total thickness 32 (*t*), and the total thickness 32 varies as a function of position on the article 10 due to the difference in the direction $n_1$ normal to the first portion 16 and the direction(s) $n_2$ ($n_x$) normal to the second portion 18 of the substrate 12. Still referring to FIG. 2, in some embodiments, the total thickness 32 of the optical coating 14, as measured in the direction $n_1$ normal to the first major surface 20 of the substrate 12, may differ as a function of the position of the optical coating 14 disposed over the first portion 16 and the second portion 18 of the substrate 12. For example, the optical coating 14 may be deposited onto the substrate 12 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (PVD) (e.g., reactive or nonreactive sputtering or laser ablation), thermal or e-beam evaporation and/or atomic layer deposition. Liquid-based methods may also be used such as spraying, dipping, spin coating, or slot coating (for example, using sol-gel materials). In some embodiments, a PVD technique can be employed that relies on "metal-mode" reactive sputtering in which a thin metallic layer is deposited in one portion of a deposition chamber, and the film is reacted with gases such as oxygen or nitrogen in a different portion of the deposition chamber. In some embodiments, a PVD technique can be employed that relies on "in-line" reactive sputtering in which a material deposition and reaction occurs in the same section of the deposition chamber. Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. These deposition processes, particularly the PVD methods, may have a "line-of-sight" character in which deposited materials move in a uniform direction during deposition onto the substrate 12 regardless of the angle between the deposition direction and the angle normal to the first major surface 20 of the substrate 12.

Referring still to FIG. 2, arrow d shows a "line-of-sight" deposition direction. The deposition direction din FIG. 2 is normal to the second major surface 22 of the substrate 12, such as may be common in a system where the substrate 12 rests on the second major surface 22 during deposition of the optical coating 14. The arrow of line d points in the direction of the line-of-sight deposition. Line t, in addition to showing the total thickness 32 of the optical coating 14 at a position upon the first major surface 20 of the substrate 12, is measured in the direction normal to the first major surface 20 of the substrate 12 at that position. In other words, total thickness 32 of the optical coating 14, as measured in the direction normal to the first major surface 20, is represented by the length of line t. The deposition angle φ is defined as the angle between the deposition direction d and the direction normal to the first major surface 20 (i.e., line t) at that particular position along the first major surface 20 of the substrate 12. In embodiments, the total thickness 32 of the optical coating 14 measured in the direction normal $n_1$ to the first portion 16 is greater than the total thickness 32 of the optical coating 14 measured in the direction(s) normal $n_1$ ($n_x$) to the second portion 18 of the substrate 12. In embodiments, the total thickness 32 of the optical coating 14 measured in the direction(s) normal $n_1$ ($n_x$) to the second portion 18 of the substrate 12 is less than or equal to 50%, less than or equal to 55%, less than or equal to 60%, less than or equal to 65%, less than or equal to 70%, less than or equal to 75%, less than or equal to 80%, less than or equal to 85%, less than or equal to 90%, less than or equal to 95%, or less than or equal to 99% of the maximum value of the total thickness 32 of the optical coating 14 measured in the direction normal $n_1$ to the first portion 16, or within any range bounded by any two of those values (e.g., from 55% to 80%, from 60% to 75%, from 75% to 90%, and so on) of the maximum value of the total thickness 32 of the optical coating 14 measured in the direction normal $n_1$ to the first portion 16

Figure 3:
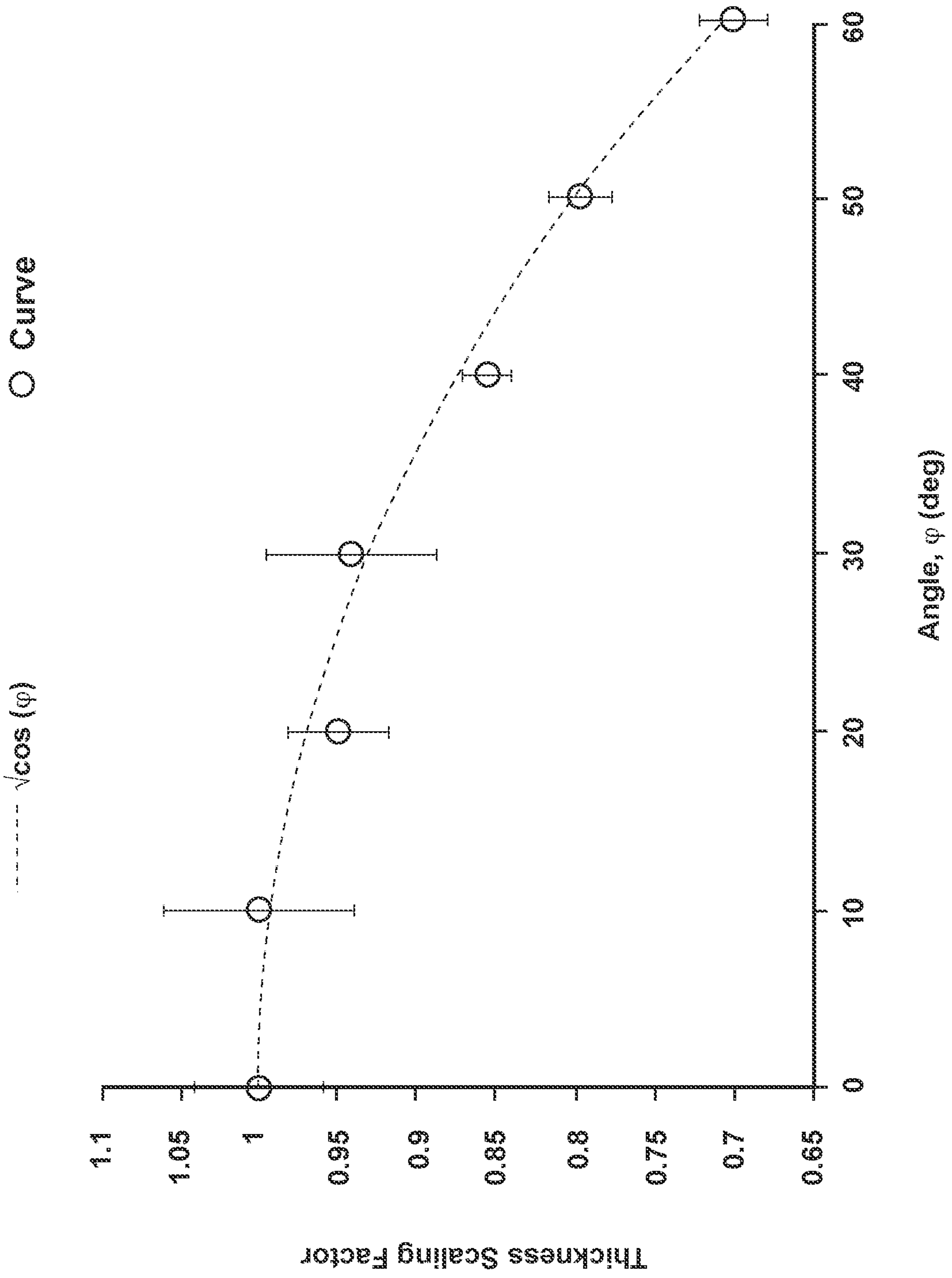
FIG. 3 is graph that plots a thickness scaling factor as a function of the angle φ marking the difference between the normal of the first portion of the substrate and the path of optical coating material deposited, illustrating that as the angle φ increases, the total thickness of the optical coating decreases.

Referring now to FIG. 3, if the optical coating 14 is deposited with a line-of-sight deposition character, the total thickness 32 of the optical coating 14 at any particular position along the substrate 12 has been observed for some vapor deposition processes to generally follow the square root of cosine of φ. Thus, as φ at a position upon the substrate 12 increases, the total thickness 32 of the optical coating 14 at that particular position decreases. The graph of FIG. 3 is a plot provided of optical coating 14 thickness scaling factor as a function of the curvature of the surface upon which the optical coating 14 is applied during a deposition process. In particular, FIG. 3 shows the experimentally measured correspondence between the part surface angle (e.g., at the second portion 18 of the first major surface 20) and coating thickness scale factor for the optical coating 14 for a reactive sputtering process employed on coated articles. FIG. 3 can be employed to establish a target process window to optimize the deposition process employed to form the optical coating 14 of the article 10 of the disclosure. As shown in FIG. 3, the coating thickness scale factor follows a square root (cos(φ)) dependence, where φ is the part surface angle. The data shown in FIG. 3 was obtained from measurements of sputtered thin films (not necessarily the optical coatings 14 specifically described herein) using known optical interference calculation methods with a sample fixture that allows rotation of a curved part and measurement of reflectance spectra along the normal angle at each point along the curvature of the part. As shown in FIG. 3, a part surface angle of 30 degrees corresponds to a coating thickness scaling factor of about 0.95, 40 degrees to about 0.85, 50 degrees to about 0.8, and 60 degrees to about 0.7. For example, the article 10 at the second portion 18 with an angle φ of 30 degrees can experience a thinning in the optical coating 14 by a scaling factor of 0.85 relative to the first portion 16. That is, the total thickness 32 *t* of the optical coating 14 disposed at the second portion 18 with an angle φ of 30 degrees will be approximately (in embodiments) 85% of the total thickness 32 *t* of the optical coating 14 disposed at the first portion 16, which has a deposition angle of 0 degrees and thus a scaling factor of 1. Although the actual total thickness 32 of the optical coating 14 deposited by vapor deposition may be different at any particular position upon the substrate 12 from that determined by the scalar of the square root of cosine φ, the model provides a useful estimate for the design process of the optical coating 14.

Figure 4:
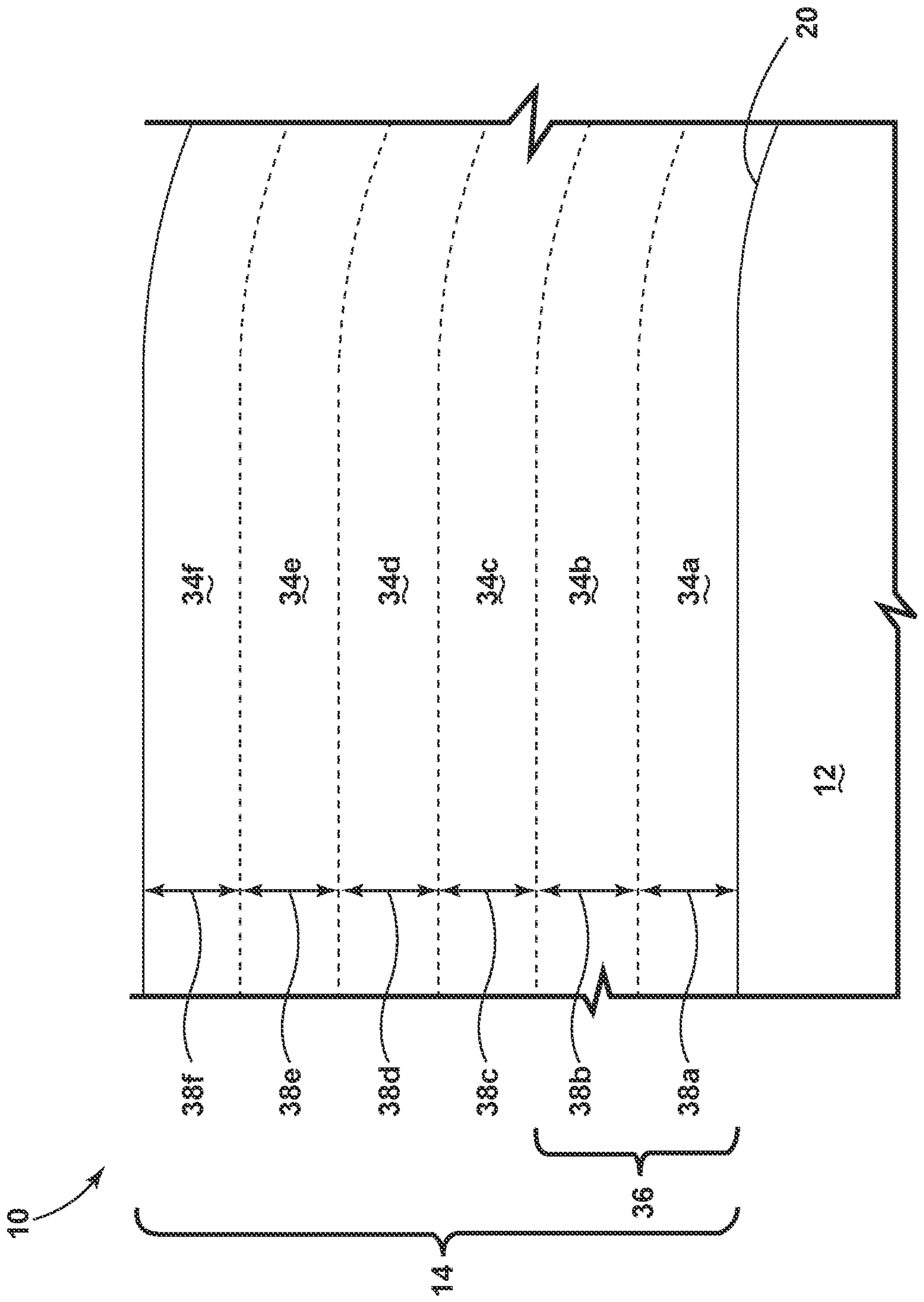
FIG. 4 is a close-up view of area IV of FIG. 1, illustrating the optical coating including a number of layers disposed on the substrate.

Referring now additionally to FIG. 4, the optical coating 14 includes a number of layers 34. In embodiments, the number of layers 34 is ten, nine, eight, seven, six, or five. In embodiments, the number of layers 34 is ten or less, and includes a first layer **34*a*, a second layer 34*b*, a third layer 34*c*, a fourth layer 34*d*, a fifth layer 34*e*, a sixth layer 34*f*, and so on. In embodiments, the number of layers 34 of the optical coating 14 is six or less, such as five (e.g., the first layer 34*a* through the fifth layer 34*e*). In embodiments, the optical coating 14 includes a repeating period 36 of two or more of the layers 34**.

In embodiments, the repeating period 36 is characterized by a layer 34 of a low refractive index material and a layer 34 of a high refractive index material. In embodiments, the "low refractive index" of the low refractive index material means that the refractive index of the material is within a range of from 1.44 to 1.55. In embodiments, the low refractive index material has a refractive index of 1.44, 1.45, 1.46, 1.47, 1.48, 1.49, 1.50, 1.51, 1.52, 1.53, 1.54, or 1.55, or within any range bound by any two of those values (e.g., from 1.44 to 1.49, from 1.44 to 1.50, and so on). All refractive index values set forth herein are at a temperature of 25 °C and for electromagnetic radiation at a wavelength of 550 nm.

In embodiments, the low refractive index material is one or more of $SiO_2$, doped $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. In embodiments, the low refractive index material is $SiO_2$ or doped $SiO_2$. "Doped $SiO_2$" as used in this disclosure means that the $SiO_2$ may be doped with Al or N, which increases the hardness or mechanical durability of the layer 34 while maintaining the refractive index within the range to qualify as a low refractive index material. The low refractive index material is not limited to those specifically mentioned.

In embodiments, the "high refractive" of the high refractive index material means that the refractive index of the material is within a range of from 1.8 to 2.5. In embodiments, the high refractive index material has a refractive index of 1.8, 1.9, 2.0, 2.1, 2.2, 2.3, 2.4, or 2.5 or within any range bound by any two of those values (e.g., from 1.8 to 2.2, from 1.9 to 2.1, from 2.0 to 2.2, and so on).

In embodiments, the high refractive index material is one or more of $SiN_x$, $SiO_xN_y$, $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, and diamond-like carbon. In embodiments, the high refractive index of is $SiN_x$ or $SiO_xN_y$. The high refractive index material is not limited to those specifically mentioned. In embodiments, the layer 34 of high refractive index material is additionally a high hardness layer or a scratch-resistant layer, and the high refractive index materials listed above can additionally comprise high hardness or scratch resistance. In embodiments, the layer 34 of high refractive index material of the optical coating 14 that is furthest from the substrate 12 (e.g., the top-most layer of the high refractive index material), exhibits high hardness or scratch resistance.

$AlO_xN_y$ materials may be considered to be oxygen-doped $AlN_x$, that is they may have an $AlN_x$ crystal structure (e.g. wurtzite) and need not have an AlON crystal structure. Exemplary $AlO_xN_y$ high refractive index materials may comprise from about 0 atom % to about 20 atom % oxygen, or from about 5 atom % to about 15 atom % oxygen, while including 30 atom % to about 50 atom % nitrogen. Exemplary $Si_uAl_vO_xN_y$ high refractive index materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. In some implementations, the $Si_uAl_vO_xN_y$ high refractive index materials comprise from 45 atom % to 50 atom % silicon, 45 atom % to 50 atom % nitrogen, and 3 atom % to 10 atom % oxygen. In further implementations, the $Si_uAl_vO_xN_y$ high refractive index materials comprise from 45 atom % to 50 atom % silicon, 35 atom % to 50 atom % nitrogen, and 3 atom % to 20 atom % oxygen.

As used herein, the "$AlO_xN_y$," "$SiO_xN_y$," and "$Si_uAl_vO_xN_y$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "v," "x," and "y". That is, it is common to describe solids with "whole number formula" descriptions, such as $Al_2O_3$. It is also common to describe solids using an equivalent "atomic fraction formula" description, such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6, respectively. Atomic fraction descriptions are described in many general textbooks and atomic fraction descriptions are often used to describe alloys. (See, e.g.: (i) Charles Kittel, "Introduction to Solid State Physics," seventh edition, John Wiley & Sons, Inc., NY, 1996, pp. 611-627; (ii) Smart and Moore, "Solid State Chemistry, An Introduction," Chapman & Hall University and Professional Division, London, 1992, pp. 136-151; and (iii) James F. Shackelford, "Introduction to Materials Science for Engineers," Sixth Edition, Pearson Prentice Hall, New Jersey, 2005, pp. 404-418.)

Again referring to the "$AlO_xN_y$," "$SiO_xN_y$," and "$Si_uAl_vO_xN_y$" materials in the disclosure, the subscripts allow those with ordinary skill in the art to reference these materials as a class of materials without specifying particular subscript values. That is, to speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_vO_xN_y$" materials in the disclosure, these notations allow those with ordinary skill in the art to readily make comparisons to these materials and others. That is, atomic fraction formulas are sometimes easier to use in comparisons. For instance, an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O, and N atoms.

The total thickness 32 of the optical coating 14 is greater on the first portion 16 of the substrate 12 than on the second portion 18, because of the line-of-sight deposition process, as explained above. The total thickness 32 of the optical coating 14 disposed on the first portion 16 of the substrate 12 is less than or equal to 1000 nm, such as less than or equal to 800 nm. In embodiments, the total thickness 32 of the optical coating 14 disposed on the first portion 16 is within a range of from 320 nm to 1000 nm. In embodiments, the total thickness 32 of the optical coating 14 disposed on the first portion 16 is less than or equal to 600 nm. In embodiments, total thickness 32 of the optical coating 14 disposed on the first portion 16 is 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, or within any range bound by any two of those values (e.g., from 320 nm to 1000 nm, from 320 nm to 800 nm, from 320 nm to 700 nm, from 350 nm to 650 nm, from 380 nm to 650 nm, from 400 nm to 650 nm, from 400 nm to 600 nm, from 320 nm to 360 nm, from 450 nm to 600 nm, from 500 nm to 550 nm, from 500 nm to 600 nm, and so on). In embodiments, the total thickness 32 has a maximum value when measured in the direction normal $n_1$ to the first portion 16.

The layer 34 of the high refractive index material that is disposed furthest from the substrate 12 (e.g., the fourth layer **34*d* in embodiments of the optical coating 14 that include only five layers 34) has a thickness 38*d* that is greater than or equal to 100 nm. In embodiments, the thickness 38*d* of the layer 34 of the high refractive index material that is disposed furthest from the substrate 12** is 100 nm, 110 nm, 120 nm, 130 nm, 140 nm, 145 nm, 150 nm, 155 nm, 160 nm, 165 nm, 170 nm, 180 nm, 190 nm, 200 nm, 210 nm, 220 nm, 230 nm, 240 nm, or 250 nm, or within any range bound by any two of those values (e.g., from 100 nm to 250 nm, from 145 nm to 155 nm, from 140 nm to 170 nm, from 120 nm to 180 nm, from 100 nm to 200 nm, and so on).

At least 40% (by thickness) of a 250 nm thick portion of the total thickness 32 of the optical coating 14 that is disposed furthest from the substrate 12 is high refractive index material. For example, assuming that the total thickness 32 of the optical coating 14 is 500 nm, then of the 250 nm thick portion disposed furthest from the substrate 12, the combined thicknesses 38 of any layers 34 of the high refractive index material within that 250 nm thick portion would be greater than or equal 40% (i.e., greater than or equal to 100 nm) of that 250 nm thick portion. In embodiments, the high refractive index material makes up at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, or at least 65%, or any percentage within any range bound by any two of those values (e.g., from 40% to 65%, from 55% to 61%, from 56% to 62%, and so on) of the 250 nm thick portion disposed furthest from the substrate 12.

In embodiments, the layer 34 of low refractive index material that is disposed closest to the substrate 12 (e.g., the first layer 34*a*) has a thickness 38*a* that is within a range of from 150 nm to 250 nm. In embodiments, the thickness 38*a* of the layer 34 of refractive index material that is disposed closest to the substrate 12 is 150 nm, 160 nm, 170 nm, 180 nm, 190 nm, 200 nm, 210 nm, 220 nm, 230 nm, 240 nm, or 250 nm, or within any range bound by any two of those values (e.g., from 150 nm to 250 nm, from 170 nm to 210 nm, from 180 nm to 250 nm, from 200 nm to 250 nm, and so on).

The thicknesses 38 (e.g., 38*b* and 38*d*) of the layers 34 of the high refractive index material make up a percentage (by thickness) of the total thickness 32 of the optical coating 14. In embodiments, the percentage may be greater than or equal to 20%, 21%, 22%, 23%, 24%, 25%, 26%, 27% 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50%, or within any range bound by any two of those values (e.g., from 25% to 50%, from 25% to 40%, from 28% to 35%, from 30% to 35%, from 31% to 34%, and so on). In other words, in embodiments, 28% to 35% of the total thickness 32 of the optical coating 14 is the sum of the thicknesses 38 (e.g., 38*b* and 38*d*) of the layers 34 of the high refractive index material.

In embodiments, the optical coating 14 includes five layers 34—the first layer 34*a* disposed on the substrate 12, the second layer 34*b* disposed on the first layer 34*a*, the third layer 34*c* disposed on the second layer 34*b*, the fourth layer 34*d* disposed on the third layer 34*c*, and the fifth layer 34*e* disposed on the fourth layer 34*d*. In some of those embodiments, the first layer 34*a*, the third layer 34*c*, and the fifth layer 34*e* each include a low refractive index material, while the second layer 34*b* and the fourth layer 34*d* each include a high refractive index material. The thickness 38*a* of the first layer 34*a*, as mentioned, is within a range of from 150 nm to 250 nm. In embodiments, the thickness of the first layer 34*a* is 150 nm, 160 nm, 170 nm, 180 nm, 190 nm, 200 nm, 210 nm, 220 nm, 230 nm, 240 nm, or 250 nm, or within any range bound by any two of those values (e.g., from 160 nm to 240 nm, from 180 nm to 250 nm, from 220 nm to 250 nm, and so on). The second layer 34*b* has a thickness 38*b* within a range of from 10 nm to 25 nm. In embodiments, the thickness 38*b* of the second layer 34*b* is 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, or 25 nm, or within any range bounded by any two of those values (e.g., 11 nm to 16 nm, 15 nm to 24 nm, and so on). The third layer 34*c* has a thickness 38*c* within a range of from 30 nm to 50 nm. In embodiments, the thickness 38*c* of the third layer 34*c* is 30 nm, 32 nm, 34 nm, 36 nm, 38 nm, 40 nm, 42 nm, 44 nm, 46 nm, 48 nm, or 50 nm, or within any range bounded by any two of those values (e.g., from 32 nm to 46 nm, from 38 nm to 48 nm, and so on). The thickness 38*d* of the fourth layer 34*d*, as mentioned, is within a range of from 100 nm to 250 nm. In embodiments, the thickness 38*d* of the fourth layer 34*d* is 100 nm, 110 nm, 120 nm, 130 nm, 140 nm, 145 nm, 150 nm, 155 nm, 160 nm, 165 nm, 170 nm, 180 nm, 190 nm, 200 nm, 210 nm, 220 nm, 230 nm, 240 nm, or 250 nm, or within any range bound by any two of those values (e.g., from 145 nm to 155 nm, from 140 nm to 170 nm, from 120 nm to 180 nm, from 100 nm to 200 nm, and so on). The fifth layer 34*e* has a thickness 38*e* within a range of from 60 nm to 150 nm. In embodiments, the thickness 38*e* of the fifth layer 34*e* is 60 nm, 70 nm, 75 nm, 80 nm, 90 nm, 100 nm, 110 nm, 120 nm, 125 nm, 130 nm, 140 nm, or 150 nm, or within any range bound by any two of those values (e.g., from 75 nm to 125 nm, 90 nm to 110 nm, and so on).

In embodiments, the high refractive index material makes up more than 50% of the combined thickness 38 of the two layers 34 of the optical coating 14 that are disposed furthest from the substrate 12. For example, assuming that the optical coating 14 includes five layers 34, with the fourth layer 34*d* including the high refractive index material and the fifth layer 34*e* including the low refractive index material, then the thickness 38*d* of the fourth layer 34*d* of the high refractive index material would be greater than the thickness 38*e* of the fifth layer 34*e* of the low refractive index material.

All thicknesses 38 of the individual layers 34 of the optical coating 14 described herein are as disposed on the first portion 16 of the substrate 12. The thicknesses 38 of the individual layers 34 of the optical coating 14 described herein are each less as disposed on the second portion 18 of the substrate 12 than on the first portion 16 of the substrate 12, because of the line-of-sight deposition variation described above.

Figure 5:
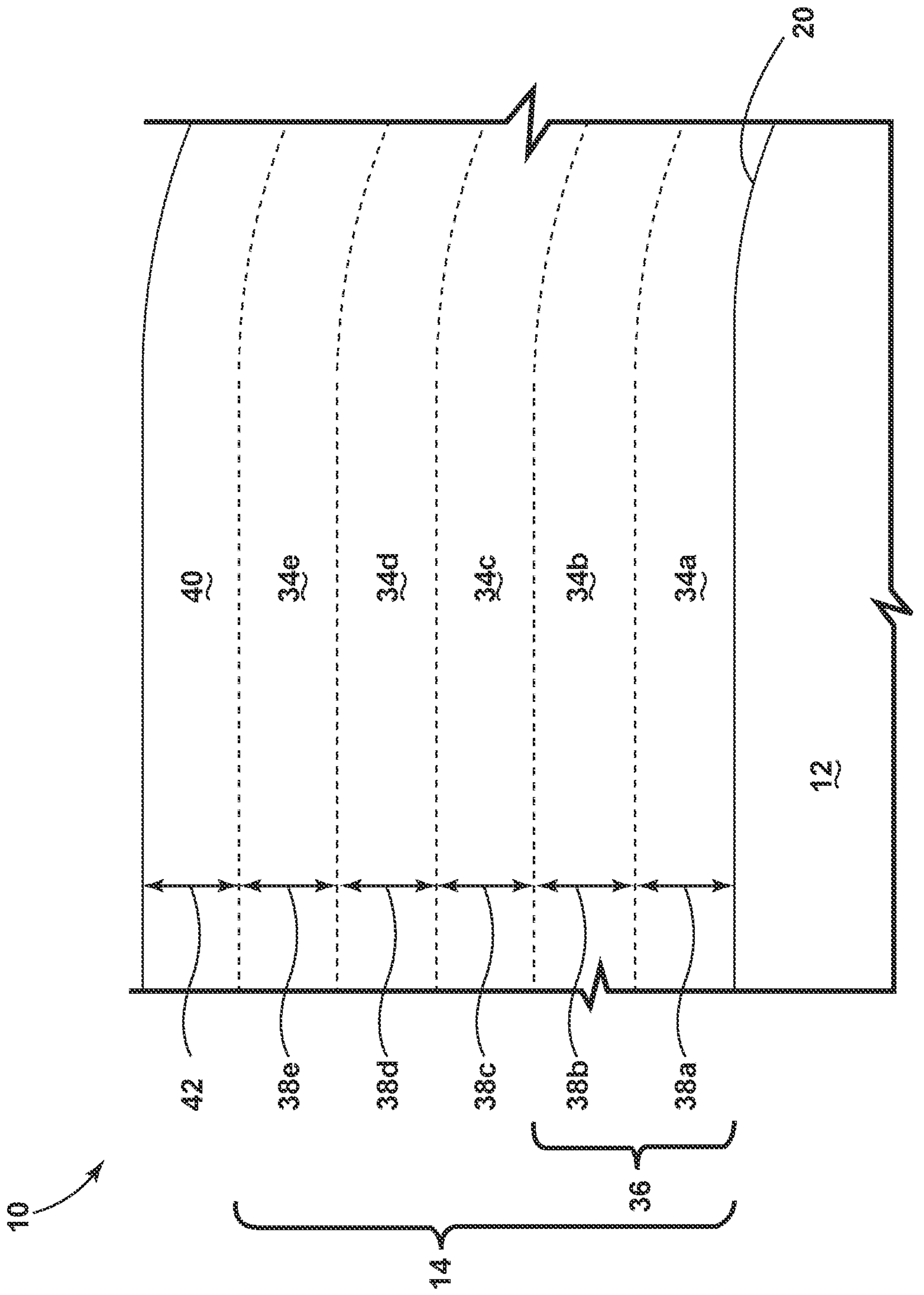
FIG. 5 is the same view as FIG. 4 but illustrating that the article can further include a fluorinated silane layer disposed on the optical coating.

Referring now to FIG. 5, in embodiments, the article 10 further includes a fluorinated silane layer 40 disposed on the optical coating 14. In such embodiments, the optical coating 14 is disposed between the substrate 12 and the fluorinated silane layer 40. In embodiments, the fluorinated silane layer 40 has a refractive index within a range of from 1.4 to 1.5. In embodiments, the fluorinated silane layer 40 has a thickness 42 that is within a range of from 1 nm to 10 nm. In embodiments, the thickness 42 of the fluorinated silane layer 40 is 1 nm, 2 nm, 3 nm, 4 nm, 5 nm, 6 nm, 7 nm, 8 nm, 9 nm, or 10 nm, or within any range bound by any two of those values (e.g., 2 nm to 7 nm, 3 nm to 8 nm, and so on). The fluorinated silane layer 40 reduces friction of the optical coating 14, which improves resistance to abrasion. Further, the fluorinated silane layer 40 imparts the optical coating 14 with hydrophobic or oleophobic surface properties that render the optical coating 14 easier to clean compared to if the fluorinated silane layer 40 were not present upon the optical coating 14. Because the thickness 42 of the fluorinated silane layer 40 is relatively small, the presence of the fluorinated silane layer 40 only minimally affects the hardness, transmittance, and reflective properties of the article 10. Further, because the composition and optical properties of the fluorinated silane layer 40 are very similar to a final layer 34 (e.g., the fifth layer 34*e*) of $SiO_2$ of embodiments of the optical coating 14, the thickness 38 of the final layer of $SiO_2$ (e.g., the thickness 38*e* of the fifth layer 34*e*) can be thinned to accommodate the thickness 42 of the fluorinated silane layer 40.

The substrate 12 may include an inorganic material and may include an amorphous substrate 12, a crystalline substrate 12, or a combination thereof.

In embodiments, the amorphous substrate 12 may include glass, which may be strengthened or non-strengthened. In embodiments, the substrate 12 includes a glass or glass-ceramic composition. Examples of suitable glass compositions include soda lime glass composition, an alkali aluminosilicate glass composition, an alkali containing borosilicate glass composition, and an alkali aluminoborosilicate glass composition. In some variants, the glass may be free of lithium. In embodiments, the substrate 12 may include crystalline substrates 12, such as glass ceramic substrates 12 (which may be strengthened or non-strengthened), or may include a single crystal structure, such as sapphire. In embodiments, the substrate 12 includes an amorphous base (e.g., glass) and a crystalline cladding (e.g., sapphire layer, a polycrystalline alumina layer and/or or a spinel ($MgAl_2O_4$) layer).

Particular example glass compositions suitable to be the substrate 12 comprise $SiO_2$, $B_2O_3$ and $Na_2O$, where $(SiO_2+B_2O_3)\geq 66$ mol. %, and $Na_2O\geq 9$ mol. %. In an embodiment, the glass composition includes at least 6 wt. % aluminum oxide. In a further embodiment, the substrate 12 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate 12 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

Further example glass compositions suitable for the substrate 12 comprise: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %$\leq(Li_2O+Na_2O+K_2O)\leq 20$ mol. % and 0 mol. %$\leq(MgO+CaO)\leq 10$ mol. %.

Still further example glass compositions suitable for the substrate 12 comprise: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %$\leq(Li_2O+Na_2O+K_2O)\leq 18$ mol. % and 2 mol. %$\leq(MgO+CaO)\leq 7$ mol. %.

In embodiments, an alkali aluminosilicate glass composition suitable for the substrate 12 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma$modifiers (i.e., sum of modifiers) is greater than 1, where in the ratio the components are expressed in mol. % and the modifiers are alkali metal oxides. This glass composition, in embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)//$modifiers (i.e., sum of modifiers) is greater than 1.

In embodiments, the substrate 12 includes an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %$\leq SiO_2+B_2O_3+CaO\leq 69$ mol. %; $Na_2O+K_2O+B_2O_3+MgO+CaO+SrO>10$ mol. %; 5 mol. %$\leq MgO+CaO+SrO\leq 8$ mol. %; $(Na_2O+B_2O_3)—Al_2O_3\leq 2$ mol. %; 2 mol. %$\leq Na_2O—Al_2O_3\leq 6$ mol. %; and 4 mol. %$\leq(Na_2O+K_2O)—Al_2O_3\leq 10$ mol. %.

In embodiments, the substrate 12 comprises an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 12 includes a crystalline substrate, the substrate 12 may include a single crystal, which may include $Al_2O_3$. Such single crystal substrates are referred to as sapphire. Other suitable materials for a crystalline substrate include polycrystalline alumina layer and/or spinel ($MgAl_2O_4$).

In embodiments, the substrate 12 is crystalline and include a glass-ceramic composition, which may be strengthened or non-strengthened. Examples of suitable glass ceramics may include $Li_2O—Al_2O_3—SiO_2$ system (i.e. LAS-System) glass ceramics, $MgO—Al_2O_3—SiO_2$ system. (i.e. MAS-System) glass ceramics, and/or glass ceramics that include a predominant crystal phase including β-quartz solid solution, β-spodumene ss, cordierite, and lithium disilicate. The glass ceramic substrates 12 may be strengthened using the chemical strengthening processes disclosed herein. In one or more embodiments, MAS-System glass ceramic substrates 12 may be strengthened in $Li_2SO_4$ molten salt, whereby an exchange of $2Li^+$ for $Mg^{2+}$ can occur.

The substrate 12 may be formed from man-made materials and/or naturally occurring materials (e.g., quartz and polymers). For example, in some instances, the substrate 12 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 12 may specifically exclude polymeric, plastic and/or metal materials. The substrate 12 may be characterized as alkali-including substrates 12 (i.e., the substrate 12 includes one or more alkalis). In one or more embodiments, the substrate 12 exhibits a refractive index in the range from about 1.45 to about 1.55. In embodiments, the substrate 12 may exhibit an average strain-to-failure at a surface on one or more opposing major surfaces that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In embodiments, the substrate 12 may exhibit an average strain-to-failure at its surface on one or more opposing major surfaces of about 1.2%, about 1.4%, about 1.6%, about 1.8%, about 2.2%, about 2.4%, about 2.6%, about 2.8%, or about 3% or greater.

In embodiments, the substrate 12 exhibits an elastic modulus (or Young's modulus) in the range from 30 GPa to 120 GPa. In embodiments, the elastic modulus of the substrate 12 is 30 GPa, 40 GPa, 50 GPa, 60 GPa, 70 GPa, 80 GPa, 90 GPa, 100 GPa, 110 GPa, or 120 GPa, or within any range bound by any two of those values (e.g., from 30 GPa to 90 GPa, from 40 GPa to 120 GPa, and so on).

The substrate 12 may be provided using a variety of different processes. For instance, where the substrate 12 includes a glass composition, the glass composition can be formed via various forming methods such as float glass processes and down-draw processes such as fusion draw and slot draw.

In embodiments, the substrate 12 is strengthened, before the optical coating 14 is disposed thereon. For example, once formed, the substrate 12 may be strengthened, such as chemically strengthened. In embodiments, the substrate 12 is chemically strengthened through ion-exchange of larger ions for smaller ions in the surface of the substrate 12. However, other strengthening methods known in the art, such as thermal tempering, or utilizing a mismatch of the coefficient of thermal expansion between portions of the substrate 12 to create compressive stress and central tension regions, may be utilized to strengthen the substrate 12.

In embodiments where the substrate 12 is chemically strengthened by an ion exchange process, the ions in the surface layer of the substrate 12 are replaced by—or exchanged with—larger ions having the same valence or oxidation state. Ion exchange processes are typically carried out by immersing a substrate 12 in a molten salt bath containing the larger ions to be exchanged with the smaller ions in the substrate 12. It will be appreciated by those skilled in the art that parameters for the ion exchange process, including, but not limited to, bath composition and temperature, immersion time, the number of immersions of the substrate 12 in a salt bath (or baths), use of multiple salt baths, additional steps such as annealing, washing, and the like, are generally determined by the composition of the substrate 12 and the desired compressive stress (CS), depth of compressive stress layer (or depth of layer DOL, or depth of compression DOC) of the substrate 12 that result from the strengthening operation. By way of example, ion exchange of alkali metal-containing glass substrates 12 may be achieved by immersion in at least one molten bath containing a salt such as, but not limited to, nitrates, sulfates, and chlorides of the larger alkali metal ion. The temperature of the molten salt bath typically is in a range from about 380 °C up to about 450 °C, while immersion times range from about 15 minutes up to about 40 hours. However, temperatures and immersion times different from those described above may also be used.

In addition, non-limiting examples of ion exchange processes in which glass substrates 12 are immersed in multiple ion exchange baths, with washing and/or annealing steps between immersions, are described in U.S. patent application Ser. No. 12/500,650, filed Jul. 10, 2009, now U.S. Pat. No. 8,561,429, issued Oct. 22, 2013, by Douglas C. Allan et al., entitled "Glass with Compressive Surface for Consumer Applications" and claiming priority from U.S. Provisional Patent Application No. 61/079,995, filed Jul. 11, 2008, in which glass substrates 12 are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates 12 are strengthened by ion exchange in a first bath that is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The degree of chemical strengthening achieved by ion exchange may be quantified based on the parameters of central tension (CT), surface compressive stress (CS), and depth of compression (DOC). Compressive stress (including surface CS) is measured by surface stress meter (FSM) using commercially available instruments, such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum CT values are measured using a scattered light polariscope (SCALP) technique known in the art. As used herein, DOC means the depth at which the stress in the chemically strengthened alkali aluminosilicate glass article 10 described herein changes from compressive to tensile. DOC may be measured by FSM or SCALP depending on the ion exchange treatment. Where the stress in the glass article 10 is generated by exchanging potassium ions into the glass article 10, FSM is used to measure DOC. Where the stress is generated by exchanging sodium ions into the glass article 10, SCALP is used to measure DOC. Where the stress in the glass article 10 is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such a glass article 10 is measured by FSM.

In one embodiment, a substrate 12 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate 12 may have a DOC (formerly DOL) of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In embodiments, the substrate 12, after strengthening, has one or more of the following: a surface CS greater than 500 MPa, a DOC (formerly DOL) greater than 15 μm, and a CT greater than 18 MPa.

In embodiments, the substrate 12 has a thickness 44 (see FIG. 1) within a range of from 100 μm to 5 mm in various portions of the substrate 12, such as between the first major surface 20 an the second major surface 22. In embodiments, the thickness 44 of the substrate 12 is 100 μm, 200 μm, 300 μm, 400 μm, 500 μm, 600 μm, 700 μm, 800 μm, 900 μm, 1 mm, 1.1 mm, 1.2 mm, 1.3 mm, 1.4 mm, 1.5 mm, 2 mm, 3 mm, 4 mm, or 5 mm, or within any range bound by any two of those values (e.g., from 200 μm to 900 μm, from 300 μm to 2 mm, and so on). The substrate 12 may be acid polished or otherwise treated to remove or reduce the effect of surface flaws.

Figure 6B:
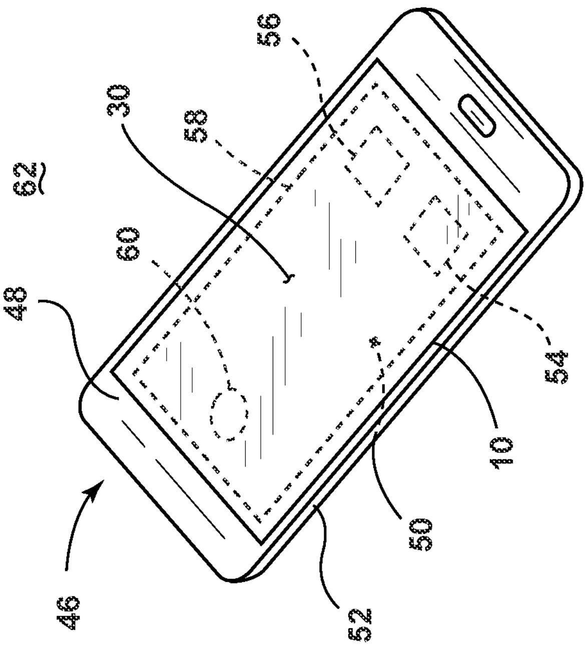
FIG. 6B is a perspective view of the consumer electronic product of FIG. 6A.
Figure 6A:
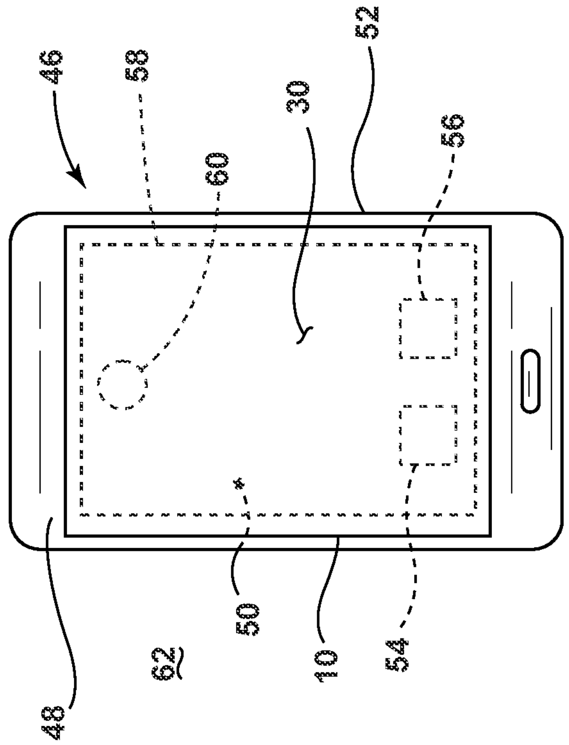
FIG. 6A is an overhead view of a consumer electronic product that incorporates the article of FIG. 1, illustrating that the consumer electronic product, in embodiments, includes a housing and the article, which together house a display and a sensor, with (i) the article and display positioned so that the display transmits visible electromagnetic radiation through the article to an external environment and (ii) the article and the sensor positioned so that electromagnetic radiation from the external environment transmits through the article to be sensed by the sensor.

In embodiments, referring now to FIGS. 6A and 6B, the article 10 is a component of a consumer electronic product

46. The consumer electronic product 46 can include a housing 48 and electrical components at least partially housed within the housing 48. The housing 48 can include a back surface 50 and a side surface 52. The electrical components include a controller 54, memory 56, a display 58, and a sensor 60. The article 10 and the housing 48 cooperate to separate the display 58 and the sensor 60 from an environment external 62, which is external to the consumer electronic product 46. For example, the display 58 and the sensor 60 can be disposed between the back surface 50 of the housing 48 and the article 10, with the side surface 52 of the housing 48 at least partially surrounding both the display 58 and the article 10. The display 58 is configured to transmit visible electromagnetic radiation through the article 10 to the environment external 62 to the consumer electronic product 46. In embodiments, the sensor 60 is configured to detect electromagnetic radiation having a wavelength within a range of from 800 nm to 1000 nm (e.g., within a range of from 840 nm to 860 nm, within a range of from 930 nm to 950 nm, or within both ranges). In embodiments, the sensor 60 is configured (additionally or alternatively) to detect electromagnetic radiation in the visible range and/or ultraviolet range. The sensor 60 and article 10 are positioned so that the sensor 60 detects the electromagnetic radiation that transmits through the article 10 to the sensor 60 from the environment external 62 to the consumer electronic product 46. In embodiments, the consumer electronic product 46 includes touch screen capability. In embodiments, the consumer electronic product 46 is a smart phone or a smartwatch.

In embodiments, the article 10 at the optical coating 14 exhibits a maximum hardness within a range of from 8.5 GPa to 15 GPa. In embodiments, the article 10 at the optical coating 14 exhibits a maximum hardness of 8.5 GPa, 9.0 GPa, 10 GPa, 10.5 GPa, 11 GPa, 12 GPa, 13 GPa, 14 GPa, or 15 GPa, or within any range bound by any two of those values (e.g. from 8.5 GPa to 10.5 GPa, from 9 GPa to 11 GPa, and so on). The maximum hardness refers to a measurement conducted pursuant to the Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the optical coating 14 of the article 10 or the surface of any one or more of the layers 34 of the optical coating 14 with the diamond Berkovich indenter to form an indent to an indentation depth in the range from about 50 nm to the total thickness 32 of the optical coating 14 or layer 34 thereof, whichever is less, and measuring the maximum hardness from this indentation along the entire indentation depth range or a segment of this indentation depth (e.g., in the range from about 100 nm to about 600 nm, e.g., at an indentation depth of 100 nm or greater, etc.), generally using the methods set forth in Oliver, W. C.; Pharr, G. M., "An improved technique for determining hardness and elastic modulus using load and displacement sensing indentation experiments," J. Mater. Res., Vol. 7, No. 6, 1992, 1564-1583; and Oliver, W. C.; Pharr, G. M., "Measurement of Hardness and Elastic Modulus by Instrument Indentation: Advances in Understanding and Refinements to Methodology," J. Mater. Res., Vol. 19, No. 1, 2004, 3-20, the salient portions of which are incorporated by reference within this disclosure in their entirety.

As used herein, "hardness" refers to a maximum hardness, and not an average hardness. Typically, in nanoindentation measurement methods (such as by using a Berkovich indenter) of a coating (e.g., the optical coating 14) that is harder than the underlying substrate 12 (e.g., the substrate 12), the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate 12. Where a substrate 12 having an increased hardness compared to the coating is utilized, the same effect can be seen; however, the hardness increases at deeper indentation depths due to the effect of the underlying substrate 12.

The indentation depth range and the hardness values at certain indentation depth range(s) can be selected to identify a particular hardness response of the optical coating 14 and layers 34 thereof, described herein, without the effect of the underlying substrate 12. When measuring hardness of the optical coating 14 (when disposed on a substrate 12) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 12. The influence of the substrate 12 on hardness occurs at deeper indentation depths (i.e., typically at depths greater than about 10% of the optical film or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate 12 becomes more pronounced as the indentation depths increase. Hardness may begin to drop dramatically once the indentation depth exceeds about 30% of the thickness 44 of the optical coating 14 or the thickness 38 of the layer 34 being measured.

In embodiments, the hardness may be measured at different portions of the article 10. For example, the article 10 may exhibit a hardness of 8.5 GPa to 10.5 GPa at the selected indentation depth at the area of the article 10 pertaining to the first portion 16 and pertaining to the second portion 18. In embodiments, the substrate 12 measured separately has a hardness that is less than the hardness of the overall article 10 (as measured by the Berkovich Indenter Hardness Test described herein).

In embodiments, the article 10 at the first portion 16 and the article 10 at the second portion 18 have optical characteristics such as light reflectivity, light transmittance, reflected color, and/or transmitted color, that appear similar to one another, despite the thickness 44 of the optical coating 14 over the first portion 16 being different than the thickness 44 of the optical coating 14 over the second portion 18, even when viewing angle changes. For example, the optical characteristics of the article 10 when viewing in the direction near normal ($n_1$) to the first portion 16 (e.g., $\theta_1$ is equal to about 0 degrees) are similar to the optical characteristics of the article 10 when viewing in the direction near normal ($n_2$) to the second portion 18 (e.g., 02 is equal to about 0 degrees). In other embodiments, the optical characteristics pertaining to the first portion 16 are similar to those at the second portion 18 when each is viewed for an incident illumination angle in a specified range relative to the normal direction at the respective first portion 16 and second portion 18 (e.g., $\theta_1$ is from about 0 degrees to about 60 degrees, and $\theta_2$ is from about 0 degrees to about 60 degrees). In additional embodiments, the optical characteristics of the article 10 pertaining to the first portion 16 are similar to those pertaining to the second portion 18 when each is viewed in about the same direction (e.g., the angle between $v_1$ and $v_2$ is about equal to 0 degrees).

In embodiments, the optical coating 14 disposed on the substrate 12 exhibits a first surface reflected color characterized by International Commission on Illumination ("CIE") L*a*b* color space values of: (i) a*, from −6.0 to +4.5, and (ii) b*, from −11.0 to +6.0, under illumination from CIE standard illuminant D65, at all viewing angles within a range of from 0 degrees to 10 degrees relative to a normal of the first major surface 20 at both (i) the first portion 16 and (ii) the second portion 18 where the total thickness 32 of the optical coating 14 is less than or equal to 100% of the maximum value of the total thickness 32, such as less than or equal to 75% of the maximum value of the total thickness 32, or within a range of from 75% to 90% of the maximum value. In embodiments, the optical coating 14 disposed on the substrate 12 exhibits a first surface reflected color characterized by International Commission on Illumination ("CIE") L*a*b* color space values of: (i) a*, from −6.0 to +4.5, and (ii) b*, from −11.0 to +6.0, under illumination from CIE standard illuminant D65, at all viewing angles within of range of from 0 degrees to 10 degrees relative to a normal of the first major surface 20 at both (i) the first portion 16 and (ii) at all positions at the second portion 18 where the total thickness 32 of the optical coating 14 is within a range of from 75% to 100% of the maximum value of the total thickness 32, such as within a range of from 75% to 90% of the maximum value of the total thickness 32. In embodiments, the first surface reflected color that the optical coating 14 disposed on the substrate 12 exhibits is characterized by an a* value of −6.0, −5.5, −5.0, −4.0, −3.0, −2.0, −1.0, 0, +1.0, +2.0, +3.0, +4.0, or +4.5, or within any range bound by any two of those values (e.g., from −5.5 to +4.5, from −5.5 to +4.0, from 0 to +4.0, from −2.0 to +3.0, and so on). In embodiments, the first surface reflected color that the optical coating 14 disposed on the substrate 12 exhibits is characterized by a b* value of −11.0, −10.5, −10.0, −9.0, −8.0, −7.0, −6.0, −5.0, −4.0, −3.0, −2.0, −1.0, 0, +1.0, +2.0, +3.0, +4.0, +5.0, +5.5, or +6.0, or within any range bound by any two of those values (e.g., from −10.5 to +5.5, from −8 to +2, from −1 to +1, and so on). All CIE L*a*b* color space values mentioned in this disclosure are determined under illumination from CIE standard illuminant D65.

In embodiments, the optical coating 14 disposed on the substrate 12 exhibits a first surface reflected color characterized by International Commission on Illumination ("CIE") L*a*b* color space values of: (i) a*, from −6.0 to +6.0, and (ii) b*, from −12.0 to +7.5, under illumination from CIE standard illuminant D65, at all viewing angles within a range of from 0 degrees to 90 degrees relative to a normal of the first major surface 20 at both (i) the first portion 16 and (ii) the second portion 18 where the total thickness 32 of the optical coating 14 is less than or equal to 100% of the maximum value of the total thickness 32, such as less than or equal to 75% of the maximum value of the total thickness 32, and such as within a range of from 75% to 90% of the maximum value of the total thickness 32. In embodiments, the optical coating 14 disposed on the substrate 12 exhibits a first surface reflected color characterized by International Commission on Illumination ("CIE") L*a*b* color space values of: (i) a*, from −6.0 to +6.0, and (ii) b*, from −12.0 to +7.5, under illumination from CIE standard illuminant D65, at all viewing angles within a range of from 0 degrees to 90 degrees relative to a normal of the first major surface 20 at both (i) the first portion 16 and (ii) at all positions at the second portion 18 where the total thickness 32 of the optical coating 14 is within a range of from 75% to 100% of the maximum value of the total thickness 32, such as within a range of from 75% to 90% of the maximum value of the total thickness 32. In embodiments, the first surface reflected color that the optical coating 14 disposed on the substrate 12 exhibits is characterized by an a* value of −6.0, −5.5, −5.0, −4.0, −3.0, −2.0, −1.0, 0, +1.0, +2.0, +3.0, +4.0, +5.0, +5.5, or +6.0, or within any range bound by any two of those values (e.g., from 0 to +4, from −2 to +3, and so on). In embodiments, the first surface reflected color that the optical coating 14 disposed on the substrate 12 exhibits is characterized by a b* value of −12.0, −11.0, −10.5, −10.0, −9.0, −8.0, −7.0, −6.0, −5.0, −4.0, −3.0, −2.0, −1.0, 0, +1.0, +2.0, +3.0, +4.0, +5.0, +6.0, +7.0, or +7.5, or within any range bound by any two of those values (e.g., from −8 to +2, from −1 to +4, and so on).

As used herein, the term "reflectance" means the percentage of incident optical power within a given wavelength range that is reflected from a material (e.g., the article 10, the substrate 12, or the optical coating 14 or portions thereof). Reflectance may be measured as a single side reflectance (also referred herein as "first surface reflectance") when measured at the optical coating 14 side of the article 10 only (e.g., when removing the reflections from an uncoated second major surface 22 of the article 10, such as through using index-matching oils on the back surface coupled to an absorber, or other known methods).

In embodiments, the article 10 at the optical coating 14 exhibits a first surface average photopic reflectance of less than 1%, for all incidence angles within a range of from 0 degrees to 30 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32. In embodiments, the article 10 at the optical coating 14 exhibits a first surface average photopic reflectance of less than 1.4%, for all incidence angles within a range of from 0 degrees to 30 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32. In embodiments, the article 10 at the optical coating 14 exhibits a first surface average photopic reflectance within a range of from 0.30% to 1.60%, for any incidence angles within a range of from 0 degrees to 30 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32. In embodiments, the article 10 at the optical coating 14 exhibits a first surface average photopic reflectance within a range of from 0.30% to 1.60% for any incidence angle within a range of from 0 degrees to 30 degrees relative to a normal of the first major surface 20 at both (i) the first portion 16 and (ii) the second portion 18 where the total thickness 32 of the optical coating 14 is less than or equal to 100% of the maximum value of the total thickness 32, such as less than or equal to 70% of the maximum value of the total thickness 32, and such as within a range of from 75% to 90% of the maximum value of the total thickness 32. In embodiments, the article 10 at the optical coating 14 exhibits a first surface average photopic reflectance within a range of from 0.30% to 1.60% for any incidence angle within a range of from 0 degrees to 30 degrees relative to a normal of the first major surface 20 at both (i) the first portion 16 and (ii) at all positions at the second portion 18 where the total thickness 32 of the optical coating 14 is within a range of from 75% to 100% of the maximum value of the total thickness 32, such as within a range of from 75% to 90% of the maximum value of the total thickness. In embodiments, the article 10 at the optical coating 14 exhibits a first surface average photopic reflectance of 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.1%, 1.2%, 1.3%, 1.4%, 1.5%, 1.6%, or within any range bound by any two of those values (e.g., 0.50% to 1.4%, and so on), for all incidence angles within a range of from 0 degrees to 30 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32.

In embodiments, the article 10 at the optical coating 14 exhibits a first surface average photopic reflectance of less than 2.1%, for all incidence angles within a range of from 0 degrees to 45 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32. In embodiments, the article 10 at the optical coating 14 exhibits a first surface average photopic reflectance within a range of from 0.30% to 2.80%, for any incidence angles within a range of from 0 degrees to 45 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32. In embodiments, the article 10 at the optical coating 14 exhibits a first surface average photopic reflectance within a range of from 0.30% to 2.80% for any incidence angle within a range of from 0 degrees to 45 degrees relative to a normal of the first major surface 20 at both (i) the first portion 16 and (ii) the second portion 18 where the total thickness 32 of the optical coating 14 is less than or equal to 100% of the maximum value of the total thickness 32, such as less than or equal to 70% of the maximum value of the total thickness 32, and such as within a range of from 75% to 90% of the maximum value of the total thickness 32. In embodiments, the article 10 at the optical coating 14 exhibits a first surface average photopic reflectance within a range of from 0.30% to 2.80% for any incidence angle within a range of from 0 degrees to 45 degrees relative to a normal of the first major surface 20 at both (i) the first portion 16 and (ii) at all positions at the second portion 18 where the total thickness 32 of the optical coating 14 is within a range of from 79% to 100% of the maximum value of the total thickness 32, such as such as within a range of from 75% to 90% of the maximum value of the total thickness 32. In embodiments, the article 10 at the optical coating 14 exhibits a first surface average photopic reflectance of 0.30%, 0.35%, 0.40%, 0.50%, 0.60%, 0.70%, 0.80%, 0.90%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7% 2.8%, or within any range bound by any two of those values (e.g., 0.40% to 2.1%, and so on), for all incidence angles within a range of from 0 degrees to 45 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32.

In embodiments, the article 10 at the optical coating 14 exhibits a first surface average photopic reflectance of less than 1.9%, for all incidence angles within a range of from 0 degrees to 45 degrees relative to a normal of the first major surface 20 at any position along the first portion 16 or the second portion 18 where the total thickness 32 of the optical coating 14 is within a range of from 75% to 100% of the maximum value of the total thickness 32, such as within a range of from 75% to 90% of the maximum value of the total thickness 32. In embodiments, the article 10 at the optical coating 14 exhibits a first surface average photopic reflectance of less than 5.5%, for all incidence angles within a range of from 0 degrees to 60 degrees relative to a normal of the first major surface 20 at any position along the first portion 16 or the second portion 18 where the total thickness 32 of the optical coating 14 is within a range of from 75% to 100% of the maximum value of the total thickness 32, such as within a range of from 75% to 90% of the maximum value of the total thickness 32. In embodiments, the article 10 at the optical coating 14 exhibits a first surface average photopic reflectance of less than 6.0%, for all incidence angles within a range of from 0 degrees to 60 degrees relative to a normal of the first major surface 20 at any position along the first portion 16 or the second portion 18 where the total thickness 32 of the optical coating 14 is within a range of from 70% to 100% of the maximum value of the total thickness 32, such as within a range of from 75% to 90% of the maximum value of the total thickness 32.

In embodiments, the article 10 at the optical coating 14 exhibits, for all incidence angles less than or equal to 6 degrees relative to a normal of the first portion 16, a first surface average photopic reflectance of less than 1.5%. In embodiments, the article 10 at the optical coating 14 disposed on the first portion 16 exhibits, for all incidence angles less than or equal to 6 degrees relative to a normal of the first portion 16, a first surface average photopic reflectance within range of from 0.70% to 1.50%. In embodiments, the article 10 at the optical coating 14 exhibits a first surface average photopic reflectance within a range of from 0.70% to 1.50% for an incidence angle within a range of from 0 degrees to 6 degrees relative to a normal of the first portion 16. In embodiments, the article 10 at the optical coating 14 disposed on the first portion 16 exhibits, for all incidence angles less than or equal to 6 degrees relative to a normal of the first portion 16, a first surface average photopic reflectance of 0.70%, 0.80%, 0.90%, 1.0%, 1.1%, 1.2%, 1.3%, 1.4%, 1.5%, or within any range bound by any two of those values (e.g., 0.80% to 1.3%, and so on).

As used herein, photopic reflectance mimics the response of the human eye by weighting the reflectance versus wavelength spectrum according to the human eye's sensitivity. More particularly, photopic reflectance is defined as the tristimulus Y value of reflected light, according to known conventions such as CIE color space conventions. Photopic reflectance values disclosed herein are an average photopic reflectance $\langle R_p \rangle$ over the visible wavelength range of 380 nm to 720 nm, as defined in the below equation as the spectral reflectance, R(λ) multiplied by the illuminant spectrum, I(λ) and the CIE's color matching function $\bar{y}(\lambda)$, related to the eye's spectral response:

$$\langle R_p \rangle = \int_{380\ nm}^{720\ nm} R(\lambda) \times I(\lambda) \times \bar{y}(\lambda) d\lambda$$

As mentioned, the article 10 exhibits improved (e.g., lower) reflectance of electromagnetic radiation in the infrared range, which allows the article 10 to be utilized for infrared sensing applications such as when the article 10 is disposed over the sensor 60 configured to detect infrared electromagnetic radiation. In embodiments, for all incidence angle less than or equal to 6 degrees relative to a normal of the first portion 16, the article 10 at the optical coating 14 exhibits a first surface reflectance of: (i) less than 1.0% across an entire wavelength range of from 625 nm to 820 nm; (ii) less than 1.5% across an entire wavelength range of from 540 nm to 870 nm; and (iii) less than 2.0% across an entire wavelength range of from 440 nm to 900 nm. In embodiments, the article 10 at the optical coating 14 exhibits, for an incidence angle within a range of from 0 degrees to 6 degrees relative to a normal of the first portion 16, a first surface reflectance of: (i) less than 1.0% across an entire wavelength range of from 625 nm to 820 nm; (ii) less than 1.5% across an entire wavelength range of from 540 nm to 870 nm; and (iii) less than 2.0% across an entire wavelength range of from 440 nm to 900 nm.

In embodiments, the article 10 at the optical coating 14 exhibits a first surface average reflectance of less than 3.5%, less than 3.0%, less than 2.5%, less than 2.0%, less than 1.5%, less than 1.2%, or less than 0.8% for all incidence angles less than or equal to 6 degrees relative to a normal of the first portion 16 across an entire wavelength range of from 840 nm to 860 nm. In embodiments, the article 10 at the optical coating 14 exhibits a first surface average reflectance of 0.45%, 0.50%, 0.55%, 0.60%, 0.65%, 0.70%, 0.75%, 0.80%, 0.90%, 1.0%, 1.3%, 1.5%, 2.0%, 2.5%, 3.0%, or 3.5%, or within any range bound by any two of those values (e.g., from 0.45% to 1.0%, from 0.5% to 2.0%, from 0.6% to 1.3%, and so on) for all incidence angles less than or equal to 6 degrees relative to a normal of the first portion 16 across an entire wavelength range of from 840 nm to 860 nm. In embodiments, the article 10 at the optical coating 14 exhibits a first surface average reflectance within a range of from 0.5% to 2.0% across an entire wavelength range of from 840 nm to 860 nm for an incidence angle within a range of from 0 degrees to 6 degrees relative to a normal of the first portion 16.

In embodiments, the article 10 at the optical coating 14 exhibits a first surface average reflectance of less than 1.5%, less than 1.6%, less than 1.7%, less than 1.8%, less than 1.9%, less than 2.0%, less than 2.5%, less than 3.0%, less than 3.5%, less than 4.0%, less than 4.5%, less than 5.0%, less than 5.5%, or less than 6.0% for all incidence angles less than or equal to 6 degrees relative to a normal of the first portion 16 across an entire wavelength range of from 930 nm to 950 nm. In embodiments, the article 10 exhibits a first surface average reflectance of 1.0%, 1.1%, 1.2%, 1.3%, 1.4%, 1.5%, 1.6%, 1.7%, 1.8%, 1.9%, 2.0%, 2.5%, 2.6%, 2.7%, 2.8%, 2.9%, 3.0%, 3.5%, 4.0%, 4.5%, 5.0%, 5.5%, 6.0%, or within any range bound by any two of those values (e.g., from 1.0 to 5.0%, from 1.5% to 4.0%, from 1.8% to 5.0%, from 1.7% to 2.9%, and so on) for all incidence angles less than or equal to 6 degrees relative to a normal of the first portion across an entire wavelength range of from 930 nm to 950 nm. In embodiments, the article 10 at the optical coating 14 exhibits a first surface average reflectance within a range from 1.0% to 5.0% across an entire wavelength range of from 930 nm to 950 nm for an incidence angle within a range of from 0 degrees to 6 degrees relative to a normal of the first portion 16.

In embodiments, the article 10 at the optical coating 14 exhibits a first surface average reflectance of less than 2.1%, less than 2.2%, less than 2.3%, less than 2.4%, less than 2.5%, less than 3.0%, less than 3.5%, less than 4.0%, less than 4.5%, less than 5.0%, less than 5.5%, less than 6.0%, less than 6.5%, less than 7.0%, less than 7.5%, or less than 7.7%, for all incidence angles less than or equal to 45 degrees relative to a normal of the first portion across an entire wavelength range of from 840 nm to 860 nm. In embodiments, the article 10 exhibits a first surface average reflectance of 2.0%, 2.1%, 2.2%, 2.3%, 2.4%, 2.5%, 3.0%, 3.5%, 4.0%, 4.5%, 5.0%, 5.5%, 6.0%, 6.5%, 7.0%, 7.5%, or 7.7%, or within any range bound by any two of those values (e.g., from 2.0% to 6.5%, from 3.0% to 7.5%, from 2.0% to 3.5%, and so on), for all incidence angles less than or equal to 45 degrees relative to a normal of the first portion across an entire wavelength range of from 840 nm to 860 nm.

In embodiments, the article 10 at the optical coating 14 exhibits a first surface average reflectance of less than 4.4%, less than 4.5%, less than 4.6%, less than 4.7%, less than 4.8%, less than 4.9%, less than 5.0%, less than 5.1%, less than 6.0%, less than 7.0%, less than 8.0%, less than 9.0%, less than 10%, or less than 11%, for all incidence angles less than or equal to 45 degrees relative to a normal of the first portion across an entire wavelength range of from 930 nm to 950 nm. In embodiments, the article 10 at the optical coating 14 exhibits a first surface average reflectance of 4.3%, 4.4%, 4.5%, 4.6%, 4.7%, 4.8%, 4.9%, 5.0%, 5.1%, 6.0%, 7.0%, 8.0%, 9.0%, 10%, or 11%, or within any range bound by any two of those values (e.g., from 4.3% to 11%, from 4.5% to 7.0%, from 4.3% to 6.1%, and so on), for all incidence angles less than or equal to 45 degrees relative to a normal of the first portion across an entire wavelength range of from 930 nm to 950 nm.

In embodiments, for an incidence angle normal of the first portion 16, the article 10 through the optical coating 14 exhibits a two surface average photopic transmittance of greater than 94.0%, greater than 94.5%, or greater than 95%. In embodiments, for an incidence angle normal of the first portion 16, the article 10 through the optical coating 14 exhibits a two surface average photopic transmittance of 94.5%, 94.6%, 94.7%, 94.8%, 94.9%, 95.0%, 95.1%, 95.2%, 95.3%, 95.4%, or 95.5%, or within any range bound by any two of those values (e.g., from 94.9% to 95.2%, from 94.9% to 95.1%, from 94.5% to 95.5%, and so on).

In embodiments, for an incidence angle normal to the first portion 16, the article 10 through the optical coating 14 exhibits a two surface transmittance greater than 93%, greater than 94%, or greater than 95%, across an entire wavelength range of from 840 nm to 860 nm. In embodiments, for an incidence angle normal to the first portion 16, the article 10 through the optical coating 14 exhibits a two surface transmittance of 93%, 94%, 94.5%, 94.6%, 94.7%, 94.8%, 94.9%, 95.0%, 95.1%, 95.2%, 95.3%, 95.4%, 95.5%, 95.6%, 95.7%, or 96%, or within any range bound by any two of those values (e.g., 93% to 96%, 94% to 95.7%, from 94.5% to 95.9%, and so on), across an entire wavelength range of from 840 nm to 860 nm.

In embodiments, for an incidence angle normal to the first portion 16, the article 10 through the optical coating 14 exhibits a two surface transmittance greater than 90%, greater than 92%, or greater than 94%, across an entire wavelength range of from 930 nm to 950 nm. In embodiments, for an incidence angle normal to the first portion 16, the article 10 through the optical coating 14 exhibits a two surface transmittance of 90%, 92%, 93.0%, 93.5%, 94.0%, 94.1%, 94.2%, 94.3%, 94.4%, 94.5%, 94.6%, 94.7%, 94.8%, 94.9%, or 95.0%, or within any range bound by any two of two of those values (e.g., from 90% to 95.0%, from 94.2% to 94.8%, from 93.0% to 95.0%, and so on), across an entire wavelength range of from 930 nm to 950 nm.

As used herein, the term "transmittance" is defined as the percentage of incident optical power within a given wavelength range transmitted through a material (e.g., the article 10, the substrate 12, or the optical coating 14 or portions thereof). The average photopic transmittance is defined in the below equation as the spectral transmittance, R(λ) multiplied by the illuminant spectrum, I(λ) and the CIE's color matching function $\bar{y}(\lambda)$, related to the eye's spectral response:

$$\langle T_p \rangle = \int_{380\ nm}^{720\ nm} T(\lambda) \times I(\lambda) \times \bar{y}(\lambda) d\lambda$$

EXAMPLES

All of the examples below rely upon transfer matrix modeling techniques to model the electromagnetic radiation transmittance and reflectance performance of the article with the optical coating described therein. More specifically, computations were performed utilizing the thin film design program "Essential Macleod" available from Thin Film Center, Inc. of Tucson AZ. The inventors to this disclosure understand from past efforts that high volume manufacturing and lab experiments match the modeled results described herein.

Figure 7A:
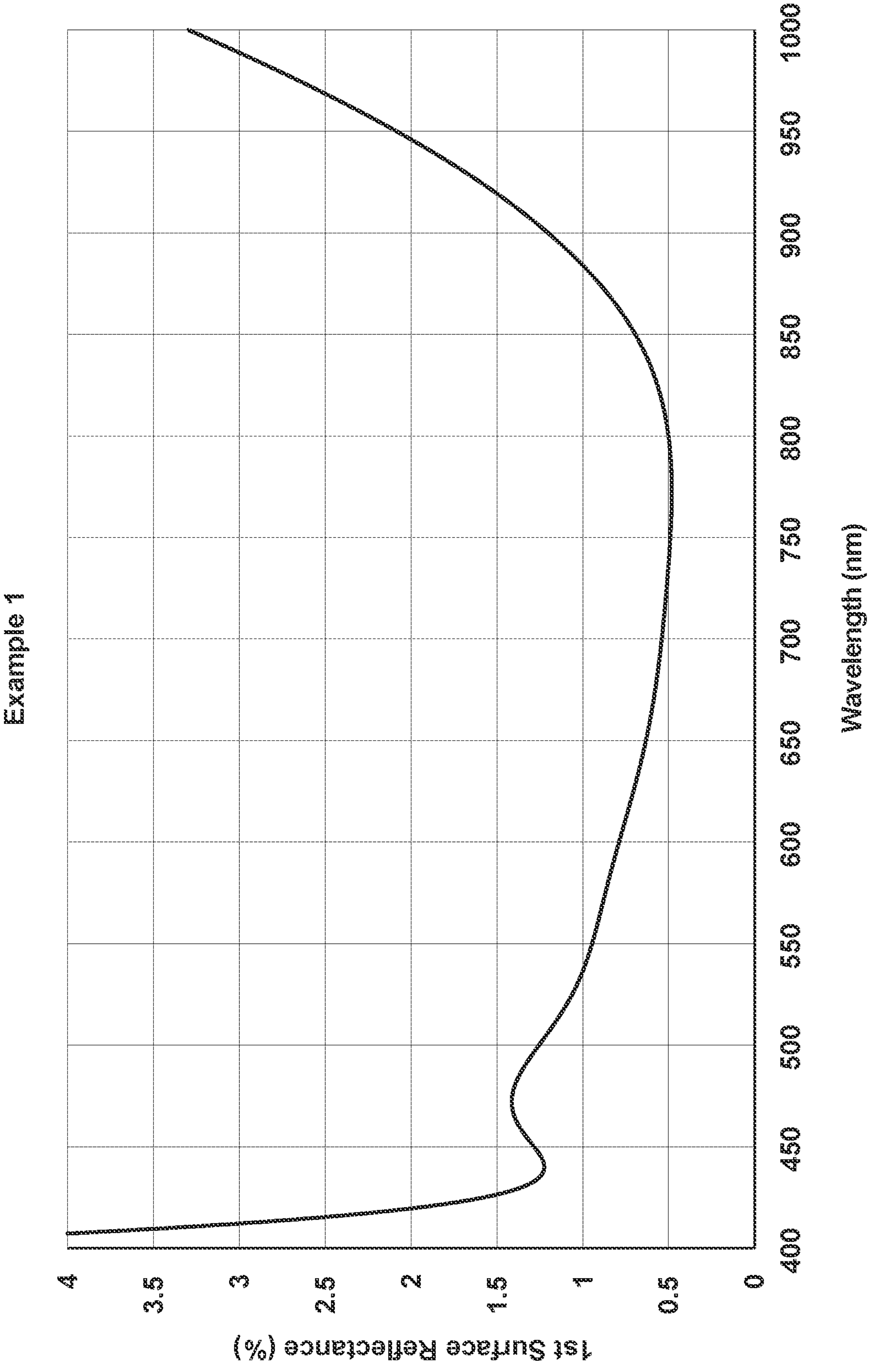
FIG. 7A, pertaining to the article of Example 1 with a five layer optical coating, is a graph that plots first surface reflectance as a function of wavelength of electromagnetic radiation, illustrating that the article reflects less than 1.5% of incident electromagnetic radiation across an entire wavelength range of from at least 430 nm to about 910 nm, the latter endpoint of the range being within the infrared spectrum.

Example 1—For Example 1 (FIGS. 7A and 7B), an article was modeled with an optical coating and substrate having the attributes set forth in Table 1 below. "Ambient" refers to the modeled external environment. Refractive index values for materials of the coatings were experimentally derived or found in available literature.

TABLE 1

| Component | Composition | Refractive Index | Thickness (nm) |
|---|---|---|---|
| Substrate | Glass | 1.510 | |
| $1^{st}$ Layer | $SiO_2$ | 1.476 | 217.0 |
| $2^{nd}$ Layer | $SiN_x$ | 2.013 | 17.6 |
| $3^{rd}$ Layer | $SiO_2$ | 1.476 | 39.5 |
| $4^{th}$ Layer | $SiN_x$ | 2.013 | 147.4 |
| $5^{th}$ Layer | $SiO_2$ | 1.476 | 102.2 |
| Ambient | Air | 1.0 | |
| Total Thickness | | | 523.7 |

The optical coating of Example 1 utilizes only five layers and has a relatively thin overall thickness of 523.7 nm, reducing deposition cost and time compared to optical coatings that (i) utilize more layers, such as 10, 20, or even 30 or more layers, and (ii) have a thicker total thickness. The first layer disposed closest to the substrate is relatively large, at 217.0 nm.

The layers of the high refractive index material $SiN_x$ (i.e., the $2^{nd}$ layer and the $4^{th}$ layer) collectively form 31.5% of the total thickness of the optical coating. The layer of the high refractive index material $SiN_x$ disposed furthest from the substrate (i.e., the $4^{th}$ layer) has a thickness of 147.4 nm. The thickness of the $4^{th}$ layer of the high refractive index material $SiN_x$ is 59% of the combined thicknesses of the two layers of the optical coating disposed furthest from the substrate (i.e., the $4^{th}$ layer and the $5^{th}$ layer). The thickness of the high refractive index material $SiN_x$ of the $4^{th}$ layer makes up 59% of the 250 nm of total thickness of the optical coating disposed furthest from the substrate (i.e., the $5^{th}$ layer, the $4^{th}$ layer, and 0.4 nm of the $3^{rd}$ layer). Based on the inventors' prior experience and empirical modeling based on similar coating structures, these attributes of the optical coating are predicted to impart the article with a maximum hardness value within a range of from 8.5 GPa to 10.5 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 7A. As the graph illustrates, the article exhibits (i) a reflectance of less than 1% across an entire wavelength range of at least from 550 nm to 875 nm, (ii) a reflectance of less than 1.5% across an entire wavelength range of at least from 430 nm to 910 nm, and (iii) a reflectance of less than 2% across an entire wavelength range of at least from 430 nm to 940 nm.

Next, the first surface reflected color (from a D65 illuminant) of the modeled article of Example 1 as a function of viewing angles within a range of from 0 degrees to 90 degrees relative to a normal of the substrate, and as a function of the thickness scaling factor of the total thickness of the optical coating, was calculated. The results are set forth at the graph of FIG. 7B. Each line in the figure represents a different thickness scaling factor, and each individual line represents the color for all viewing angles within a range of from 0 to 90 degrees relative to the normal of the substrate. Calculating the first surface reflected color as a function of the thickness scaling factor allows for a determination of how a viewer would perceive first surface reflected color across the entire modeled article that includes both the first portion (e.g., a substantially planar), where the total thickness of the optical coating has a maximum value, and the second portion (e.g., curved or faceted) of the substrate, where the total thickness of the optical coating is less than the total thickness of the optical coating at the first portion. In other words, calculating the first surface reflected color as a function of the thickness scaling factor demonstrates how first surface reflected color changes as a function of the total thickness of the optical coating, such as at the first. substantially planar, portion versus the second, curved or faceted, portion of the substrate. Each curve represents the calculated color range for a different thickness scaling factor. The thickness scaling factors utilized are identified on the graph. For example, the label of "1" means 100% of the modeled total thickness of the optical coating, which represents the first portion (e.g., substantially planar) of the substrate of the article. The labels of 0.95 means 95% of the modeled total thickness of the optical coating, 0.90 means 90% of the modeled total thickness of the optical coating, and so on. The modeled total thicknesses of the optical coating that are less than 100% represent various potential versions or positions along the second portion (e.g., curved or faceted) of the substrate of the article.

Figure 7B:
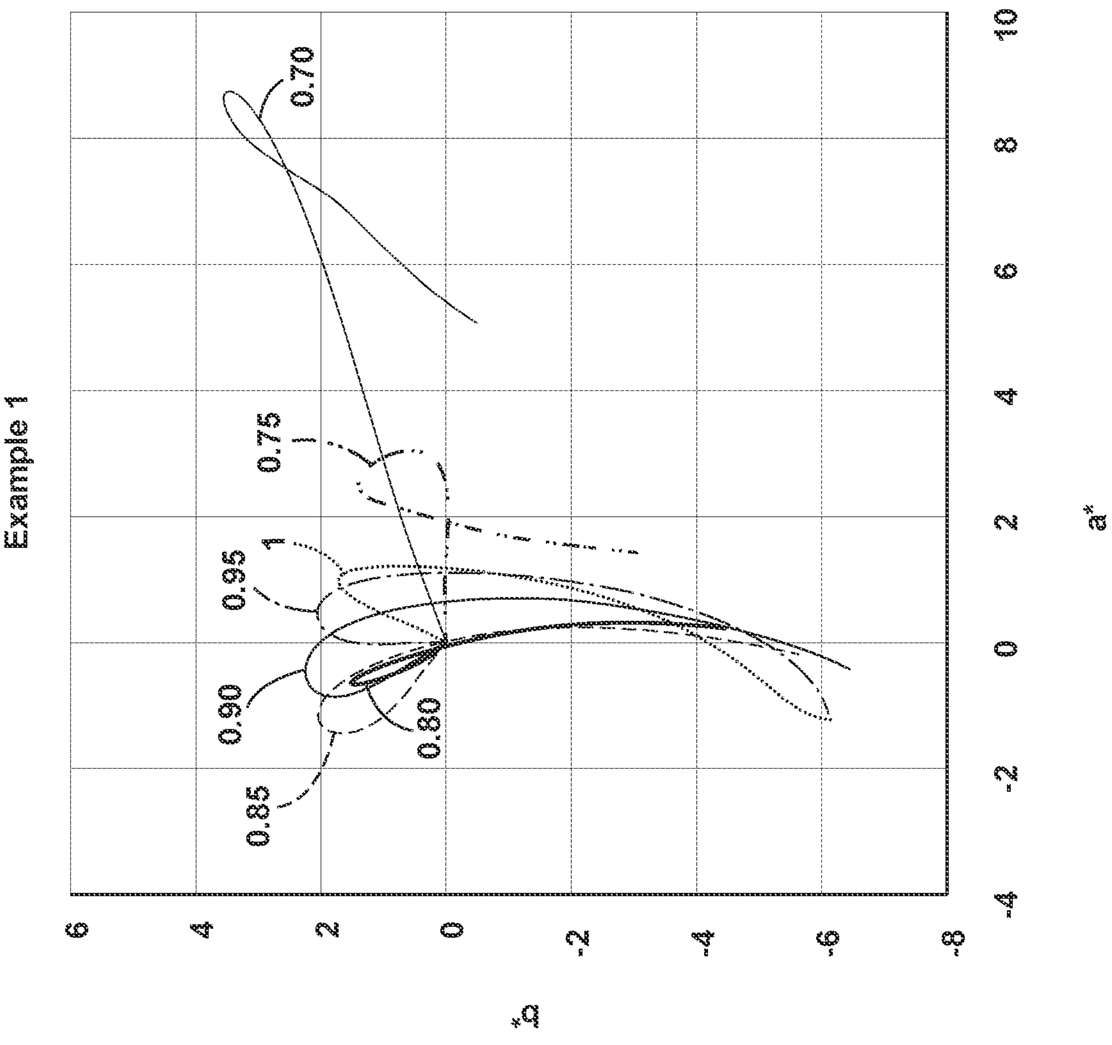
FIG. 7B, also pertaining to the article of Example 1, is a graph that plots first surface reflectance color coordinate values a* and b* as a function of viewing angle of the optical coating and thickness scaling factor, illustrating that the optical coating (i) limits reflected color coordinate a* to within a range of from about −1.5 to about +1.5 and (ii) limits reflected color coordinate b* to within a range of from about −7.0 to about +2.5, a all viewing angles within a range of from 0 to 90 degrees, and at all thickness scaling factors greater than or equal to 0.8.

As the graph of FIG. 7B illustrates, first surface reflected color changes only minimally for all viewing angles within the range of from 0 degrees to 90 degrees relative to the normal of the substrate, and at all thickness scaling factors from 0.80 to 1. In other words, the first surface reflected color that a viewer would perceive for the article with the optical coating having the thickness scaling factor of 1 (e.g., at the substantially planar portion of the substrate), across all viewing angles within the range of from 0 degrees to 90 degrees, is about the same as the first surface reflected color that the viewer would perceive for the article with the optical coating having scaling factors down to 0.80 (e.g., at the curved or faceted portion of the substrate). Further, from viewing angles within a range of 0 to 10 degrees relative to a normal of the substrate, the first surface reflected color is within a range of from −2 to +2 for a* and from −8 to −2 for b* for all thickness scaling factors from 1 down to 0.75, corresponding to an article surface angle range of from 0 degrees to 55 degrees. Finally, the article of Example 1 maintains first surface reflected color within a range of from −2 to +3 for a* and from −8 to +2.5 for b* for all viewing angles within a range from 0 degrees to 90 degrees relative to a normal of the substrate for all thickness scaling factors from 1 down to 0.75, which again corresponds to an article surface angle range of from 0 degrees to 55 degrees.

Further, the first surface average photopic percentage reflectance and color coordinates as a function of incident light angle (for D65 illuminant) and the thickness scaling factor of the optical coating of the modeled article were calculated. The results are set forth in Table 2 below.

TABLE 2

| Thickness scaling factor | Light incidence angle | R % (photopic, Y) | L | a* | b* |
|---|---|---|---|---|---|
| 1 | 0 | 0.993 | 8.93 | −1.23 | −6.14 |
| | 30 | 0.896 | 8.10 | −0.16 | −4.43 |
| | 45 | 1.431 | 12.16 | 1.05 | −1.08 |
| | 60 | 4.756 | 26.03 | 1.14 | 1.52 |
| 0.95 | 0 | 0.872 | 7.88 | −1.13 | −6.11 |
| | 30 | 0.837 | 7.56 | 0.42 | −4.18 |
| | 45 | 1.447 | 12.27 | 1.11 | −0.16 |
| | 60 | 4.882 | 26.40 | 0.65 | 1.99 |
| 0.9 | 0 | 0.762 | 6.89 | −0.42 | −6.44 |
| | 30 | 0.793 | 7.16 | 0.51 | −3.18 |
| | 45 | 1.477 | 12.46 | 0.52 | 0.81 |
| | 60 | 4.987 | 26.70 | −0.43 | 2.25 |

TABLE 2-continued

| Thickness scaling factor | Light incidence angle | R % (photopic, Y) | L | a* | b* |
|---|---|---|---|---|---|
| 0.85 | 0 | 0.666 | 6.02 | −0.19 | −5.62 |
| | 30 | 0.765 | 6.91 | 0.24 | −1.96 |
| | 45 | 1.505 | 12.64 | −0.45 | 1.37 |
| | 60 | 5.037 | 26.84 | −1.35 | 1.95 |
| 0.8 | 0 | 0.592 | 5.35 | 0.23 | −4.44 |
| | 30 | 0.752 | 6.79 | 0.16 | −1.04 |
| | 45 | 1.528 | 12.79 | −0.53 | 1.37 |
| | 60 | 5.061 | 26.91 | −0.59 | 1.08 |
| 0.75 | 0 | 0.558 | 5.04 | 1.42 | −3.06 |
| | 30 | 0.775 | 7.00 | 1.91 | −0.01 |
| | 45 | 1.607 | 13.27 | 2.51 | 1.40 |
| | 60 | 5.227 | 27.37 | 3.03 | 0.67 |
| 0.7 | 0 | 0.617 | 5.57 | 5.07 | −0.49 |
| | 30 | 0.934 | 8.43 | 7.53 | 2.58 |
| | 45 | 1.926 | 15.09 | 8.67 | 3.55 |
| | 60 | 5.860 | 29.06 | 8.15 | 2.89 |

As Table 2 reveals, the modeled article exhibits a first surface average photopic reflectance of less than 1% for all incidence angles within a range of from 0 degrees to 30 degrees relative to a normal of the surface of the substrate at any position along the surface of the substrate where the thickness scaling factor is within a range of from 0.7 to 1 (i.e., at all thicknesses of the optical coating from 70% of the total thickness to the total thickness as modeled). The average photopic reflectance is less than 1.7% for all incidence angles within a range of from 0 degrees to 45 degrees relative to a normal of the surface of the substrate, and at all thickness scaling factors within a range of from 0.75 to 1. The average photopic reflectance is less than 2.0% for all incidence angles within a range of from 0 degrees to 45 degrees relative to a normal of the surface of the substrate, and at all scaling factors within a range of from 0.7 to 1. The average photopic reflectance is less than 5.3% for all incidence angles within a range of from 0 degrees to 60 degrees relative to a normal of the surface of the substrate, and at all thickness scaling factors within a range of from 0.75 to 1. The average photopic reflectance is less than 5.9% for all incidence angles within a range of from 0 degrees to 60 degrees relative to a normal of the surface of the substrate, and at all thickness scaling factors within a range of from 0.7 to 1.

The first surface percentage reflectance, color coordinates, and two surface percentage transmittance of the modeled article were calculated. The results are set forth in Tables 3-5 below. For the percentage reflectance, photopic values are reported for visible light, while particular wavelength ranges are reported within the infrared region.

TABLE 3

| 1$^{st}$ surface Reflectance % average | 6° | 20° | 40° | 45° | 60° |
|---|---|---|---|---|---|
| R % (photopic, Y) | 0.98 | 0.91 | 1.12 | 1.43 | 4.76 |
| R % (840-860 nm) | 0.70 | 0.85 | 1.84 | 2.46 | 7.03 |
| R % (930-950 nm) | 1.88 | 2.27 | 4.14 | 5.08 | 10.85 |

TABLE 4

| $1^{st}$ surface Reflected Lightness and Color metrics | 6° | 20° | 40° | 45° | 60° |
|---|---|---|---|---|---|
| L* | 8.85 | 8.20 | 9.92 | 12.16 | 26.03 |
| a* | −1.22 | −0.91 | 0.76 | 1.05 | 1.14 |
| b* | −6.07 | −5.42 | −2.40 | −1.08 | 1.52 |

TABLE 5

| 2 surface Transmitted light metrics, optical coating on 1 surface only | 0° |
|---|---|
| T % (photopic, Y) | 94.99 |
| T % (840-860 nm) | 95.40 |
| T % (930-950 nm) | 94.35 |
| L* | 98.03 |
| a* | 0.04 |
| b* | 0.44 |

As Table 3 reveals, the reflectance of the article for infrared electromagnetic radiation within a range of from 840 nm to 860 nm is less than 0.75% for incidence angles of 6 degrees or less relative to a normal of the first major surface of the substrate. Further, the reflectance for that wavelength range is less than 2.5% for incidence angles of 45 degrees or less relative to a normal of the first major surface of the substrate.

As Table 5 reveals, the average transmittance through the article at 0 degrees incidence (normal to the first major surface of the substrate) is greater than 94% for visible light, above 95% for infrared radiation within the wavelength range of from 840 nm to 860 nm, and above 95% for infrared radiation within the wavelength range of from 930 nm to 950 nm. Because transmittance was calculated as a two surface metric with the optical coating disposed on the first surface and the second surface being uncoated but having a reflectance of 4%, the maximum possible values for transmittance as reported in Table 5 were 96%.

Figure 8A:
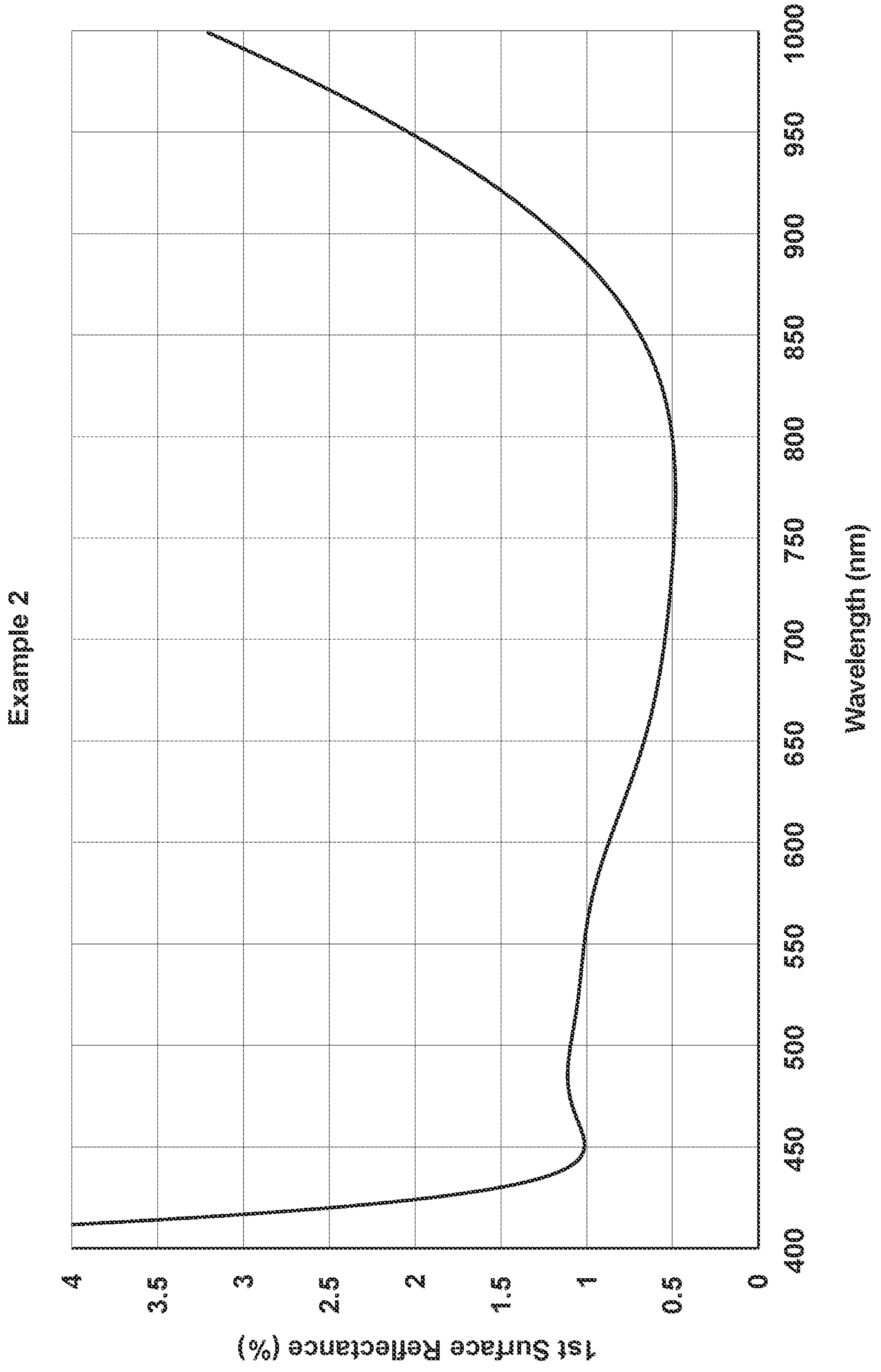
FIG. 8A, pertaining to the article of Example 2 with a five layer optical coating, is a graph that plots first surface reflectance as a function of wavelength of electromagnetic radiation, illustrating that the article reflects less than 1.5% of incident electromagnetic radiation across an entire wavelength range of from at least 430 nm to 920 nm, the latter of which is within the infrared spectrum.

Example 2—For Example 2 (FIGS. 8A and 8B), an article was modeled with an optical coating and a substrate having the attributes set forth in Table 6 below.

TABLE 6

| Component | Composition | Refractive Index | Thickness (nm) |
|---|---|---|---|
| Substrate | Glass | 1.510 | |
| $1^{st}$ Layer | $SiO_2$ | 1.476 | 215.0 |
| $2^{nd}$ Layer | $SiN_x$ | 2.013 | 17.0 |
| $3^{rd}$ Layer | $SiO_2$ | 1.476 | 41.2 |
| $4^{th}$ Layer | $SiN_x$ | 2.013 | 149.4 |
| $5^{th}$ Layer | $SiO_2$ | 1.476 | 102.2 |
| Ambient | Air | 1.0 | |
| Total Thickness | | | 524.8 |

The optical coating of Example 2 utilizes only five layers and has a relatively thin overall thickness of 524.8 nm, reducing deposition cost and time compared to optical coatings that (i) utilize more layers, such as 10, 20, or even 30 or more layers, and (ii) have a thicker total thickness. The first layer disposed closest to the substrate is relatively large, at 215.0 nm.

The thicknesses of the layers of the high refractive index material $SiN_x$ (i.e., the $2^{nd}$ layer and the $4^{th}$ layer) are collectively 31.7% of the total thickness of the optical coating. The layer of the high refractive index material $SiN_x$ disposed furthest from the substrate (i.e., the $4^{th}$ layer) has a thickness of 149.4 nm. The thickness of the $4^{th}$ layer of the high refractive index material $SiN_x$ is 59% of the combined thicknesses of the two layers of the optical coating disposed furthest from the substrate (i.e., the $4^{th}$ layer and the $5^{th}$ layer). The 250 nm of total thickness of the optical coating disposed furthest from the substrate (i.e., the $5^{th}$ layer and 147.8 nm of the $4^{th}$ layer) is 59% high refractive index material $SiN_x$. Based on the inventors' prior experience, these attributes of the optical coating are predicted to impart to the article a maximum hardness value within a range of from 8.5 GPa to 10.5 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 8A. As the graph illustrates, the article exhibits (i) a reflectance of less than 1% across an entire wavelength range of at least from 550 nm to 875 nm, (ii) a reflectance of less than 1.5% across an entire wavelength range of at least from 430 nm to 920 nm, and (iii) a reflectance of less than 2% across an entire wavelength range of at least from 430 nm to at least 940 nm.

Figure 8B:
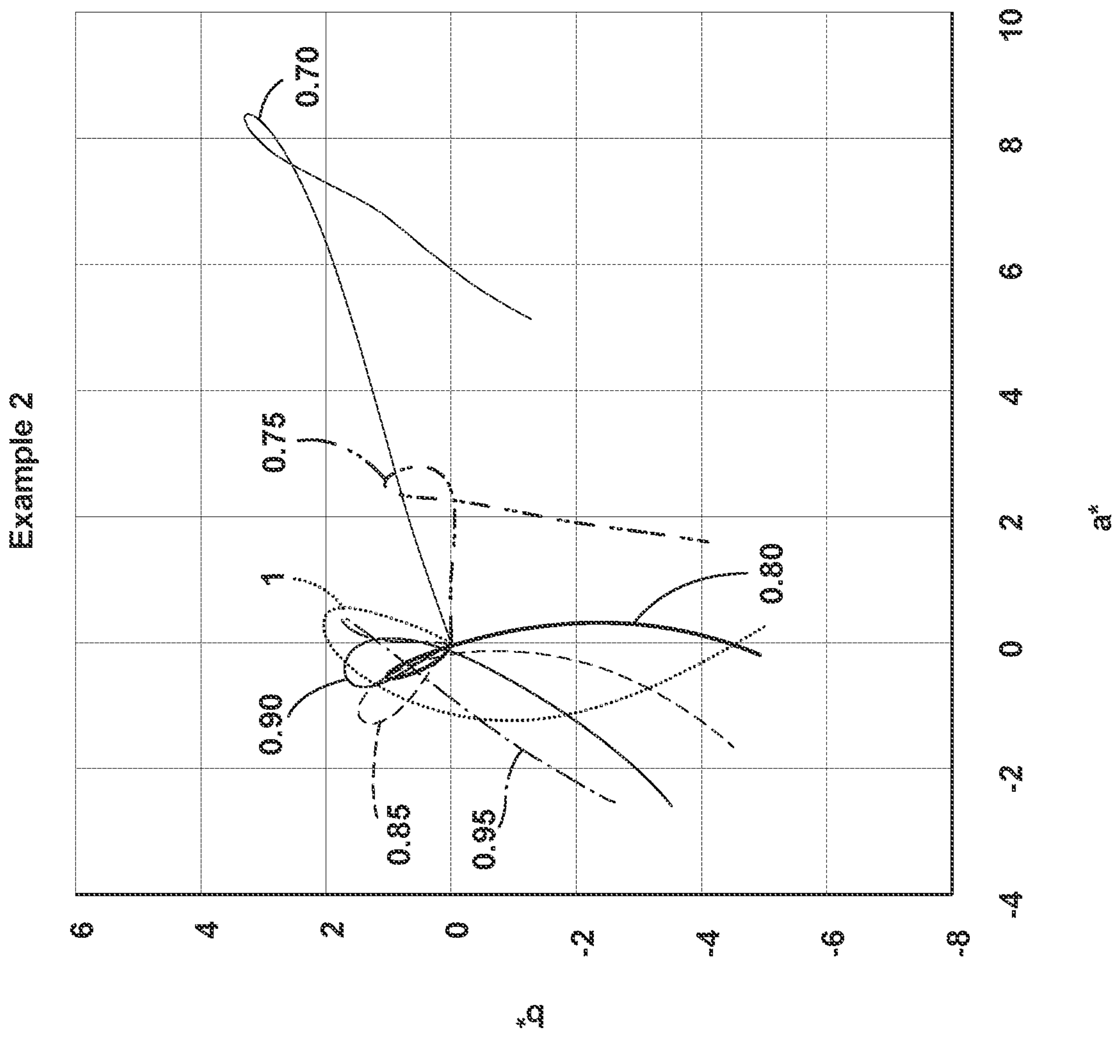
FIG. 8B, also pertaining to the article of Example 2, is a graph that plots first surface reflectance color coordinate values a* and b* as a function of viewing angle of the optical coating and thickness scaling factor, illustrating that the optical coating (i) limits reflected color coordinate a* to within a range of from about −3 to about +1 and (ii) limits reflected color coordinate b* to within a range of from about −5 to about +2, for all viewing angles within a range of from 0 to 90 degrees, and at all thickness scaling factors greater than or equal to 0.8.

Next, the first surface reflected color (from a D65 illuminant) of the modeled article of Example 2 as a function of viewing angles within a range of from 0 degrees to 90 degrees relative to a normal of the substrate, and as a function of the thickness scaling factor of the total thickness of the optical coating, was calculated. The results are set forth at the graph of FIG. 8B. As the graph of FIG. 8B illustrates, from viewing angles within a range of from 0 to 10 degrees relative to a normal of the substrate, the first surface reflected color is within a range of from −3 to +2 for a* and from −6 to −2 for b*, at all thickness scaling factors from 1 down to 0.75, corresponding to an article surface angle range of from 0 degrees to 55 degrees. Compared to the article of Example 1, the article of Example 2 exhibits slightly more neutral (less blue) color for near normal incidence. Further, the article of Example 2 maintains first surface reflected color within a range of from −3 to +3 for a* and from −6 to +2.1 for b*, for all viewing angles within a range of from 0 degrees to 90 degrees relative to a normal of the substrate for all thickness scaling factors from 1 down to 0.75, which again corresponds to an article surface angle range of from 0 degrees to 55 degrees.

Further, he first surface average photopic percentage reflectance and color coordinates as a function of incident light angle (for D65 illuminant) and the thickness scaling factor of the optical coating of the modeled article were calculated. The results are set forth in Table 7 below.

TABLE 7

| Thickness scaling factor | Light incidence angle | R % (photopic, Y) | L | a* | b* |
|---|---|---|---|---|---|
| 1 | 0 | 0.999 | 8.99 | 0.27 | −5.01 |
| | 30 | 0.936 | 8.45 | −1.22 | −1.23 |
| | 45 | 1.486 | 12.52 | −0.58 | 1.34 |
| | 60 | 4.816 | 26.21 | 0.41 | 2.03 |

TABLE 7-continued

| Thickness scaling factor | Light incidence angle | R % (photopic, Y) | L | a* | b* |
|---|---|---|---|---|---|
| 0.95 | 0 | 0.912 | 8.23 | −2.52 | −2.62 |
| | 30 | 0.885 | 8.00 | −1.68 | −1.14 |
| | 45 | 1.492 | 12.56 | −0.16 | 0.93 |
| | 60 | 4.919 | 26.50 | 0.42 | 1.76 |
| 0.9 | 0 | 0.811 | 7.33 | −2.58 | −3.52 |
| | 30 | 0.834 | 7.53 | −1.09 | −1.79 |
| | 45 | 1.506 | 12.65 | 0.05 | 0.61 |
| | 60 | 5.008 | 26.76 | −0.29 | 1.69 |
| 0.85 | 0 | 0.705 | 6.37 | −1.64 | −4.52 |
| | 30 | 0.790 | 7.14 | −0.33 | −2.22 |
| | 45 | 1.521 | 12.74 | −0.30 | 0.54 |
| | 60 | 5.050 | 26.88 | −1.12 | 1.48 |
| 0.8 | 0 | 0.615 | 5.56 | −0.18 | −4.94 |
| | 30 | 0.764 | 6.90 | 0.33 | −2.05 |
| | 45 | 1.536 | 12.83 | −0.26 | 0.63 |
| | 60 | 5.070 | 26.93 | −0.54 | 0.87 |
| 0.75 | 0 | 0.567 | 5.12 | 1.62 | −4.11 |
| | 30 | 0.779 | 7.03 | 2.13 | −0.88 |
| | 45 | 1.606 | 13.27 | 2.45 | 1.02 |
| | 60 | 5.222 | 27.36 | 2.81 | 0.59 |
| 0.7 | 0 | 0.615 | 5.56 | 5.16 | −1.27 |
| | 30 | 0.926 | 8.36 | 7.37 | 2.09 |
| | 45 | 1.908 | 15.00 | 8.35 | 3.30 |
| | 60 | 5.822 | 28.96 | 7.86 | 2.70 |

As Table 7 reveals, the modeled article exhibits an average photopic reflectance of less than 1% for all incidence angles within a range of from 0 degrees to 30 degrees relative to a normal of the surface of the substrate at any position along the surface of the substrate where the thickness scaling factor is within a range of from 0.7 to 1 (i.e., at all thicknesses of the optical coating from 70% of the total thickness to the total thickness as modeled). The average photopic reflectance is less than 1.7% for all incidence angles within a range of from 0 degrees to 45 degrees, and at all thickness scaling factors within a range of from 0.75 to 1. The average photopic reflectance is less than 2.0% for all incidence angles within a range of from 0 degrees to 45 degrees relative to a normal of the surface of the substrate, and at all thickness scaling factors within a range of from 0.7 to 1. The average photopic reflectance is less than 5.3% for all incidence angles within a range of from 0 degrees to 60 degrees relative to a normal of the surface of the substrate, and at all thickness scaling factors within a range of from 0.75 to 1. The average photopic reflectance is less than 5.9% for all incidence angles within a range of from 0 degrees to 60 degrees relative to a normal of the surface of the substrate, and at all thickness scaling factors within a range of from 0.7 to 1.

The first surface percentage reflectance, color coordinates, and two surface percentage transmittance of the modeled article were calculated. The results are set forth in Tables 8-10 below. For the percentage reflectance, photopic values are reported for visible light, while particular wavelength ranges are reported within the infrared region.

TABLE 8

| $1^{st}$-surface Reflectance % average | 6° | 20° | 40° | 45° | 60° |
|---|---|---|---|---|---|
| R % (photopic, Y) | 0.99 | 0.93 | 1.17 | 1.49 | 4.82 |
| R % (840-860 nm) | 0.69 | 0.84 | 1.80 | 2.41 | 6.93 |
| R % (930-950 nm) | 1.82 | 2.21 | 4.03 | 4.97 | 10.70 |

TABLE 9

| $1^{st}$-surface Reflected Lightness and Color metrics | 6° | 20° | 40° | 45° | 60° |
|---|---|---|---|---|---|
| L* | 8.92 | 8.41 | 10.31 | 12.52 | 26.21 |
| a* | 0.14 | −0.76 | −0.94 | −0.58 | 0.41 |
| b* | −4.80 | −3.03 | 0.60 | 1.34 | 2.03 |

TABLE 10

| 2-surface Transmitted light metrics, optical coating on 1 surface only | 0° |
|---|---|
| T % (photopic, Y) | 94.98 |
| T % (840-860 nm) | 95.41 |
| T % (930-950 nm) | 94.40 |
| L* | 98.03 |
| a* | −0.03 |
| b* | 0.38 |

As Table 8 reveals, the reflectance of the article for infrared electromagnetic radiation within a range of from 840 nm to 860 nm is less than 0.7% for incidence angles of 6 degrees or less relative to a normal of the first major surface of the substrate. Further, the reflectance for that wavelength range is less than 2.5% for incidence angles of 45 degrees or less relative to a normal of the first major surface of the substrate.

As Table 10 reveals, the transmittance through the article at 0 degrees incidence (normal to the first major surface of the substrate) is greater than 94.5% for visible light, above 95% for infrared radiation within the wavelength range of from 840 nm to 860 nm, and above 94% for infrared radiation within the wavelength range of from 930 nm to 950 nm. Again, because transmittance was calculated as a two surface metric with the optical coating disposed on the first surface and the second surface being uncoated but having a reflectance of 4%, the maximum possible values for transmittance as reported in Table 10 was 96%.

Figure 9A:
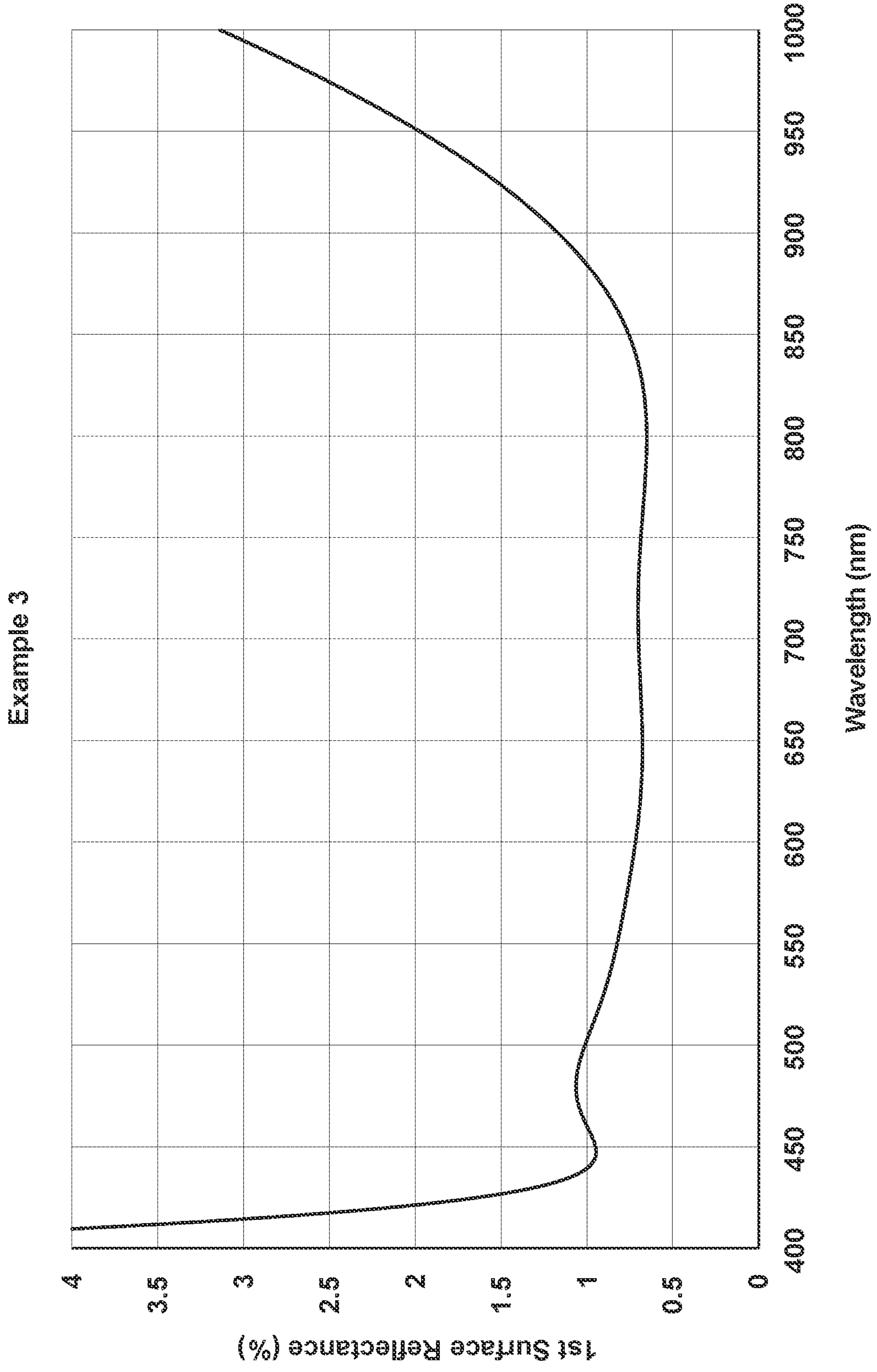
FIG. 9A, pertaining to the article of Example 3 with a five layer optical coating, is a graph that plots first surface reflectance as a function of wavelength of electromagnetic radiation, illustrating that the article reflects less than 1.5% of incident electromagnetic radiation across an entire wavelength range of from about 430 nm to about 920 nm, the latter of which is within the infrared spectrum.

Example 3—For Example 3 (FIGS. 9A and 9B), an article was modeled with an optical coating and substrate having the attributes set forth in Table 11 below.

TABLE 11

| Component | Composition | Refractive Index | Thickness (nm) |
|---|---|---|---|
| Substrate | Glass | 1.510 | |
| $1^{st}$ Layer | $SiO_2$ | 1.476 | 211.2 |
| $2^{nd}$ Layer | $SiN_x$ | 2.013 | 18.1 |
| $3^{rd}$ Layer | $SiO_2$ | 1.476 | 39.2 |
| $4^{th}$ Layer | $SiN_x$ | 2.013 | 150.8 |
| $5^{th}$ Layer | $SiO_2$ | 1.476 | 100.5 |
| Ambient | Air | 1.0 | |
| Total Thickness | | | 519.8 |

The optical coating of Example 3 utilizes only five layers and has a relatively thin overall thickness of 519.8 nm, reducing deposition cost and time compared to optical coatings that (i) utilize more layers, such as 10, 20, or even 30 or more layers, and (ii) have a thicker total thickness. The first layer disposed closest to the substrate is relatively large, at 211.2 nm.

The layers of the high refractive index material $SiN_x$ (i.e., the $2^{nd}$ layer and the $4^{th}$ layer) collectively form 32.5% of the total thickness of the optical coating. The layer of the high refractive index material $SiN_x$ disposed furthest from the substrate (i.e., the 4$^{th}$ layer) has a thickness of 150.8 nm. The thickness of the 4$^{th}$ layer of the high refractive index material $SiN_x$ is 60% of the combined thicknesses of the two layers of the optical coating disposed furthest from the substrate (i.e., the 4$^{th}$ layer and the 5$^{th}$ layer). The 250 nm of total thickness of the optical coating disposed furthest from the substrate (i.e., the 5$^{th}$ layer and 149.5 nm of the 4$^{th}$ layer) is 60% high refractive index material $SiN_x$. Based on the inventors' prior experience, these attributes of the optical coating are predicted to impart the article with a maximum hardness value within a range of from 8.5 GPa to 10.5 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 9A. As the graph illustrates, the article exhibits (i) a reflectance of less than 1% across an entire wavelength range of at least from 520 nm to 875 nm, (ii) a reflectance of less than 1.5% across an entire wavelength range of at least from 430 nm to 920 nm, and (iii) a reflectance of less than 2% across an entire wavelength range of at least from 425 nm to at least 940 nm.

Figure 9B:
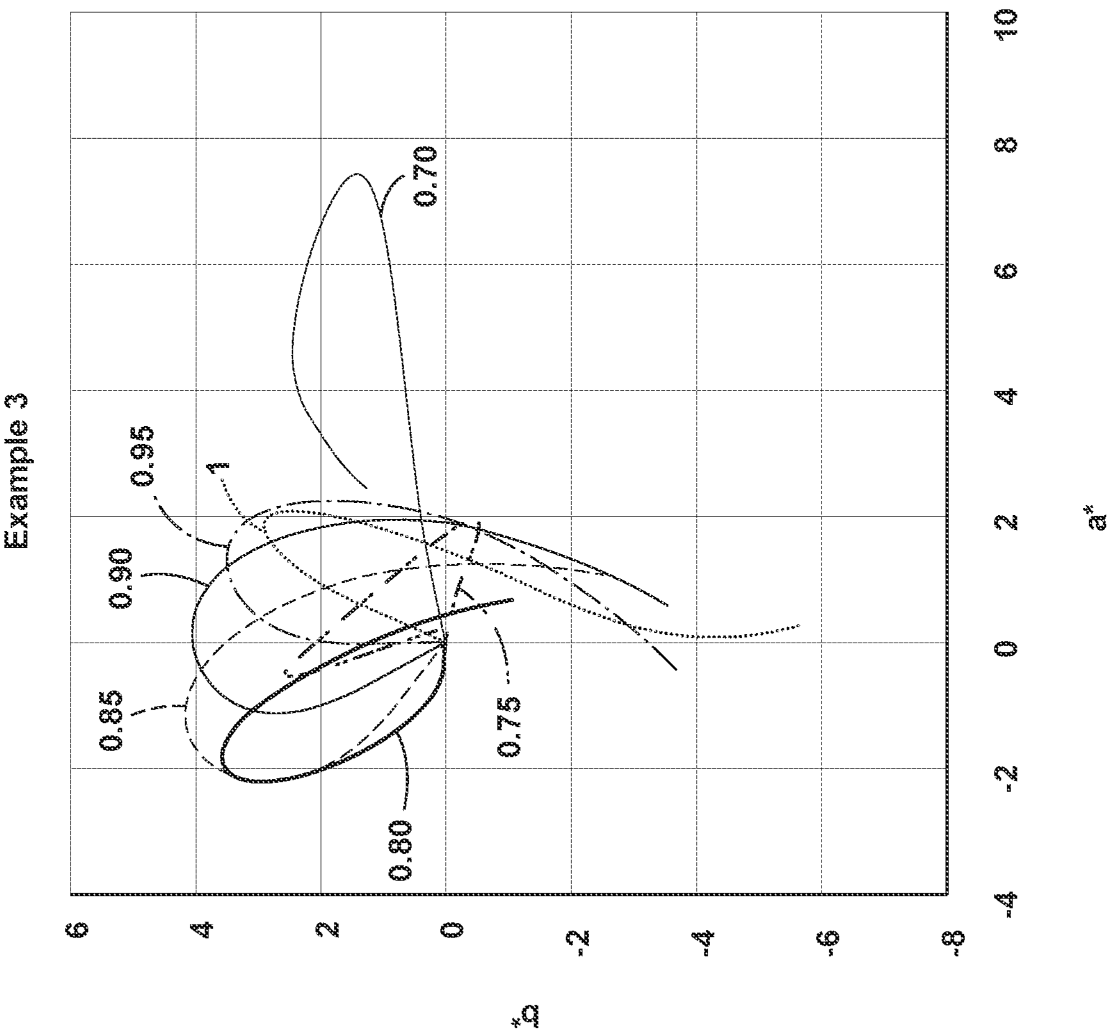
FIG. 9B, also pertaining to the article of Example 3, is a graph that plots first surface reflectance color coordinate values a* and b* as a function of viewing angle of the optical coating and thickness scaling factor, illustrating that the optical coating (i) limits reflected color coordinate a* to within a range of from about −2.5 to about +2.5 and (ii) limits reflected color coordinate b* to within a range of from about −6 to about +4, for all viewing angles within a range of from 0 to 90 degrees, and at all thickness scaling factors greater than or equal to 0.75.

Next, the first surface reflected color (from a D65 illuminant) of the modeled article of Example 3 as a function of viewing angles within a range of from 0 degrees to 90 degrees relative to a normal of the substrate, and as a function of the thickness scaling factor of the total thickness of the optical coating, was calculated. The results are set forth at the graph of FIG. 9B. As the graph of FIG. 9B illustrates, from viewing angles within a range of from 0 to 10 degrees relative to a normal of the substrate, the first surface reflected color is within a range of from −1 to +2 for a* and from −6 to +1 for b*, at all thickness scaling factors from 1 down to 0.75, corresponding to an article surface angle range of from 0 degrees to 55 degrees. Further, the article of Example 3 maintains first surface reflected color within a range of from −2.5 to +2.5 for a* and −6 to +4.5, for b* for all viewing angles within a range of from 0 degrees to 90 degrees relative to a normal of the substrate, and at all scaling factors from 1 down to 0.75, which again corresponds to an article surface angle range of from 0 degrees to 55 degrees.

Further, the first surface photopic percentage reflectance and color coordinates as a function of incident light angle (for D65 illuminant) and the thickness scaling factor of the optical coating of the modeled article were calculated. The results are set forth in Table 12 below.

TABLE 12

| Thickness scaling factor | Light incidence angle | R % (photopic, Y) | L | a* | b* |
|---|---|---|---|---|---|
| 1 | 0 | 0.852 | 7.70 | 0.26 | −5.63 |
| | 30 | 0.824 | 7.44 | 0.62 | −1.93 |
| | 45 | 1.443 | 12.24 | 1.93 | 1.48 |
| | 60 | 4.906 | 26.46 | 1.87 | 2.89 |
| 0.95 | 0 | 0.779 | 7.04 | −0.43 | −3.68 |
| | 30 | 0.819 | 7.40 | 1.47 | −1.15 |
| | 45 | 1.530 | 12.80 | 2.20 | 2.34 |
| | 60 | 5.124 | 27.09 | 1.15 | 3.47 |
| 0.9 | 0 | 0.728 | 6.58 | 0.58 | −3.54 |
| | 30 | 0.843 | 7.61 | 1.89 | −0.02 |
| | 45 | 1.635 | 13.44 | 1.22 | 3.45 |

TABLE 12-continued

| Thickness scaling factor | Light incidence angle | R % (photopic, Y) | L | a* | b* |
|---|---|---|---|---|---|
| | 60 | 5.307 | 27.59 | −0.51 | 3.85 |
| 0.85 | 0 | 0.701 | 6.33 | 1.07 | −2.51 |
| | 30 | 0.884 | 7.99 | 1.01 | 1.45 |
| | 45 | 1.724 | 13.96 | −0.76 | 4.07 |
| | 60 | 5.391 | 27.82 | −2.13 | 3.33 |
| 0.8 | 0 | 0.696 | 6.28 | 0.67 | −1.06 |
| | 30 | 0.922 | 8.32 | −0.64 | 2.43 |
| | 45 | 1.766 | 14.21 | −2.07 | 3.46 |
| | 60 | 5.384 | 27.80 | −1.91 | 1.70 |
| 0.75 | 0 | 0.704 | 6.36 | 0.18 | 0.15 |
| | 30 | 0.953 | 8.59 | −0.54 | 2.40 |
| | 45 | 1.805 | 14.43 | 0.15 | 1.89 |
| | 60 | 5.446 | 27.97 | 1.61 | 0.13 |
| 0.7 | 0 | 0.754 | 6.81 | 2.44 | 1.26 |
| | 30 | 1.061 | 9.49 | 4.50 | 2.44 |
| | 45 | 2.027 | 15.63 | 6.74 | 1.93 |
| | 60 | 5.924 | 29.22 | 7.28 | 1.22 |

Although not specifically set forth in Table 12, the modeled article exhibits an average photopic reflectance of less than 0.90%, for incidence angles within a range of from 0 degrees to 10 degrees, and at all thickness scaling factors within a range of from 0.7 to 1 (i.e., for all thicknesses of the optical coating from 70% of the total thickness to the total thickness as modeled). In addition, as set forth in Table 12, the modeled article exhibits an average photopic reflectance of less than 1.1%, for all incidence angles within a range of from 0 degrees to 30 degrees relative to a normal of the surface of the substrate at any position along the surface of the substrate where the thickness scaling factor is within a range of from 0.7 to 1 (i.e., at all thicknesses of the optical coating from 70% of the total thickness to the total thickness as modeled). Further, the modeled article exhibits an average photopic reflectance of less than 1.9%, for all incidence angles within a range of from 0 degrees to 45 degrees relative to a normal of the surface of the substrate at any position along the surface of the substrate where the thickness scaling factor is within a range from 0.75 to 1. The average photopic reflectance is less than 2.1%. for all incidence angles within a range of from 0 degrees to 45 degrees relative to a normal of the surface of the substrate, and at all thickness scaling factors within a range of from 0.70 to 1. The average photopic reflectance is less than 5.5% relative to a normal of the surface of the substrate, for all incidence angles within a range of from 0 degrees to 60 degrees relative to a normal of the surface of the substrate, and at all thickness scaling factors within a range of from 0.75 to 1. The average photopic reflectance is less than 6.0%, for all incidence angles within a range of from 0 degrees to 60 degrees relative to a normal of the surface of the substrate, and at all thickness scaling factors within a range of from 0.7 to 1.

The first surface percentage reflectance, color coordinates, and two surface percentage transmittance of the modeled article were calculated. The results are set forth in Tables 13-15 below. For the percentage reflectance, photopic values are reported for visible light, while particular wavelength ranges are reported within the infrared region.

TABLE 13

| 1st surface Reflectance % average | 6° | 20° | 40° | 45° | 60° |
|---|---|---|---|---|---|
| R % (photopic, Y) | 0.85 | 0.80 | 1.10 | 1.44 | 4.91 |
| R % (840-860 nm) | 0.76 | 0.89 | 1.80 | 2.38 | 6.86 |
| R % (930-950 nm) | 1.79 | 2.15 | 3.95 | 4.88 | 10.59 |

TABLE 14

| 1st surface Reflected Lightness and Color metrics | 6° | 20° | 40° | 45° | 60° |
|---|---|---|---|---|---|
| L* | 7.63 | 7.21 | 9.76 | 12.24 | 26.46 |
| a* | 0.21 | 0.10 | 1.59 | 1.93 | 1.87 |
| b* | −5.44 | −3.79 | 0.39 | 1.48 | 2.89 |

TABLE 15

| 2 surface Transmitted light metrics, optical coating on 1 surface only | 0° |
|---|---|
| T % (photopic, Y) | 95.12 |
| T % (840-860 nm) | 95.34 |
| T % (930-950 nm) | 94.43 |
| L* | 98.08 |
| a* | −0.03 |
| b* | 0.39 |

As Table 13 reveals, the reflectance of the article for infrared electromagnetic radiation within a range of from 840 nm to 860 nm is less than 0.8% for incidence angles of 6 degrees or less relative to a normal of the first major surface of the substrate. Further, the reflectance for that wavelength range is less than 2.5% for incidence angles of 45 degrees or less relative to a normal of the first major surface of the substrate. For the wavelength range of from 930 nm to 950 nm, the reflectance is less than 1.8% for incidence angles of 6 degrees or less, and less than 5% for incidence angles within a range of from 0 degrees to 45 degrees relative to a normal of the first major surface of the substrate.

As Table 15 reveals, the average transmittance through the article at 0 degrees incidence (normal to the first major surface of the substrate) is greater than 95% for visible light, greater than 95% for infrared radiation within the wavelength range of from 840 nm to 860 nm, and greater than 94% for infrared radiation within the wavelength range of from 930 nm to 950 nm. Again, because transmittance was calculated as a two surface metric with the optical coating disposed on the first surface and the second surface being uncoated but having a reflectance of 4%, the maximum possible values for transmittance as reported in Table 15 were 96%.

Figure 10A:
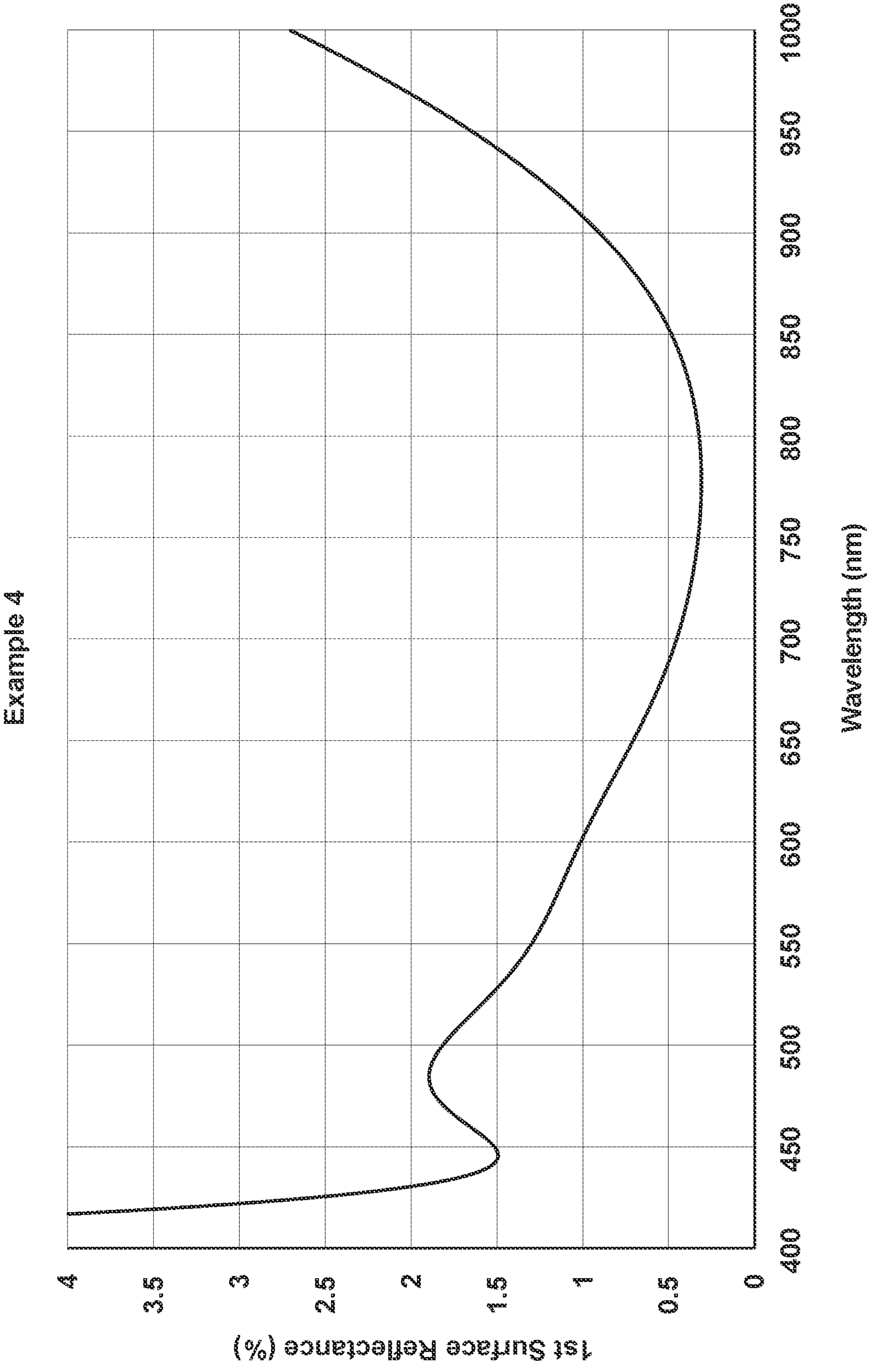
FIG. 10A, pertaining to the article of Example 4 with a five layer optical coating, is a graph that plots first surface reflectance as a function of wavelength of electromagnetic radiation, illustrating that the article reflects less than 1.5% of incident electromagnetic radiation across an entire wavelength range of from about 540 nm to about 925 nm, the latter of which is within the infrared spectrum.

Example 4—For Example 4 (FIGS. 10A and 10B), an article was modeled with an optical coating and substrate having the attributes set forth in Table 16 below.

TABLE 16

| Component | Composition | Refractive Index | Thickness (nm) |
|---|---|---|---|
| Substrate | Glass | 1.510 | |
| 1st Layer | $SiO_2$ | 1.476 | 228.1 |
| 2nd Layer | $SiN_x$ | 2.013 | 17.6 |
| 3rd Layer | $SiO_2$ | 1.476 | 41.5 |
| 4th Layer | $SiN_x$ | 2.013 | 147.7 |
| 5th Layer | $SiO_2$ | 1.476 | 107.4 |
| Ambient | Air | 1.0 | |
| Total Thickness | | | 542.4 |

The optical coating of Example 4 utilizes only five layers and has a relatively thin overall thickness of 542.4 nm, reducing deposition cost and time compared to optical coatings that (i) utilize more layers, such as 10, 20, or even 30 or more layers, and (ii) have a thicker total thickness. The first layer disposed closest to the substrate is relatively large, at 228.1 nm.

The thicknesses of the layers of the high refractive index material $SiN_x$ (i.e., the $2^{nd}$ layer and the $4^{th}$ layer) were collectively 30.4% of the total thickness of the optical coating. The layer of the high refractive index material $SiN_x$ disposed furthest from the substrate (i.e., the $4^{th}$ layer) has a thickness of 147.7 nm. The thickness of the $4^{th}$ layer of the high refractive index material $SiN_x$ is 58% of the combined thicknesses of the two layers of the optical coating disposed furthest from the substrate (i.e., the $4^{th}$ layer and the $5^{th}$ layer). The 250 nm of total thickness of the optical coating disposed furthest from the substrate (i.e., the $5^{th}$ layer and 142.6 nm of the $4^{th}$ layer) is 57% high refractive index material $SiN_x$. Based on the inventors' prior experience, these attributes of the optical coating are predicted to impart the article with a maximum hardness value within a range of from 8.5 GPa to 10.5 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 10A. As the graph illustrates, the article exhibits (i) a reflectance of less than 1% across an entire wavelength range of at least from 625 nm to 900 nm, (ii) a reflectance of less than 1.5% across an entire wavelength range of at least from 540 nm to 925 nm, and (iii) a reflectance of less than 2% across an entire wavelength range of at least from 440 nm to at least 960 nm.

Figure 10B:
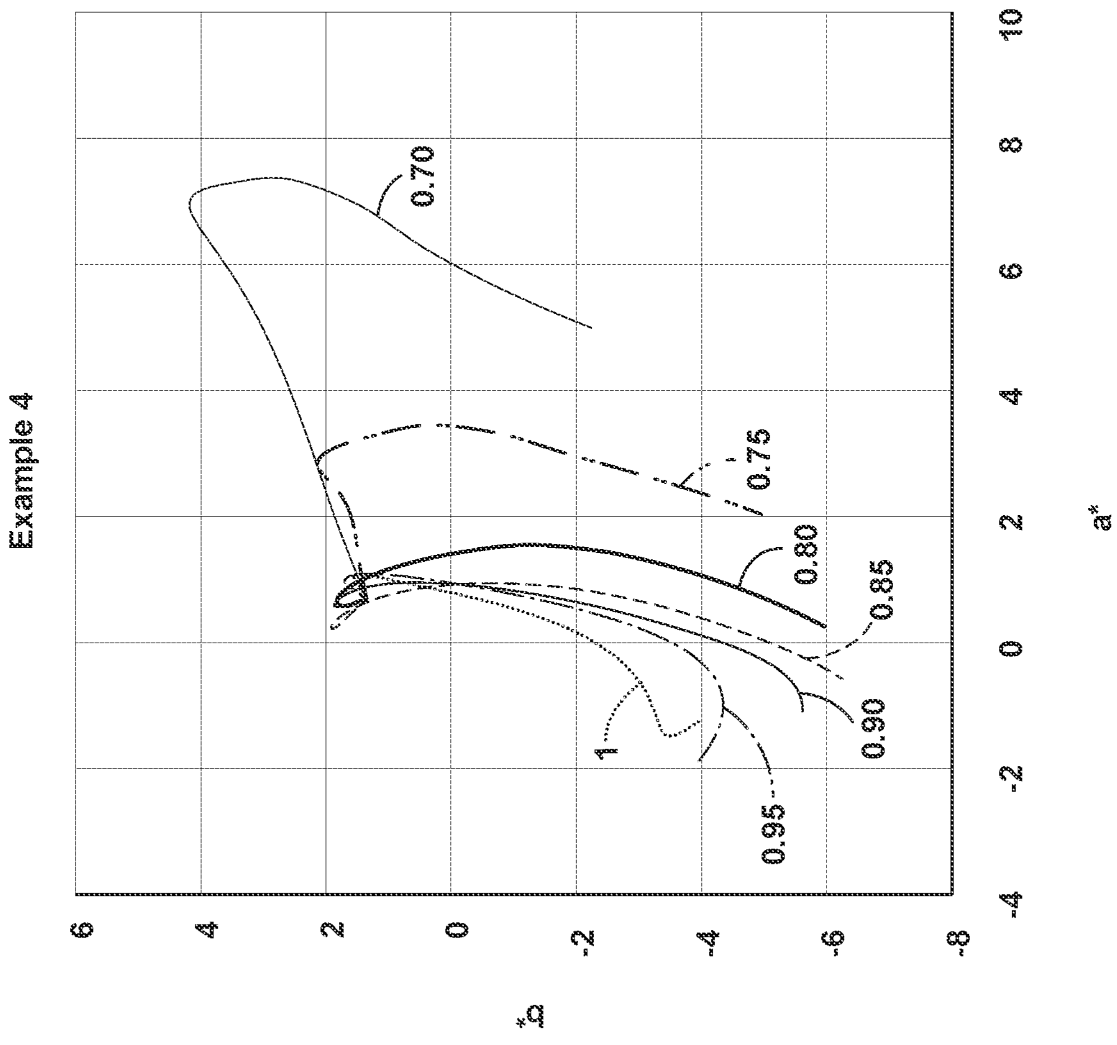
FIG. 10B, also pertaining to the article of Example 4, is a graph that plots first surface reflectance color coordinate values a* and b* as a function of viewing angle of the optical coating and thickness scaling factor, illustrating that the optical coating (i) limits reflected color coordinate a* to within a range of from about −2 to about +1.5 and (ii) limits reflected color coordinate b* to within a range of from about −7 to about +2, for all viewing angles within a range of from 0 to 90 degrees, and at all thickness scaling factors greater than or equal to 0.80.

Next, the first surface reflected color (from a D65 illuminant) of the modeled article of Example 4 as a function of viewing angles within a range of from 0 degrees to 90 degrees relative to a normal of the substrate, and as a function of the thickness scaling factor of the total thickness of the optical coating, was calculated. The results are set forth at the graph of FIG. 10B. As the graph of FIG. 10B illustrates, from viewing angles within a range of from 0 to 10 degrees relative to a normal of the substrate, the first surface reflected color is within a range of from −3.5 to +2 for a* and from −10 to −6 for b* for all thickness scaling factors from 1 down to 0.75, corresponding to an article surface angle range of from 0 degrees to 55 degrees. Further, the article of Example 4 maintains first surface reflected color within a range of from −2.5 to +4 for a* and from −10 to +1 for b* for all viewing angles within a range of from 0 degrees to 90 degrees relative to a normal of the substrate for all thickness scaling factors from 1 down to 0.75, which again corresponds to an article surface angle range of from 0 degrees to 55 degrees.

Further, the first surface average photopic percentage reflectance and color coordinates as a function of incident light angle (for D65 illuminant) and the thickness scaling factor of the optical coating of the modeled article were calculated. The results are set forth in Table 17 below.

TABLE 17

| Thickness scaling factor | Light incidence angle | R % (photopic, Y) | L | a* | b* |
|---|---|---|---|---|---|
| 1 | 0 | 1.351 | 11.63 | −2.47 | −6.80 |
| | 30 | 1.124 | 9.98 | −2.27 | −5.90 |
| | 45 | 1.501 | 12.62 | −0.58 | −4.16 |
| | 60 | 4.587 | 25.52 | 0.35 | −0.84 |
| 0.95 | 0 | 1.151 | 10.19 | −3.28 | −6.81 |
| | 30 | 0.976 | 8.79 | −1.52 | −7.11 |
| | 45 | 1.414 | 12.05 | −0.11 | −4.08 |
| | 60 | 4.593 | 25.54 | 0.52 | −0.48 |
| 0.9 | 0 | 0.951 | 8.58 | −2.26 | −8.94 |
| | 30 | 0.834 | 7.53 | −0.95 | −7.56 |
| | 45 | 1.343 | 11.57 | 0.13 | −3.42 |
| | 60 | 4.618 | 25.62 | 0.29 | −0.06 |
| 0.85 | 0 | 0.751 | 6.79 | −1.60 | −9.76 |
| | 30 | 0.707 | 6.39 | −0.41 | −7.01 |
| | 45 | 1.296 | 11.25 | 0.35 | −2.66 |
| | 60 | 4.646 | 25.70 | −0.18 | 0.31 |
| 0.8 | 0 | 0.572 | 5.17 | −0.53 | −9.38 |
| | 30 | 0.614 | 5.55 | 0.75 | −6.02 |
| | 45 | 1.280 | 11.14 | 0.95 | −1.71 |
| | 60 | 4.686 | 25.82 | 0.14 | 0.53 |
| 0.75 | 0 | 0.449 | 4.06 | 1.76 | −8.10 |
| | 30 | 0.587 | 5.30 | 3.02 | −4.01 |
| | 45 | 1.342 | 11.56 | 3.33 | −0.04 |
| | 60 | 4.849 | 26.30 | 2.67 | 0.97 |
| 0.7 | 0 | 0.442 | 4.00 | 5.56 | −4.60 |
| | 30 | 0.703 | 6.35 | 8.07 | 0.17 |
| | 45 | 1.617 | 13.33 | 8.33 | 3.47 |
| | 60 | 5.402 | 27.85 | 7.18 | 3.13 |

As set forth in Table 17, the modeled article exhibits an average photopic reflectance of less than 0.8% for all incidence angles within a range of from 0 degrees to 30 degrees relative to a normal of the surface of the substrate at any position along the surface of the substrate where the thickness scaling factor is within a range of from 0.70 to 1. The modeled article exhibits an average photopic reflectance of less than 1.4% for all incidence angles within a range of from 0 degrees to 45 degrees relative to a normal of the surface of the substrate at any position along the surface of the substrate where the thickness scaling factor is within a range of from 0.75 to 1. The modeled article exhibits an average photopic reflectance of less than 1.7% for all incidence angles within a range of from 0 degrees to 45 degrees relative to a normal of the surface of the substrate at any position along the surface of the substrate where the thickness scaling factor is within a range of from 0.70 to 1. The modeled article exhibits an average photopic reflectance of less than 4.9% for all incidence angles within a range of from 0 degrees to 60 degrees relative to a normal of the surface of the substrate at any position along the surface of the substrate where the thickness scaling factor within a range of from 0.75 to 1. The modeled article exhibits an average photopic reflectance of less than 5.5% for all incidence angles within a range of from 0 degrees to 60 degrees relative to a normal of the surface of the substrate at any position along the surface of the substrate where the thickness scaling factor is within a range of from 0.7 to 1.

The first surface percentage reflectance, color coordinates, and two surface percentage transmittance of the modeled article were calculated. The results are set forth in Tables 18-20 below. For the percentage reflectance, photopic values are reported for visible light, while particular wavelength ranges are reported within the infrared region.

TABLE 18

| 1st surface Reflectance % average | 6° | 20° | 40° | 45° | 60° |
|---|---|---|---|---|---|
| R % (photopic, Y) | 1.34 | 1.21 | 1.25 | 1.50 | 4.59 |
| R % (840-860 nm) | 0.48 | 0.62 | 1.50 | 2.06 | 6.36 |
| R % (930-950 nm) | 1.47 | 1.81 | 3.49 | 4.37 | 9.91 |

TABLE 19

| 1st surface Reflected Lightness and Color metrics | 6° | 20° | 40° | 45° | 60° |
|---|---|---|---|---|---|
| L* | 11.52 | 10.61 | 10.89 | 12.62 | 25.52 |
| a* | −2.53 | −2.76 | −1.14 | −0.58 | 0.35 |
| b* | −6.71 | −6.17 | −5.09 | −4.16 | −0.84 |

TABLE 20

| 2 surface Transmitted light metrics, optical coating on 1 surface only | 0° |
|---|---|
| T % (photopic, Y) | 95.12 |
| T % (840-860 nm) | 95.60 |
| T % (930-950 nm) | 94.72 |
| L* | 98.08 |
| a* | −0.03 |
| b* | 0.39 |

As Table 18 reveals, the reflectance of the article for infrared electromagnetic radiation within a range of from 840 nm to 860 nm is less than 0.5%, for incidence angles of 6 degrees or less relative to a normal of the first major surface of the substrate. Further, the reflectance for that wavelength range is less than 2.1%, for incidence angles of 45 degrees or less relative to a normal of the first major surface of the substrate. For the wavelength range of from 930 nm to 950 nm, the reflectance is less than 1.5% for incidence angles of 6 degrees or less relative to a normal of the first major surface of the substrate, and less than 4.5% for incidence angles within a range of from 0 degrees to 45 degrees relative to a normal of the first major surface of the substrate.

As Table 20 reveals, the transmittance through the article at 0 degrees incidence (normal to the first major surface of the substrate) is greater than 95% for visible light, greater than 95.5% for infrared radiation within the wavelength range of from 840 nm to 860 nm, and greater than 94.5% for infrared radiation within the wavelength range of from 930 nm to 950 nm. Again, because transmittance was calculated as a two surface metric with the optical coating disposed on the first surface and the second surface being uncoated but having a reflectance of 4%, the maximum possible values for transmittance as reported in Table 20 were 96%.

Figure 11A:
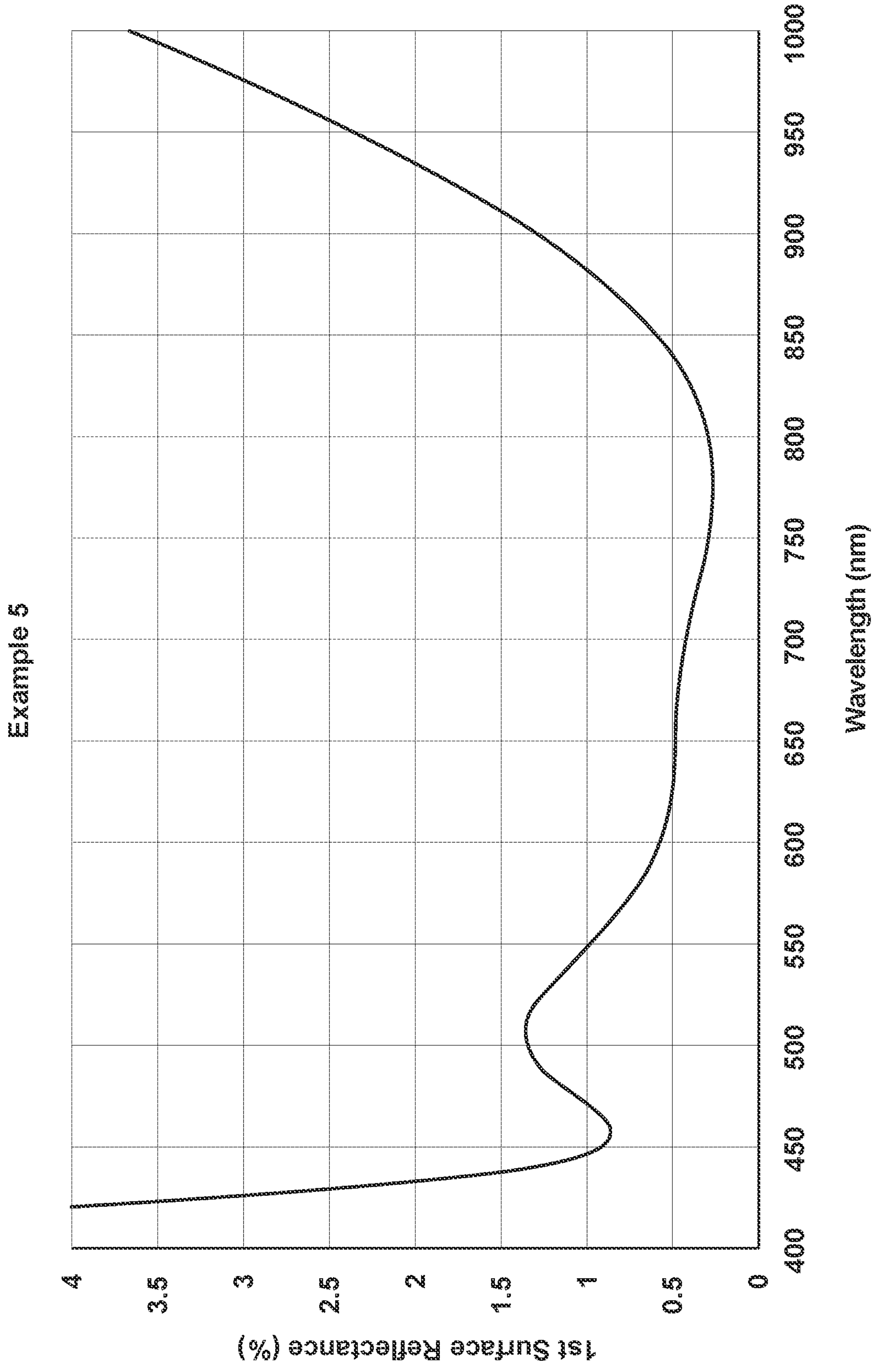
FIG. 11A, pertaining to the article of Example 5 with a five layer optical coating, is a graph that plots first surface reflectance as a function of wavelength of electromagnetic radiation, illustrating that the article reflects less than 1.5% of incident electromagnetic radiation across an entire wavelength range of from about 440 nm to about 910 nm, the latter of which is within the infrared spectrum.

Example 5—For Example 5 (FIGS. 11A and 11B), an article was modeled with an optical coating and substrate having the attributes set forth in Table 21 below.

TABLE 21

| Component | Composition | Refractive Index | Thickness (nm) |
|---|---|---|---|
| Substrate | Glass | 1.510 | |
| 1st Layer | $SiO_2$ | 1.465 | 25.0 |
| 2nd Layer | $SiN_x$ | 2.043 | 19.6 |
| 3rd Layer | $SiO_2$ | 1.465 | 40.3 |
| 4th Layer | $SiN_x$ | 2.043 | 149.6 |
| 5th Layer | $SiO_2$ | 1.465 | 105.7 |
| Ambient | Air | 1.0 | |
| Total Thickness | | | 340.1 |

The optical coating of Example 5 utilizes only five layers and has a relatively thin overall thickness of 340.1 nm, reducing deposition cost and time compared to optical coatings that (i) utilize more layers, such as 10, 20, or even 30 or more layers, and (ii) have a thicker total thickness.

The thicknesses of the layers of the high refractive index material $SiN_x$ (i.e., the $2^{nd}$ layer and the $4^{th}$ layer) were collectively 50.0% of the total thickness of the optical coating. The layer of the high refractive index material $SiN_x$ disposed furthest from the substrate (i.e., the $4^{th}$ layer) has a thickness of 149.6 nm. The thickness of the $4^{th}$ layer of the high refractive index material $SiN_x$ is 59% of the combined thicknesses of the two layers of the optical coating disposed furthest from the substrate (i.e., the $4^{th}$ layer and the $5^{th}$ layer). The 250 nm of total thickness of the optical coating disposed furthest from the substrate (i.e., the $5^{th}$ layer and 144.3 nm of the $4^{th}$ layer) is 58% high refractive index material $SiN_x$. Based on the inventors' prior experience, these attributes of the optical coating are predicted to impart the article with a maximum hardness value within a range of from 8.5 GPa to 15 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 11A. As the graph illustrates, the article exhibits (i) a reflectance of less than 1% across an entire wavelength range of at least from 550 nm to 880 nm, (ii) a reflectance of less than 1.5% across an entire wavelength range of at least from 440 nm to 910 nm, and (iii) a reflectance of less than 2% across an entire wavelength range of at least from 430 nm to at least 930 nm.

Figure 11B:
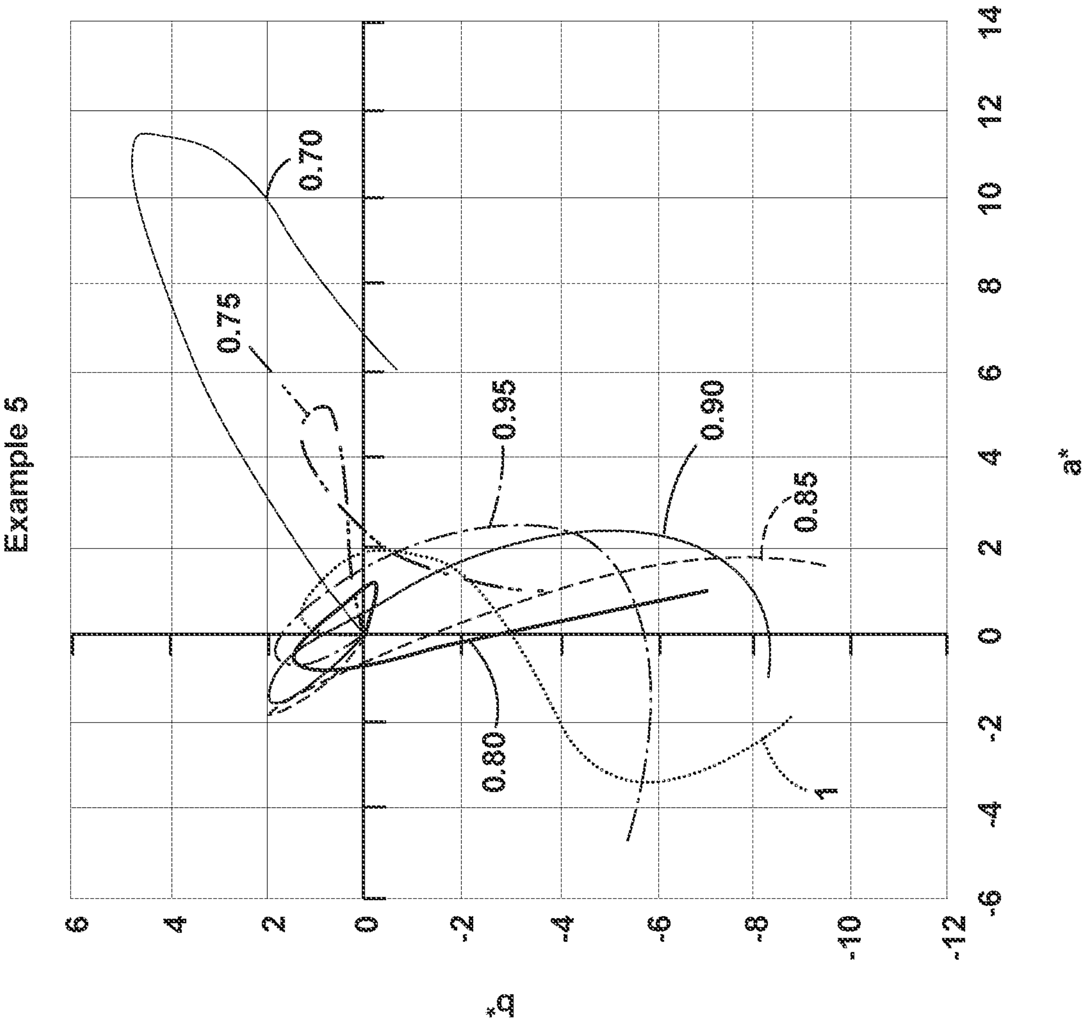
FIG. 11B, also pertaining to the article of Example 5, is a graph that plots first surface reflectance color coordinate values a* and b* as a function of viewing angle of the optical coating and thickness scaling factor, illustrating that the optical coating (i) limits reflected color coordinate a* to within a range of from about −5 to about +2.5 and (ii) limits reflected color coordinate b* to within a range of from about −9.5 to about +2, for all viewing angles within a range of from 0 to 90 degrees, and at all thickness scaling factors greater than or equal to 0.80.

Next, the first surface reflected color (from a D65 illuminant) of the modeled article of Example 5 as a function of viewing angles within a range of from 0 degrees to 90 degrees relative to a normal of the substrate, and as a function of the thickness scaling factor of the coating thickness was calculated. The results are set forth at the graph of FIG. 11B. As the graph of FIG. 11B illustrates, from viewing angles within a range of from 0 to 10 degrees relative to the normal of the substrate, the first surface reflected color is within a range of from −5 to +2 for a* and from −10 to −3 for b*, at all thickness scaling factors from 1 down to 0.75, corresponding to an article surface angle range of from 0 degrees to 55 degrees. Further, the article of Example 5 maintains first surface reflected color within a range of from −5 to +5 for a* and from −10 to +2 for b*, for all viewing angles within a range of from 0 degrees to 90 degrees relative to a normal of the substrate, and at all scaling factors from 1 down to 0.75, which again corresponds to an article surface angle range of from 0 degrees to 55 degrees.

Further, the first surface average photopic percentage reflectance and color coordinates as a function of incident light angle (for D65 illuminant) and the thickness scaling factor of the optical coating of the modeled article were calculated. The results are set forth in Table 22 below.

TABLE 22

| Thickness scaling factor | Light incidence angle | R % (photopic, Y) | L | a* | b* |
|---|---|---|---|---|---|
| 1 | 0 | 0.969 | 8.73 | −1.85 | −8.74 |
| | 30 | 0.779 | 7.04 | −2.80 | −4.62 |
| | 45 | 1.224 | 10.73 | 1.06 | −2.34 |
| | 60 | 4.440 | 25.08 | 1.65 | 0.47 |
| 0.95 | 0 | 0.792 | 7.16 | −4.59 | −5.46 |
| | 30 | 0.683 | 6.17 | −0.11 | −5.78 |
| | 45 | 1.231 | 10.79 | 2.49 | −2.73 |
| | 60 | 4.549 | 25.41 | 0.52 | 1.24 |
| 0.9 | 0 | 0.641 | 5.79 | −0.91 | −8.29 |
| | 30 | 0.626 | 5.65 | 2.16 | −6.70 |
| | 45 | 1.255 | 10.96 | 1.23 | −1.19 |
| | 60 | 4.609 | 25.59 | −1.20 | 1.98 |
| 0.85 | 0 | 0.528 | 4.77 | 1.61 | −9.44 |
| | 30 | 0.591 | 5.34 | 1.30 | −4.71 |
| | 45 | 1.265 | 11.03 | −1.05 | 0.82 |
| | 60 | 4.614 | 25.60 | −1.67 | 1.61 |
| 0.8 | 0 | 0.444 | 4.01 | 1.07 | −7.10 |
| | 30 | 0.565 | 5.10 | −0.21 | −1.79 |
| | 45 | 1.272 | 11.08 | −0.63 | 1.32 |
| | 60 | 4.652 | 25.72 | 0.61 | 0.52 |
| 0.75 | 0 | 0.392 | 3.54 | 1.02 | −3.67 |
| | 30 | 0.582 | 5.26 | 2.28 | −0.11 |
| | 45 | 1.379 | 11.82 | 4.70 | 1.30 |
| | 60 | 4.936 | 26.55 | 5.22 | 0.77 |
| 0.7 | 0 | 0.451 | 4.08 | 6.05 | −0.68 |
| | 30 | 0.782 | 7.06 | 10.78 | 2.69 |
| | 45 | 1.800 | 14.40 | 11.36 | 4.69 |
| | 60 | 5.764 | 28.81 | 9.44 | 4.53 |

As set forth in Table 22, the modeled article exhibits an average photopic reflectance of less than 1.0% for all incidence angles within a range of from 0 degrees to 30 degrees relative to a normal of the surface of the substrate at any position along the surface of the substrate where the thickness scaling factor is within a range of from 0.70 to 1. The average photopic reflectance is less than 1.4%. for all incidence angles within a range of from 0 degrees to 45 degrees relative to a normal of the surface of the substrate, and at all thickness scaling factors within a range of from 0.75 to 1. The average photopic reflectance is less than 1.4%, for all incidence angles within a range of from 0 degrees to 45 degrees relative to a normal of the surface of the substrate, and at all thickness scaling factors within a range of from 0.75 to 1. The average photopic reflectance is less than 1.85%, for all incidence angles within a range of from 0 degrees to 45 degrees relative to a normal of the surface of the substrate, and at all thickness scaling factors within a range of from 0.70 to 1. The average photopic reflectance is less than 5.0% for all incidence angles within a range of from 0 degrees to 60 degrees relative to a normal of the surface of the substrate, and at all thickness scaling factors within a range of from 0.75 to 1. The average photopic reflectance is less than 5.8%, for all incidence angles within a range of from 0 degrees to 60 degrees relative to a normal of the surface of the substrate, and at all thickness scaling factors within a range of from 0.7 to 1.

The first surface percentage reflectance, color coordinates, and two surface percentage transmittance of the modeled article were calculated. The results are set forth in Tables 23-25 below. For the percentage reflectance, photopic values are reported for visible light, while particular wavelength ranges are reported within the infrared region.

TABLE 23

| 1st surface Reflectance % average | 6° | 20° | 40° | 45° | 60° |
|---|---|---|---|---|---|
| R % (photopic, Y) | 0.96 | 0.84 | 0.94 | 1.22 | 4.44 |
| R % (840-860 nm) | 0.56 | 0.77 | 1.92 | 2.58 | 7.29 |
| R % (930-950 nm) | 2.05 | 2.49 | 4.41 | 5.35 | 11.02 |

TABLE 24

| 1st surface Reflected Lightness and Color metrics | 6° | 20° | 40° | 45° | 60° |
|---|---|---|---|---|---|
| L* | 8.61 | 7.59 | 8.47 | 10.73 | 25.08 |
| a* | −2.08 | −3.30 | −0.32 | 1.06 | 1.65 |
| b* | −8.48 | −6.36 | −3.23 | −2.34 | 0.47 |

TABLE 25

| 2 surface Transmitted light metrics, optical coating on 1 surface only | 0° |
|---|---|
| T % (photopic, Y) | 94.97 |
| T % (840-860 nm) | 95.50 |
| T % (930-950 nm) | 94.15 |
| L* | 98.02 |
| a* | 0.03 |
| b* | 0.69 |

As Table 23 reveals, the reflectance of the article for infrared electromagnetic radiation within a range of from 840 nm to 860 nm is less than 0.6%, for incidence angles of 6 degrees or less relative to a normal of the first major surface of the substrate. Further, the reflectance for that wavelength range is less than 2.6%, for incidence angles of 45 degrees or less relative to a normal of the first major surface of the substrate. For the wavelength range of from 930 nm to 950 nm, the reflectance is less than 2.1%, for incidence angles of 6 degrees or less, and less than 5.5% for incidence angles within a range of from 0 degrees to 45 degrees relative to a normal of the first major surface of the substrate.

As Table 25 reveals, the transmittance through the article at 0 degrees incidence (normal to the first major surface of the substrate) is greater than 94.8% for visible light, greater than 95.4% for infrared radiation within the wavelength range of from 840 nm to 860 nm, and greater than 94.0% for infrared radiation within the wavelength range of from 930 nm to 950 nm. Again, because transmittance was calculated as a two surface metric with the optical coating disposed on the first surface and the second surface being uncoated but having a reflectance of 4%, the maximum possible values for transmittance as reported in Table 25 were 96%.

Figure 12A:
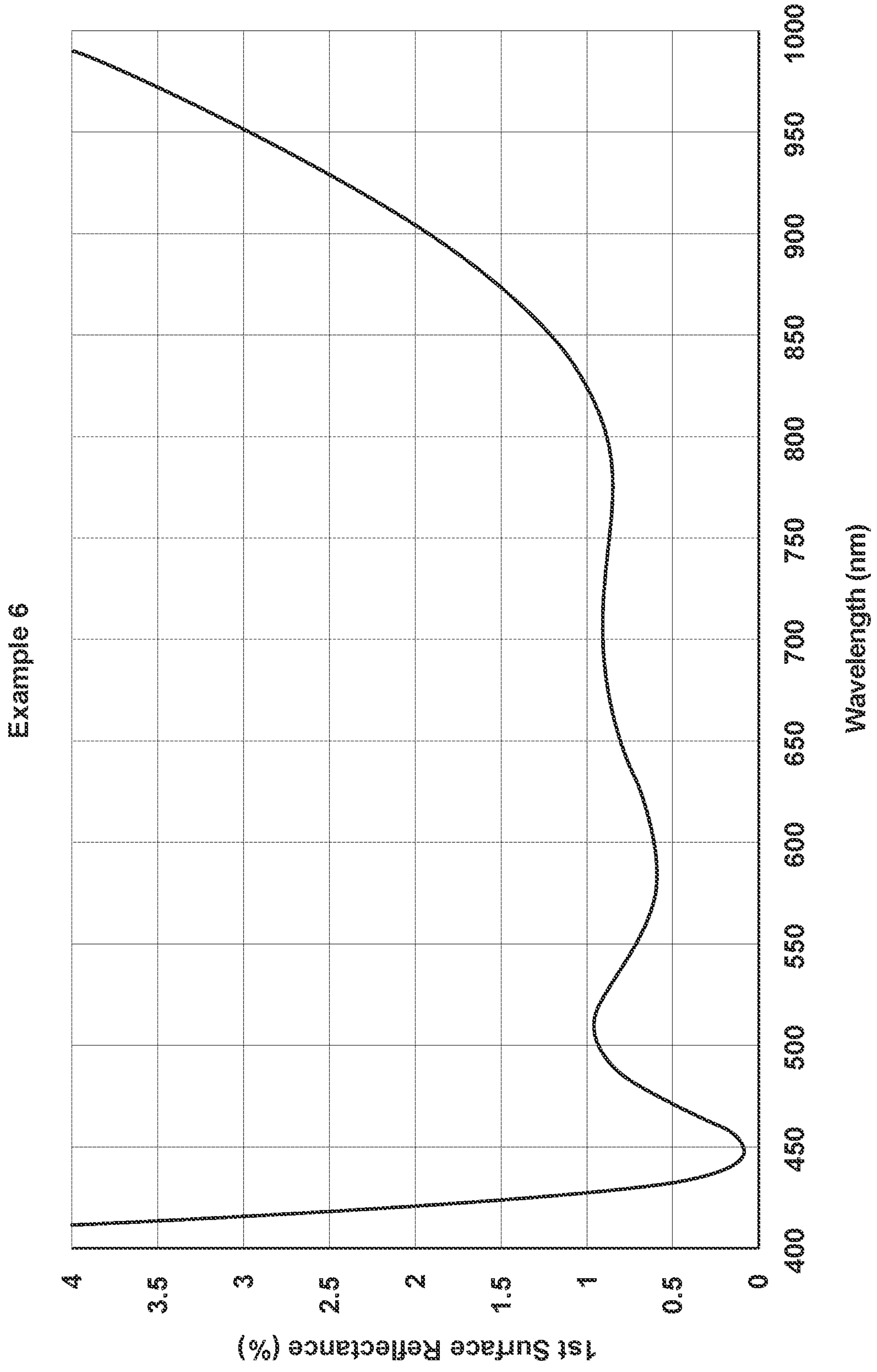
FIG. 12A, pertaining to the article of Example 6 with a five layer optical coating, is a graph that plots first surface reflectance as a function of wavelength of electromagnetic radiation, illustrating that the article reflects less than 1.5% of incident electromagnetic radiation across an entire wavelength range of from about 425 nm to about 870 nm, the latter of which is within the infrared spectrum.

Example 6—For Example 6 (FIGS. 12A and 12B), an article was modeled with an optical coating and substrate having the attributes set forth in Table 26 below.

TABLE 26

| Component | Composition | Refractive Index | Thickness (nm) |
|---|---|---|---|
| Substrate | Glass | 1.510 | |
| 1st Layer | $SiO_2$ | 1.477 | 25.0 |
| 2nd Layer | $SiN_x$ | 2.041 | 19.8 |
| 3rd Layer | $SiO_2$ | 1.477 | 40.6 |
| 4th Layer | $SiN_x$ | 2.041 | 152.9 |
| 5th Layer | $SiO_2$ | 1.477 | 95.0 |
| Ambient | Air | 1.0 | |
| Total Thickness | | | 333.2 |

The optical coating of Example 6 utilizes only five layers and has a relatively thin overall thickness of 333.2 nm, reducing deposition cost and time compared to optical coatings that (i) utilize more layers, such as 10, 20, or even 30 or more layers, and (ii) have a thicker total thickness.

The thicknesses of the layers of the high refractive index material $SiN_x$ (i.e., the 2nd layer and the 4th layer) were collectively 51.8% of the total thickness of the optical coating. The layer of the high refractive index material $SiN_x$ disposed furthest from the substrate (i.e., the 4th layer) has a thickness of 152.9 nm. The thickness of the 4th layer of the high refractive index material $SiN_x$ is 62% of the combined thicknesses of the two layers of the optical coating disposed furthest from the substrate (i.e., the 4th layer and the 5th layer). The 250 nm of total thickness of the optical coating disposed furthest from the substrate (i.e., the 5th layer, the 4th layer, and 2.1 nm of the 3r d layer) is 61% high refractive index material $SiN_x$. Based on the inventors' prior experience, these attributes of the optical coating are predicted to impart the article with a maximum hardness value within a range of from 8.5 GPa to 15 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 12A. As the graph illustrates, the article exhibits (i) a reflectance of less than 1% across an entire wavelength range of at least from 430 nm to 820 nm, (ii) a reflectance of less than 1.5% across an entire wavelength range of at least from 425 nm to 870 nm, and (iii) a reflectance of less than 2% across an entire wavelength range of at least from 420 nm to at least 900 nm.

Figure 12B:
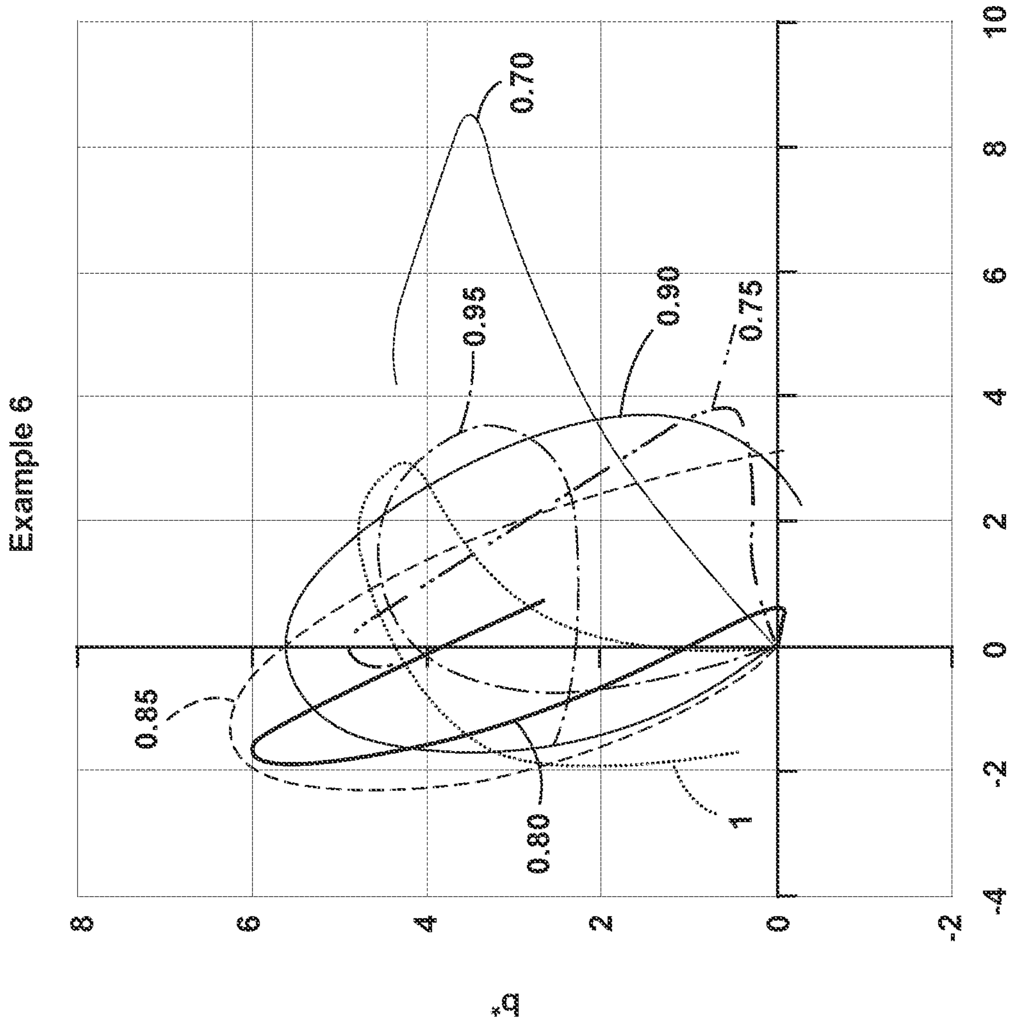
FIG. 12B, also pertaining to the article of Example 6, is a graph that plots first surface reflectance color coordinate values a* and b* as a function of viewing angle of the optical coating and thickness scaling factor, illustrating that the optical coating (i) limits reflected color coordinate a* to within a range of from about −2.5 to about +4 and (ii) limits reflected color coordinate b* to within a range of from about −0.5 to about +6.5, for all viewing angles with a range of from 0 to 90 degrees, and at all thickness scaling factors greater than or equal to 0.80.

Next, the first surface reflected color (from a D65 illuminant) of the modeled article of Example 6 as a function of viewing angles within a range of from 0 degrees to 90 degrees relative to a normal of the substrate, and as a function of the thickness scaling factor of the total thickness of the optical coating, was calculated. The results are set forth at the graph of FIG. 12B. As the graph of FIG. 12B illustrates, from viewing angles within a range of from 0 to 10 degrees relative to the normal of the substrate, the first surface reflected color is within a range of from −2 to +3.5 for a* and from −1 to +5 for b*, at all thickness scaling factors from 1 down to 0.75, corresponding to an article surface angle range of from 0 degrees to 55 degrees. Further, the article of Example 6 maintains first surface reflected color within a range of from −3 to +4 for a* and from −1 to +6.5 for b* for all viewing angles within a range of from 0 degrees to 90 degrees relative to the normal of the substrate, and at all thickness scaling factors from 1 down to 0.75, which again corresponds to an article surface angle range of from 0 degrees to 55 degrees.

The first surface photopic percentage reflectance and color coordinates as a function of incident light angle (for D65 illuminant) and the thickness scaling factor of the optical coating of the modeled article were calculated. The results are set forth in Table 27 below.

TABLE 27

| Thickness scaling factor | Light incidence angle | R % (photopic, Y) | L | a* | b* |
|---|---|---|---|---|---|
| 1 | 0 | 0.726 | 6.56 | −1.69 | 0.43 |
| | 30 | 0.799 | 7.21 | −0.31 | 4.28 |
| | 45 | 1.57387 | 13.07 | 2.81 | 4.42 |
| | 60 | 5.29447 | 27.56 | 2.02 | 3.73 |
| 0.95 | 0 | 0.698 | 6.30 | −1.52 | 2.50 |
| | 30 | 0.860 | 7.77 | 2.88 | 2.51 |
| | 45 | 1.737 | 14.04 | 3.06 | 4.05 |
| | 60 | 5.546 | 28.24 | 0.45 | 4.39 |
| 0.9 | 0 | 0.715 | 6.46 | 2.29 | −0.30 |
| | 30 | 0.962 | 8.67 | 3.49 | 2.42 |
| | 45 | 1.900 | 14.95 | 0.83 | 5.43 |
| | 60 | 5.715 | 28.68 | −1.52 | 4.61 |
| 0.85 | 0 | 0.773 | 6.98 | 3.15 | −0.11 |
| | 30 | 1.070 | 9.56 | 0.91 | 4.62 |
| | 45 | 2.013 | 15.56 | −1.77 | 6.11 |
| | 60 | 5.784 | 28.86 | −2.15 | 3.39 |
| 0.8 | 0 | 0.841 | 7.60 | 0.75 | 2.63 |
| | 30 | 1.150 | 10.18 | −1.47 | 5.89 |
| | 45 | 2.079 | 15.90 | −1.74 | 4.52 |
| | 60 | 5.834 | 28.99 | −0.25 | 1.39 |
| 0.75 | 0 | 0.906 | 8.18 | −0.26 | 4.27 |
| | 30 | 1.231 | 10.79 | 0.43 | 4.61 |
| | 45 | 2.202 | 16.51 | 2.45 | 2.44 |
| | 60 | 6.081 | 29.61 | 3.83 | 0.70 |
| 0.7 | 0 | 1.041 | 9.33 | 4.20 | 4.35 |
| | 30 | 1.460 | 12.35 | 6.76 | 4.03 |
| | 45 | 2.605 | 18.39 | 8.47 | 3.57 |
| | 60 | 6.823 | 31.40 | 7.84 | 3.31 |

As set forth in Table 27, the modeled article exhibits an average photopic reflectance of less than 1.5%, for all incidence angles within a range of from 0 degrees to 30 degrees relative to a normal of the surface of the substrate at any position along the surface of the substrate where the thickness scaling factor is within a range of from 0.70 to 1. The average photopic reflectance is less than 0.8%, for all incidence angles within a range of from 0 degrees to 10 degrees relative to a normal of the surface of the substrate at any position along the surface of the substrate where the thickness scaling factor is within a range of from 0.85 to 1. The average photopic reflectance is less than 2.3%, for all incidence angles within a range of from 0 degrees to 45 degrees relative to a normal of the surface of the substrate at any position along the surface of the substrate where the thickness scaling factor is within a range of from 0.75 to 1. The average photopic reflectance is less than 2.7%, for all incidence angles within a range of from 0 degrees to 45 degrees relative to a normal of the surface of the substrate at any position along the surface of the substrate where the thickness scaling factor is within a range of from 0.70 to 1. The average photopic reflectance is less than 6.1%, for all incidence angles within a range of from 0 degrees to 60 degrees relative to a normal of the surface of the substrate at any position along the surface of the substrate where the thickness scaling factor is within a range of from 0.75 to 1. The average photopic reflectance is less than 6.1%, for all incidence angles within a range of from 0 degrees to 60 degrees relative to a normal of the surface of the substrate at any position along the surface of the substrate where the thickness scaling factor is within a range of from 0.7 to 1.

The first surface percentage reflectance, color coordinates, and two surface percentage transmittance of the modeled article were calculated. The results are set forth in Tables 28-30 below. For the percentage reflectance, photopic values are reported for visible light, while particular wavelength ranges are reported within the infrared region.

TABLE 28

| $1^{st}$ surface Reflectance % average | 6° | 20° | 40° | 45° | 60° |
|---|---|---|---|---|---|
| R % (photopic, Y) | 0.72 | 0.71 | 1.16 | 1.57 | 5.29 |
| R % (840-860 nm) | 1.19 | 1.41 | 2.63 | 3.33 | 8.20 |
| R % (930-950 nm) | 2.71 | 3.15 | 5.07 | 6.02 | 11.71 |

TABLE 29

| $1^{st}$ surface Reflected Lightness and Color metrics | 6° | 20° | 40° | 45° | 60° |
|---|---|---|---|---|---|
| L* | 6.53 | 6.46 | 10.27 | 13.07 | 27.56 |
| a* | −1.78 | −1.79 | 2.14 | 2.81 | 2.02 |
| b* | 0.74 | 2.98 | 4.78 | 4.41 | 3.73 |

TABLE 30

| 2 surface Transmitted light metrics, optical coating on 1 surface only | 0° |
|---|---|
| T % (photopic, Y) | 95.24 |
| T % (840-860 nm) | 94.92 |
| T % (930-950 nm) | 93.53 |
| L* | 98.13 |
| a* | 0.08 |
| b* | 0.03 |

As Table 28 reveals, the reflectance of the article for infrared electromagnetic radiation within a range of from 840 nm to 860 nm is less than 1.2%, for incidence angles of 6 degrees or less relative to a normal of the first major surface of the substrate. Further, the reflectance for that wavelength range is less than 3.4%, for incidence angles of 45 degrees or less relative to a normal of the first major surface of the substrate. For the wavelength range of from 930 nm to 950 nm, the reflectance is less than 2.8% for incidence angles of 6 degrees or less relative to a normal of the first major surface of the substrate, and less than 6.1% for incidence angles within a range of from 0 degrees to 45 degrees relative to a normal of the first major surface of the substrate.

As Table 30 reveals, the transmittance through the article at 0 degrees incidence (normal to the first major surface of the substrate) is greater than 95.2% for visible light, greater than 94.8% for infrared radiation within the wavelength range of from 840 nm to 860 nm, and greater than 93.5% for infrared radiation within the wavelength range of from 930 nm to 950 nm. Again, because transmittance was calculated as a two surface metric with the optical coating disposed on the first surface and the second surface being uncoated but having a reflectance of 4%, the maximum possible values for transmittance as reported in Table 30 were 96%.

Figure 13A:
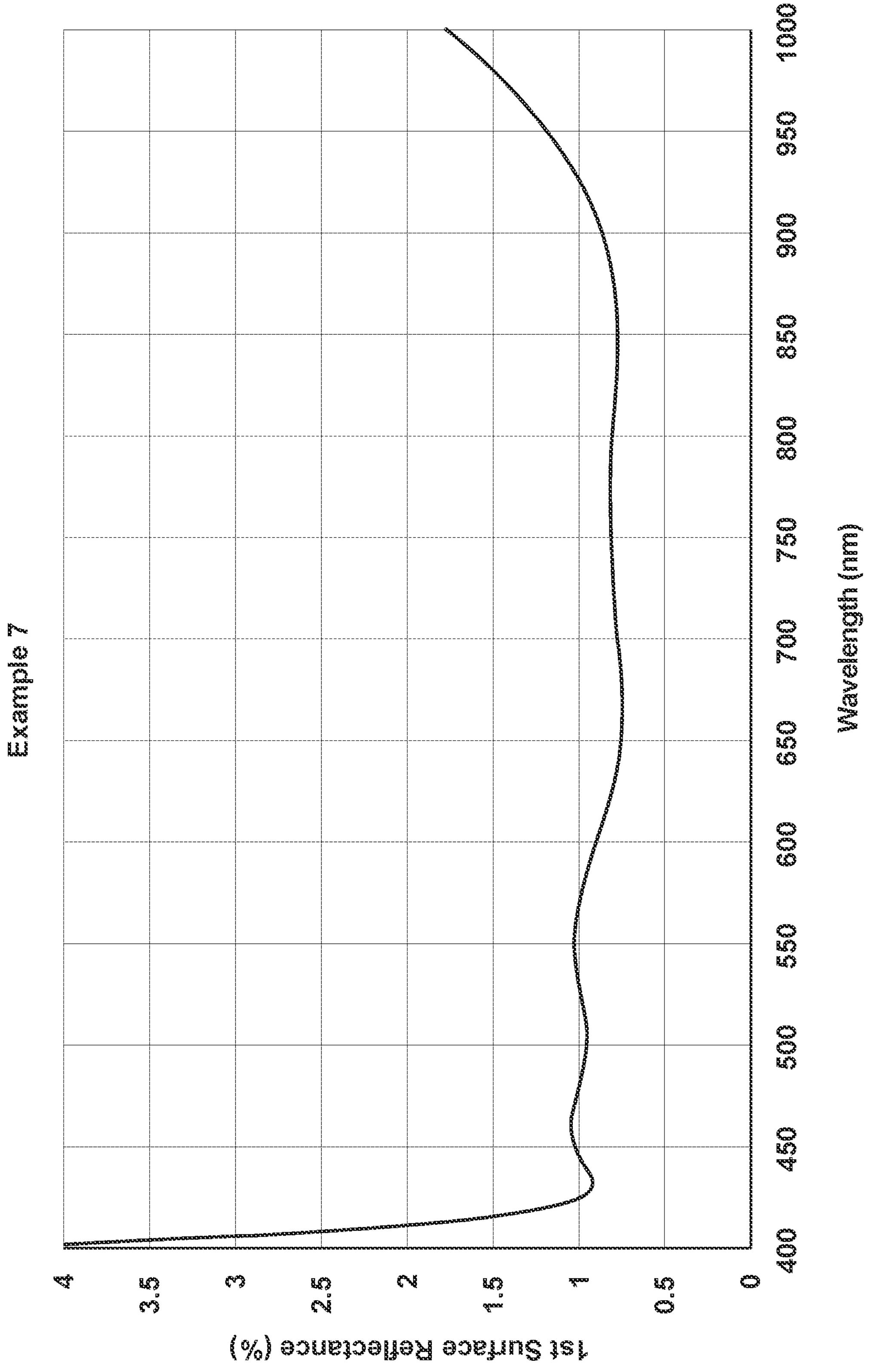
FIG. 13A, pertaining to the article of Example 7, is a graph that plots first surface reflectance as a function of wavelength of electromagnetic radiation.

Example 7—For Example 7 (FIGS. 13A and 13B), an article was modeled with an optical coating and substrate having the attributes set forth in Table 31 below.

TABLE 31

| Component | Composition | Refractive Index | Thickness (nm) |
|---|---|---|---|
| Substrate | Glass | 1.507 | |
| 1st Layer | $SiO_2$ | 1.465 | 48.9 |
| 2nd Layer | $SiN_x$ | 2.058 | 10.5 |
| 3rd Layer | $SiO_2$ | 1.465 | 65.3 |
| 4th Layer | $SiN_x$ | 2.058 | 30.3 |
| 5th Layer | $SiO_2$ | 1.465 | 29.9 |
| 6th Layer | $SiN_x$ | 2.058 | 94.8 |
| 7th Layer | $SiO_2$ | 1.465 | 10.8 |
| 8th Layer | $SiN_x$ | 2.058 | 43.0 |
| 9th Layer | $SiO_2$ | 1.465 | 107.7 |
| Ambient | Air | 1.0 | |
| Total Thickness | | | 441.2 |

The optical coating of Example 7 utilizes only nine layers and has a relatively thin overall thickness of 441.2 nm, reducing deposition cost and time compared to optical coatings that (i) utilize more layers, such as 10, 20, or even 30 or more layers, and (ii) have a thicker total thickness.

The thicknesses of the layers of the high refractive index material $SiN_x$ (i.e., the $2^{nd}$ layer, the $4^{th}$ layer, the $6^{th}$ layer, and the $8^{th}$ layer) were collectively 40.5% of the total thickness of the optical coating. The 250 nm of total thickness of the optical coating disposed furthest from the substrate (i.e., the $9^{th}$ layer, the $8^{th}$ layer, the $7^{th}$ layer, and 88.4 nm of the $6^{th}$ layer) is 53% high refractive index material $SiN_x$. Based on the inventors' prior experience, these attributes of the optical coating are predicted to impart the article with a maximum hardness value within a range of from 8.5 GPa to 12.5 GPa.

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 13A. As the graph illustrates, the article exhibits (i) a reflectance of less than 1.25% across an entire wavelength range of at least from 430 nm to 950 nm, (ii) a reflectance of less than 1.5% across an entire wavelength range of at least from 425 nm to 970 nm, and (iii) a reflectance of less than 2% across an entire wavelength range of at least from 420 nm to at least 1000 nm.

Figure 13B:
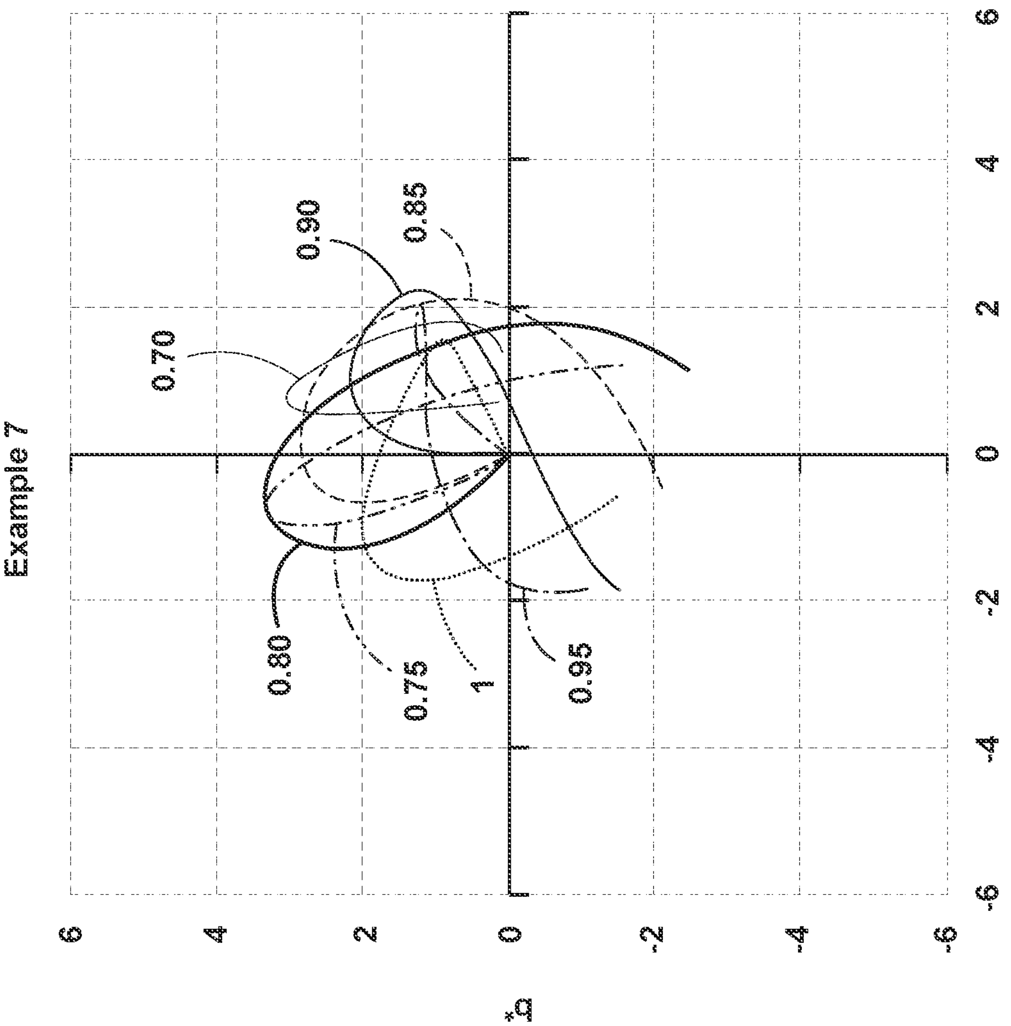
FIG. 13B, also pertaining to the article of Example 7, is a graph that plots first surface reflectance color coordinate values a* and b* as a function of viewing angle of the optical coating and thickness scaling factor.

Next, the first surface reflected color (from a D65 illuminant) of the modeled article of Example 7 as a function of viewing angles within a range of from 0 degrees to 90 degrees relative to a normal of the substrate, and as a function of the thickness scaling factor of the total thickness of the optical coating, was calculated. The results are set forth at the graph of FIG. 13B. As the graph of FIG. 13B illustrates, from viewing angles within a range of from 0 to 10 degrees relative to the normal of the substrate, the first surface reflected color is within a range of from −2 to +1.5 for a* and from −2.5 to +0.5 for b*, at all thickness scaling factors from 1 down to 0.70, which may correspond to an article surface angle range of from 0 degrees to 60 degrees. Further, the article of Example 7 maintains first surface reflected color within a range of from −2 to +2.5 for a* and from −2.5 to +3.5 for b* for all viewing angles within a range of from 0 degrees to 90 degrees relative to the normal of the substrate, and at all thickness scaling factors from 1 down to 0.70, which again may correspond to an article surface angle range of from 0 degrees to 60 degrees.

The first surface photopic percentage reflectance and color coordinates as a function of incident light angle (for D65 illuminant) and the thickness scaling factor of the optical coating of the modeled article were calculated. The results are set forth in Table 32 below.

TABLE 32

| Thickness scaling factor | Light incidence angle | R % (photopic, Y) | L | a* | b* |
|---|---|---|---|---|---|
| 1 | 0 | 0.980 | 8.82 | −0.56 | −1.60 |
| | 30 | 0.971 | 8.75 | −1.67 | 0.82 |
| | 45 | 1.544 | 12.89 | −0.96 | 1.98 |
| | 60 | 4.858 | 26.33 | 1.06 | 1.27 |
| 0.95 | 0 | 0.936 | 8.45 | −1.84 | −1.11 |
| | 30 | 0.947 | 8.54 | −1.48 | 0.36 |
| | 45 | 1.569 | 13.04 | 0.63 | 1.09 |
| | 60 | 5.011 | 26.77 | 2.01 | 1.20 |
| 0.9 | 0 | 0.881 | 7.96 | −1.79 | −1.46 |
| | 30 | 0.932 | 8.41 | 0.00 | −0.33 |
| | 45 | 1.631 | 13.42 | 2.01 | 0.80 |
| | 60 | 5.212 | 27.33 | 1.75 | 1.91 |
| 0.85 | 0 | 0.832 | 7.52 | −0.43 | −2.09 |
| | 30 | 0.946 | 8.53 | 1.63 | −0.70 |
| | 45 | 1.728 | 13.99 | 1.97 | 1.51 |
| | 60 | 5.408 | 27.87 | 0.37 | 2.86 |
| 0.8 | 0 | 0.809 | 7.31 | 1.13 | −2.48 |
| | 30 | 0.987 | 8.88 | 1.74 | 0.04 |
| | 45 | 1.830 | 14.57 | 0.49 | 2.76 |
| | 60 | 5.544 | 28.23 | −1.05 | 3.11 |
| 0.75 | 0 | 0.812 | 7.33 | 1.25 | −1.62 |
| | 30 | 1.038 | 9.30 | 0.47 | 1.59 |
| | 45 | 1.912 | 15.02 | −0.66 | 3.32 |
| | 60 | 5.627 | 28.45 | −0.91 | 2.23 |
| 0.7 | 0 | 0.832 | 7.52 | 0.69 | 0.16 |
| | 30 | 1.100 | 9.80 | 0.56 | 2.63 |
| | 45 | 2.018 | 15.58 | 1.04 | 2.84 |
| | 60 | 5.797 | 28.90 | 1.72 | 1.29 |

As set forth in Table 32, the modeled article exhibits an average photopic reflectance of less than 1.15%, for all incidence angles within a range of from 0 degrees to 30 degrees relative to a normal of the surface of the substrate at any position along the surface of the substrate where the thickness scaling factor is within a range of from 0.70 to 1. The average photopic reflectance is less than 1.0%, for all incidence angles within a range of from 0 degrees to 10 degrees relative to a normal of the surface of the substrate at any position along the surface of the substrate where the thickness scaling factor is within a range of from 0.70 to 1. The average photopic reflectance is less than 2.1%, for all incidence angles within a range of from 0 degrees to 45 degrees relative to a normal of the surface of the substrate at any position along the surface of the substrate where the thickness scaling factor is within a range of from 0.70 to 1. The average photopic reflectance is less than 6.0%, for all incidence angles within a range of from 0 degrees to 60 degrees relative to a normal of the surface of the substrate at any position along the surface of the substrate where the thickness scaling factor is within a range of from 0.70 to 1.

The first surface percentage reflectance, color coordinates, and two surface percentage transmittance of the modeled article at a thickness scaling factor equal to 1 were calculated. The results are set forth in Tables 33-35 below. For the percentage reflectance, photopic values are reported for visible light, while particular wavelength ranges are reported within the infrared region.

TABLE 33

| $1^{st}$ surface Reflectance % average | 6° | 20° | 40° | 45° | 60° |
|---|---|---|---|---|---|
| R % (photopic, Y) | 0.97 | 0.94 | 1.22 | 1.54 | 4.86 |
| R % (840-860 nm) | 0.77 | 0.85 | 1.52 | 1.99 | 5.86 |
| R % (930-950 nm) | 1.09 | 1.30 | 2.48 | 3.16 | 7.90 |

TABLE 34

| $1^{st}$ surface Reflected Lightness and Color metrics | 6° | 20° | 40° | 45° | 60° |
|---|---|---|---|---|---|
| L* | 8.78 | 8.49 | 10.71 | 12.89 | 26.33 |
| a* | −0.63 | −1.22 | −1.48 | −0.96 | 1.06 |
| b* | −1.48 | −0.39 | 1.84 | 1.98 | 1.27 |

TABLE 35

| 2 surface Transmitted light metrics, optical coating on 1 surface only | 0° |
|---|---|
| T % (photopic, Y) | 94.99 |
| T % (840-860 nm) | 95.3 |
| T % (930-950 nm) | 95.0 |
| L* | 98.03 |
| a* | 0.00 |
| b* | 0.22 |

As Table 33 reveals, the first surface reflectance of the article for infrared electromagnetic radiation within a range of from 840 nm to 860 nm is less than 1.0%, for incidence angles of 20 degrees or less relative to a normal of the first major surface of the substrate. Further, the reflectance for that wavelength range is less than 2.0%, for incidence angles of 45 degrees or less relative to a normal of the first major surface of the substrate. For the wavelength range of from 930 nm to 950 nm, the reflectance is less than 1.4% for incidence angles of 20 degrees or less relative to a normal of the first major surface of the substrate, and less than 3.2% for incidence angles within a range of from 0 degrees to 45 degrees relative to a normal of the first major surface of the substrate. Table 34 reveals $1^{st}$ surface reflectance and color metrics for 0, 20, 40, 45 and 60 degrees.

As Table 35 reveals, the transmittance through the article at 0 degrees incidence (normal to the first major surface of the substrate) is greater than 94.9% for visible light, greater than 95.2% for infrared radiation within the wavelength range of from 840 nm to 860 nm, and greater than 94.9% for infrared radiation within the wavelength range of from 930 nm to 950 nm. Again, because transmittance was calculated as a two surface metric with the optical coating disposed on the first surface and the second surface being uncoated but having a reflectance of about 4%, the maximum possible values for transmittance as reported in Table 35 were about 96%.

It should be appreciated that in each of the above examples 1-7 that there is not necessarily a fixed relationship between the thickness scaling factor and the part surface angle since this relationship can vary based on deposition process conditions.

Figure 14A:
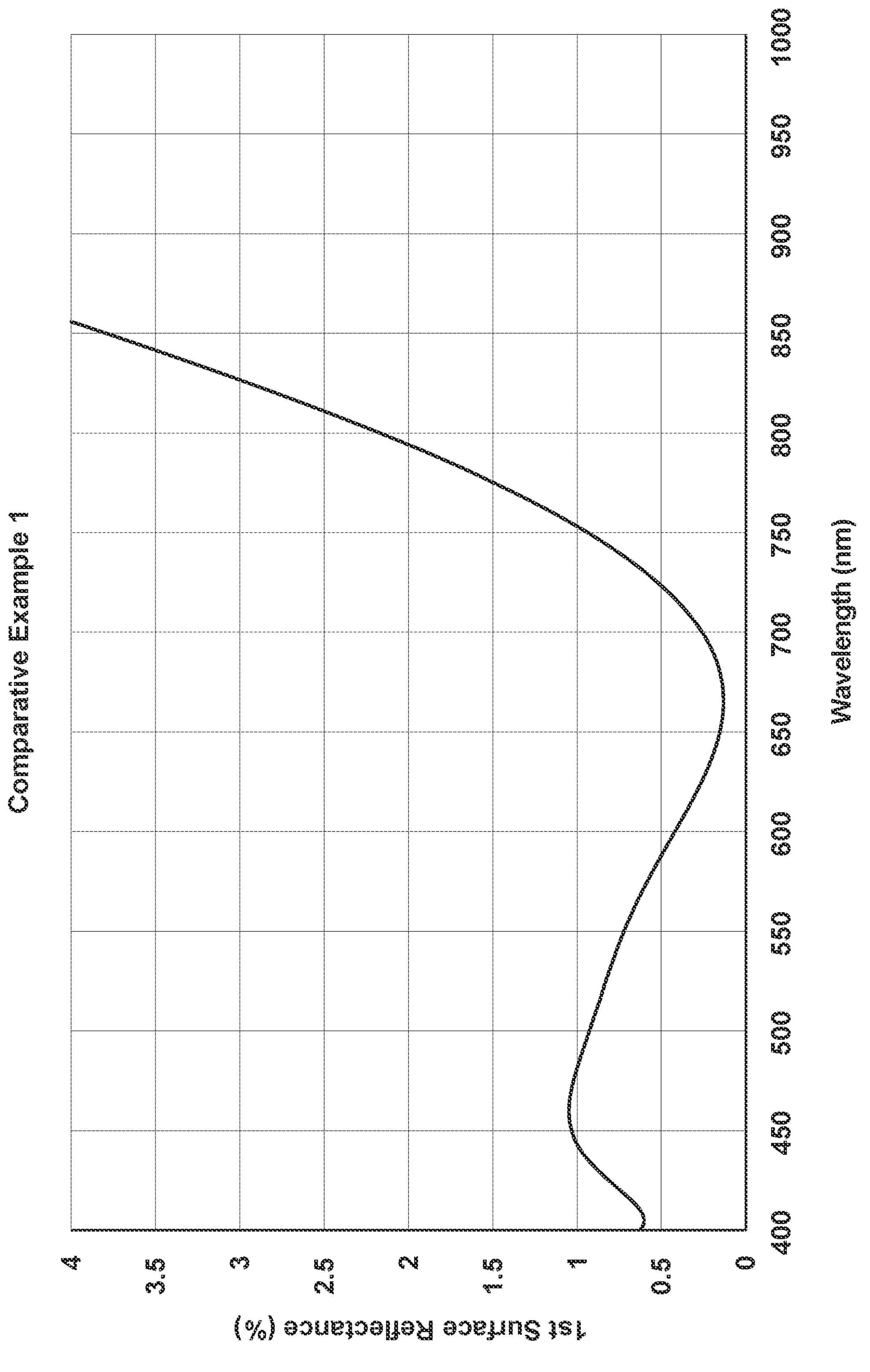
FIG. 14A, pertaining to the article of Comparative Example 1 with a five layer optical coating, is a graph that plots first surface reflectance as a function of wavelength of electromagnetic radiation, illustrating that the article (i) reflects less than 1.5% of incident electromagnetic radiation up to wavelength of only 775 nm, which is not as far into the infrared range as Examples 1-6, and (ii) reflects greater than 3% of incidence electromagnetic radiation at infrared ranges of from 840 nm to 860 nm and from 930 nm to 950 nm.

Comparative Example 1—For Comparative Example 1 (FIGS. 14A and 14B), an article was modeled with an optical coating and substrate having the attributes set forth in Table 36 below.

TABLE 36

| Component | Composition | Refractive Index | Thickness (nm) |
|---|---|---|---|
| Substrate | Glass | 1.510 | |
| $1^{st}$ Layer | $SiO_2$ | 1.465 | 25.0 |
| $2^{nd}$ Layer | $SiN_x$ | 2.043 | 14.4 |
| $3^{rd}$ Layer | $SiO_2$ | 1.465 | 37.8 |
| $4^{th}$ Layer | $SiN_x$ | 2.043 | 128.0 |
| $5^{th}$ Layer | $SiO_2$ | 1.465 | 90.4 |
| Ambient | Air | 1.0 | |
| Total Thickness | | | 295.5 |

Unlike Examples 1-4 above, which include a relatively thick first layer disposed closest to the substrate, the first layer disposed closest to the substrate for Comparative Example 1 is relatively small, at 25.0 nm. In addition, unlike Examples 1-6 above, where the layer of high refractive index material furthest from the substrate (e.g., the fourth layer of $SiN_x$) has a thickness within a range of from 140 nm to 170 nm, the layer of high refractive index material furthest from the substrate for Comparative Example 1 (e.g., the fourth layer of $SiN_x$) has a thickness of only 128.0 nm. Further, unlike Examples 1-6 above, where the high refractive index material makes up greater than 55% of the 250 nm thick portion of the total thickness of the optical coating disposed furthest from the substrate 12, the high refractive index material of Comparative Example 1 makes up only 51.2% (128.0 nm/250 nm) of the 250 nm thick portion of the total thickness of the optical coating disposed furthest from the substrate 12. Comparing to the structure of Example 7, Example 7 has more layers, a greater thickness, and a thicker first layer adjacent to the substrate (48.9 nm for Ex. 7 vs. 25.0 nm for Comp. Ex. 1) relative to Comp. Ex. 1.

In addition, the layers of the high refractive index material $SiN_x$ (i.e., the $2^{nd}$ layer and the $4^{th}$ layer) for Comparative Example 1 collectively form 48% of the total thickness of the optical coating, which is higher than the Examples 1-4 above, which range from 30.4% (Example 4) to 40.5% (Example 7).

The first surface reflectance of the modeled article as a function of wavelength of incident electromagnetic radiation was calculated. The angle of incidence was 6 degrees relative to a normal of what would be assumed to be a substantially planar portion of the substrate (e.g., the first portion as described herein). The results are set forth in the graph of FIG. 14A. As the graph illustrates, the article exhibits (i) a reflectance of less than 1% only across an entire wavelength range of from 475 nm to about 750 nm, (ii) a reflectance of less than 1.5% only across an entire wavelength range of from about 400 nm to 775 nm, and (iii) a reflectance of less than 2% only across an entire wavelength range of from about 400 nm to about 795 nm. Thus, the modeled article of Comparative Example 1 exhibits a much higher reflectance within the infrared region of electromagnetic radiation than the Examples 1-4 described above.

Figure 14B:
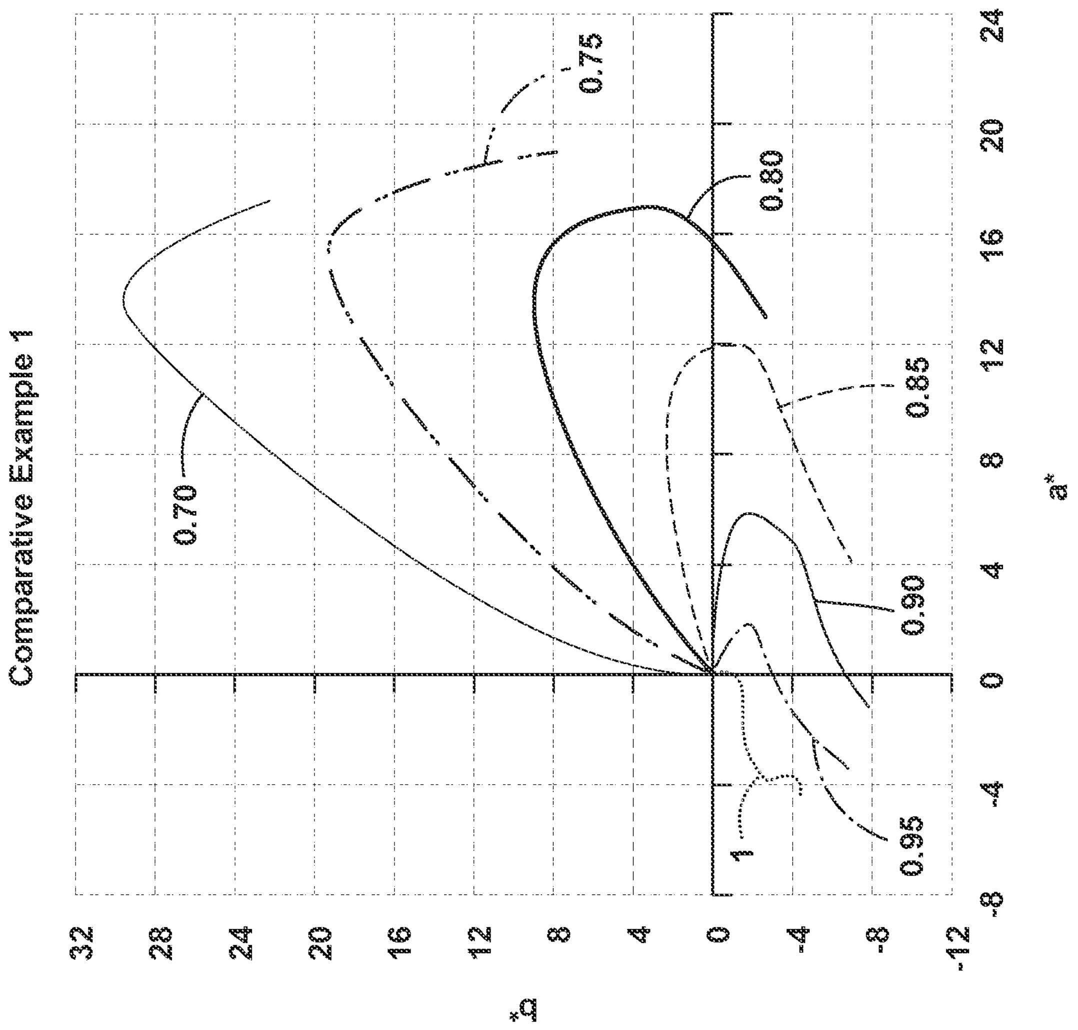
FIG. 14B, also pertaining to the article of Comparative Example 1, is a graph that plots first surface reflectance color coordinate values a* and b* as a function of viewing angle of the optical coating and thickness scaling factor, illustrating that the optical coating (i) exhibits reflected color with the a* coordinate value exceeding +8, the b* coordinate value exceeding +8, or both, at various viewing angles when the thickness scaling factor is less than or equal to 0.85.

The first surface reflected color (from a D65 illuminant) of the modeled article of Comparative Example 1 as a function of viewing angles within a range of from 0 degrees to 90 degrees relative to a normal of the substrate, and as a function of the scaling factor of the coating thickness was calculated. The results are set forth at the graph of FIG. 14B. As the graph of FIG. 14B illustrates, the color that the article of Comparative Example 1 exhibits varies to a much larger degree as a function of thickness scaling factors than the articles of Examples 1-6 above. More particularly, the article exhibits a color coordinate a* value exceeding 4 as a function of viewing angle at all thickness scaling factors less than or equal to 0.9. The article exhibits a color coordinate a* value exceeding 10 as a function of viewing angle at all thickness scaling factors less than or equal to 0.85. These high a* values are associated with noticeable red and purple colorations that are not acceptable for many consumer electronic applications. Further, the article of Comparative Example 1 exhibits a color coordinate b* value exceeding 8 as a function of viewing angle at all thickness scaling factors less than or equal to 0.80. Such high b* values are associated with noticeable yellow colorations that are not desirable for many consumer electronic applications. More particularly, as the graph of FIG. 14B illustrates, the article of Comparative Example 1 maintains first surface reflected color within a range of from −4 to about +19 for a* and from −8 to +20 for b*, for all viewing angles within a range of from 0 degrees to 90 degrees relative to a normal of the substrate, and at all thickness scaling factors from 1 down to 0.75, which again corresponds to an article surface angle range of from 0 degrees to 55 degrees.

Further, the first surface average photopic percentage reflectance and color coordinates as a function of incident light angle (for D65 illuminant) and the thickness scaling factor of the optical coating of the modeled article of Comparative Example 1 were calculated. The results are set forth in Table 37 below.

TABLE 37

| Thickness scaling factor | Light incidence angle | R % (photopic, Y) | L | a* | b* |
|---|---|---|---|---|---|
| 1 | 0 | 0.690 | 6.24 | −4.36 | −4.40 |
| | 30 | 0.674 | 6.09 | −3.68 | −3.81 |
| | 45 | 1.237 | 10.82 | −3.39 | −2.17 |
| | 60 | 4.418 | 25.01 | −1.58 | −1.49 |
| 0.95 | 0 | 0.551 | 4.98 | −3.43 | −6.79 |
| | 30 | 0.567 | 5.12 | −2.46 | −5.24 |
| | 45 | 1.159 | 10.25 | −0.68 | −3.45 |
| | 60 | 4.376 | 24.88 | 1.39 | −2.26 |
| 0.9 | 0 | 0.416 | 3.76 | −1.19 | −7.82 |
| | 30 | 0.497 | 4.49 | 1.54 | −5.61 |
| | 45 | 1.177 | 10.38 | 5.26 | −3.28 |
| | 60 | 4.555 | 25.43 | 5.69 | −1.38 |
| 0.85 | 0 | 0.353 | 3.19 | 4.05 | −6.98 |
| | 30 | 0.560 | 5.06 | 9.32 | −3.55 |
| | 45 | 1.425 | 12.12 | 11.75 | 0.32 |
| | 60 | 5.134 | 27.11 | 9.62 | 2.20 |
| 0.8 | 0 | 0.483 | 4.36 | 12.93 | −2.66 |
| | 30 | 0.900 | 8.13 | 16.90 | 3.60 |
| | 45 | 2.066 | 15.83 | 15.19 | 8.37 |
| | 60 | 6.278 | 30.10 | 11.41 | 8.57 |
| 0.75 | 0 | 0.972 | 8.76 | 18.91 | 7.86 |
| | 30 | 1.684 | 13.73 | 17.50 | 15.80 |
| | 45 | 3.248 | 21.01 | 14.87 | 19.22 |
| | 60 | 8.062 | 34.11 | 10.53 | 16.11 |
| 0.7 | 0 | 1.997 | 15.47 | 17.15 | 22.21 |
| | 30 | 3.049 | 20.24 | 14.95 | 28.30 |
| | 45 | 5.040 | 26.85 | 12.06 | 28.31 |
| | 60 | 10.417 | 38.58 | 7.80 | 21.77 |

As set forth in Table 37, the modeled article of Comparative Example 1 exhibits an average photopic reflectance of less than 1% for all incidence angles within a range of from 0 degrees to 30 degrees relative to a normal of the surface of the substrate at any position along the surface of the substrate only where the thickness scaling factor is within a range of from 0.8 to 1. The average photopic reflectance is greater than 3.0%, for all incidence angles within a range of from 0 degrees to 30 degrees relative to a normal of the surface of the substrate, and at all thickness scaling factors within a range of from 0.70 to 1. The average photopic reflectance is greater than 5.0%, for all incidence angles within a range of from 0 degrees to 45 degrees relative to a normal of the surface of the substrate, and at all thickness scaling factors within a range of from 0.70 to 1. The article exhibits an average photopic reflectance of less than 1.5%, for all incidence angles within a range of from 0 degrees to 45 degrees relative to a normal of the surface of the substrate only at thickness scaling factors within a range of from 0.85 to 1. The article exhibits an average photopic reflectance of less than 5.5% for all incidence angles within a range of from 0 degrees to 60 degrees relative to a normal of the surface of the substrate only at thickness scaling factors within a range of from 0.75 to 1. At thickness scaling factors within the range of from 0.70 to 0.75, the average photopic reflectance is greater than 1.5% for the 30 degree incidence angle relative to a normal of the surface of the substrate. At thickness scaling factors within the range of from 0.70 to 0.80, the average photopic reflectance is greater than 2% for the 45 degree incidence angle relative to a normal of the surface of the substrate, and greater than 6% for the 60 degree incidence angle relative to a normal of the surface of the substrate. Further, the article exhibits reflected color that is outside of desired ranges at thickness scaling factors less than or equal to 0.85, which corresponds to surface angles of about 40 degrees or greater.

The first surface percentage reflectance, color coordinates, and two surface percentage transmittance of the modeled article were calculated. The results are set forth in Tables 38-40 below. For the percentage reflectance, average photopic values are reported for visible light, while particular wavelength ranges are reported within the infrared region.

TABLE 38

| 1st surface Reflectance % average | 6° | 20° | 40° | 45° | 60° |
|---|---|---|---|---|---|
| R % (photopic, Y) | 0.68 | 0.65 | 0.92 | 1.24 | 4.42 |
| R % (840-860 nm) | 3.80 | 4.33 | 6.66 | 7.72 | 13.70 |
| R % (930-950 nm) | 7.04 | 7.64 | 10.14 | 11.22 | 17.03 |

TABLE 39

| 1st surface Reflected Lightness and Color metrics | 6° | 20° | 40° | 45° | 60° |
|---|---|---|---|---|---|
| L* | 6.18 | 5.83 | 8.32 | 10.82 | 25.01 |
| a* | −4.31 | −3.88 | −3.86 | −3.39 | −1.58 |
| b* | −4.41 | −4.30 | −2.81 | −2.17 | −1.49 |

TABLE 40

| 2 surface Transmitted light metrics, optical coating on 1 surface only | 0° |
|---|---|
| T % (photopic, Y) | 95.13 |
| T % (840-860 nm) | 92.43 |

TABLE 40-continued

| 2 surface Transmitted light metrics, optical coating on 1 surface only | 0° |
|---|---|
| T % (930-950 nm) | 89.45 |
| L* | 98.09 |
| a* | 0.14 |
| b* | 0.40 |

As Table 38 reveals, the reflectance of the article for infrared electromagnetic radiation within a range of from 840 nm to 860 nm is above 3.5% for incidence angles of 6 degrees or less relative to a normal of the first major surface of the substrate, which is much higher than the Examples 1-6 above. Further, the reflectance within that wavelength range rises to greater than 7.5% for incidence angles greater than about 45 degrees relative to a normal of the first major surface of the substrate, which again is much higher than the Examples 1-6 above.

For the wavelength range of from 930 nm to 950 nm, the reflectance is above 7% at all angles of incidence of 6 degrees and greater relative to a normal of the first major surface of the substrate, and above 11% at all angles of incidence of 45 degrees and greater relative to a normal of the first major surface of the substrate. Thus, the article of Comparative Example 1 is much more reflective of infrared electromagnetic radiation than the articles of Examples 1-6.

As Table 40 reveals, the transmittance through the article at 0 degrees incidence is less than 92.5% for infrared radiation within the wavelength range of from 840 nm to 860 nm, and less than 90% for infrared radiation within the wavelength range of from 930 nm to 950 nm. Thus, the article of Comparative Example 1 transmits a lesser percentage of infrared radiation than the articles of Examples 1-4 above. Again, because transmittance was calculated as a two surface metric with the optical coating disposed on the first surface and the second surface being uncoated but having a reflectance of 4%, the maximum possible values for transmittance as reported in Table 35 were 96%.

What is claimed is:

1. An article comprising:

a substrate comprising a first major surface, the first major surface comprising a first portion and a second portion, wherein a first direction that is normal to the first portion of the first major surface is not the same as a second direction that is normal to the second portion of the first major surface; and an optical coating disposed on both the first portion and the second portion of the first major surface, the optical coating forming an anti-reflective surface and comprising a total thickness, wherein the optical coating comprises a repeating period of a layer of a low refractive index material and a layer of a high refractive index material;

the total thickness of the optical coating (i) measured in the first direction normal to the first portion is less than 1000 nm, (ii) has a maximum value at the first portion, and (iii) measured in the second direction normal to the second portion is within a range of from 75% to 90% of the maximum value measured in the first direction normal to the first portion; and the optical coating disposed on the substrate exhibits a first surface reflected color characterized by International Commission on Illumination ("CIE") L*a*b* color space values of: (i) a*, from −6.0 to +4.5, and (ii) b*, from −11.0 to +6.0, under illumination from CIE standard illuminant D65, at all viewing angles within a range of from 0 degrees to 10 degrees relative to a normal of the first major surface at both (i) the first portion and (ii) the second portion, wherein the optical coating comprises:

a first layer disposed directly on the substrate, the first layer comprising (i) low refractive index material with a refractive index from 1.44 to 1.55 and (ii) a physical thickness within a range of from 150 nm to 250 nm on the first portion of the substrate;

a second layer disposed directly on the first layer, the second layer comprising (i) high refractive index material and (ii) a physical thickness within a range of from 10 nm to 25 nm on the first portion of the substrate;

a third layer disposed directly on the second layer, the third layer comprising (i) low refractive index material and (ii) a physical thickness within a range of from 30 nm to 50 nm on the first portion of the substrate;

a fourth layer disposed directly on the third layer, the fourth layer comprising (i) high refractive index material and (ii) a physical thickness within a range of from 100 nm to 250 nm on the first portion of the substrate; and a fifth layer disposed directly on the fourth layer, the fifth layer comprising (i) low refractive index material and (ii) a physical thickness within a range of from 60 nm to 150 nm on the first portion of the substrate; and further wherein, the physical thicknesses of each of the first layer through the fifth layer are less on the second portion of the substrate than on the first portion of the substrate.

2. The article of claim 1, wherein the optical coating disposed on the substrate exhibits a first surface reflected color characterized by International Commission on Illumination ("CIE") L*a*b* color space values of: (i) a*, from −6.0 to +6.0, and (ii) b*, from −12.0 to +7.5, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 75% to 90% of the maximum value of the total thickness.

3. The article of claim 1, wherein the optical coating disposed on the substrate exhibits a first surface reflected color characterized by International Commission on Illumination ("CIE") L*a*b* color space values of: (i) a*, from −6.0 to +2.0, and (ii) b*, from −12.0 to +4.0, under illumination from CIE standard illuminant D65, at all viewing angles within a range of from 0 degrees to 90 degrees relative to a normal of the first major surface at both (i) the first portion and (ii) the second portion where the total thickness of the optical coating is within a range of from 75% to 90% of the maximum value of the total thickness.

4. The article of claim 1, wherein the article at the optical coating exhibits a first surface average photopic reflectance within a range of from 0.30% to 1.60% for any incidence angle within a range of from 0 degrees to 30 degrees relative to a normal of the first major surface at both (i) the first portion and (ii) the second portion where the total thickness of the optical coating is within a range of from 75% to 90% of the maximum value of the total thickness; and the article at the optical coating exhibits a first surface average photopic reflectance within a range of from 0.30% to 2.80% for any incidence angle within a range of from 0 degrees to 45 degrees relative to a normal of the first major surface at both (i) the first portion and (ii) the second portion where the total thickness of the optical coating is such as within a range of from 75% to 90% of the maximum value of the total thickness.

5. The article of claim 1, wherein the article at the optical coating exhibits a first surface average reflectance within a range of from 0.5% to 2.0% across an entire wavelength range of from 840 nm to 860 nm for an incidence angle within a range of from 0 degrees to 6 degrees relative to a normal of the first portion; and the article at the optical coating exhibits a first surface average reflectance within a range from 1.0% to 5.0% across an entire wavelength range of from 930 nm to 950 nm for an incidence angle within a range of from 0 degrees to 6 degrees relative to a normal of the first portion.

6. The article of claim 1, wherein the article at the optical coating exhibits, for an incidence angle within a range of from 0 degrees to 6 degrees relative to a normal of the first portion, a first surface reflectance of: (i) less than 1.0% across an entire wavelength range of from 625 nm to 820 nm; (ii) less than 1.5% across an entire wavelength range of from 540 nm to 870 nm; and (iii) less than 2.0% across an entire wavelength range of from 440 nm to 900 nm.

7. The article of claim 1, wherein the article at the optical coating exhibits a first surface average photopic reflectance within a range of from 0.70% to 1.50% for an incidence angle within a range of from 0 degrees to 6 degrees relative to a normal of the first portion.

8. The article of claim 1, wherein for an incidence angle normal to the first portion, the article through the optical coating exhibits (i) a two surface average photopic transmittance within a range of from 94.5% to 95.5%, (ii) a two surface transmittance within a range of from 94.5% to 95.9% across an entire wavelength range of from 840 nm to 860 nm, and (iii) a two surface transmittance within a range of from 93.0% to 95.0% across an entire wavelength range of from 930 nm to 950 nm.

9. The article of claim 1, wherein the optical coating comprises nine or less layers;

the layer of the high refractive index material of the optical coating disposed furthest from the substrate has a thickness over the first portion of the substrate that is greater than or equal to 100 nm;

at least 50%, by thickness, of a 250 nm thick portion of the total thickness of the optical coating over the first portion that is disposed furthest from the substrate is high refractive index material; and the total thickness of the optical coating disposed over the first portion of the substrate is within a range of from 320 nm to 750 nm, wherein each layer of high refractive index material of the optical coating comprises silicon nitride or silicon oxynitride.

10. The article of claim 9, wherein the physical thickness of the layer of high refractive index material disposed furthest from the substrate, over the first portion of the first major surface, is within a range of from 140 nm to 170 nm.

11. The article of claim 9, wherein the high refractive index material has a refractive index within a range of from 1.8 to 2.5; and the number of layers of the optical coating is six or less.

12. The article of claim 1, wherein the physical thickness of the fourth layer on the first portion of the substrate is within a range of from 100 nm to 200 nm.

13. The article of claim 1, wherein the substrate comprises a glass or glass-ceramic composition, and the substrate is chemically strengthened;

the first portion of the first major surface of the substrate is substantially planar; and the second portion of the first major surface of the substrate is curved or faceted.

14. The article of claim 1, wherein:

the article at the optical coating exhibits a first surface average photopic reflectance less than 1.6% for an incidence angle within a range of from 0 degrees to 10 degrees relative to a normal of the first portion;

the article at the optical coating exhibits a first surface average reflectance within a range of from 0.2% to 1.6% across an entire wavelength range of from 840 nm to 860 nm for an incidence angle within a range of from 0 degrees to 10 degrees relative to a normal of the first portion; and the article at the optical coating exhibits a first surface average reflectance within a range from 0.2% to 2.0% across an entire wavelength range of from 930 nm to 950 nm for an incidence angle within a range of from 0 degrees to 10 degrees relative to a normal of the first portion.

15. The article of claim 1, wherein the article is of a consumer electronic product, the consumer electronic product further comprising:

a housing comprising a back surface and side surfaces; and electrical components at least partially housed within the housing, the electrical components comprising a controller, memory, a display, and a sensor, wherein the article and the housing cooperate to separate the electrical components from an environment external to the consumer electronic product, the display is configured to transmit visible electromagnetic radiation through the article to the environment external to the consumer electronic product, and the sensor is configured to detect electromagnetic radiation having a wavelength within a range of from 800 nm to 1000 nm that transmits through the article from the environment external to the sensor.

16. An article comprising:

a substrate comprising a first major surface, the first major surface comprising a first portion and a second portion, wherein a first direction that is normal to the first portion is not the same as a second direction that is normal to the second portion; and an optical coating disposed on both the first portion and the second portion of the first major surface, the optical coating forming an anti-reflective surface and comprising:

a number of layers that comprise a repeating period of a layer of a low refractive index material and a layer of a high refractive index material, wherein (i) the layer of the high refractive index material disposed furthest from the substrate has a thickness over the first portion of the first major surface that is greater than or equal to 100 nm and (ii) at least 40%, by thickness, of a 250 nm thick portion of the total thickness of the optical coating over the first portion that is disposed furthest from the substrate is high refractive index material; and a total thickness (i) measured in the first direction normal to the first portion that is within a range of from 320 nm to 1000 nm, (ii) that has a maximum value at the first portion, and (iii) measured in the second direction normal to the second portion is within a range of from 75% to 90% of the maximum value measured in the first direction normal to the first portion, wherein the optical coating comprises:

a first layer disposed directly on the substrate, the first layer comprising (i) low refractive index material with a refractive index from 1.44 to 1.55 and (ii) a physical thickness within a range of from 150 nm to 250 nm on the first portion of the substrate;

a second layer disposed directly on the first layer, the second layer comprising (i) high refractive index material and (ii) a physical thickness within a range of from 10 nm to 25 nm on the first portion of the substrate;

a third layer disposed directly on the second layer, the third layer comprising (i) low refractive index material and (ii) a physical thickness within a range of from 30 nm to 50 nm on the first portion of the substrate;

a fourth layer disposed directly on the third layer, the fourth layer comprising (i) high refractive index material and (ii) a physical thickness within a range of from 100 nm to 250 nm on the first portion of the substrate; and a fifth layer disposed directly on the fourth layer, the fifth layer comprising (i) low refractive index material and (ii) a physical thickness within a range of from 60 nm to 150 nm on the first portion of the substrate; and further wherein, the physical thicknesses of each of the first layer through the fifth layer are less on the second portion of the substrate than on the first portion of the substrate.

17. The article of claim 16, wherein the optical coating comprises nine or less layers;

at least 50%, by thickness, of a 250 nm thick portion of the total thickness of the optical coating over the first portion that is disposed furthest from the substrate is high refractive index material; and the total thickness of the optical coating disposed over the first portion of the substrate is within a range of from 320 nm to 750 nm, wherein each layer of high refractive index material of the optical coating comprises silicon nitride or silicon oxynitride.

18. An article comprising:

a substrate comprising a first major surface, the first major surface comprising a first portion and a second portion, wherein a first direction that is normal to the first portion of the first major surface is not the same as a second direction that is normal to the second portion of the first major surface; and an optical coating disposed on both the first portion and the second portion of the first major surface, the optical coating forming an anti-reflective surface and comprising a total thickness, wherein the optical coating comprises a repeating period of a layer of a low refractive index material and a layer of a high refractive index material;

the total thickness of the optical coating (i) measured in the first direction normal to the first portion is less than or equal to 800 nm, (ii) has a maximum value at the first portion, and (iii) measured in the second direction normal to the second portion is within a range of from 75% to 90% of the maximum value measured in the first direction normal to the first portion;

the article at the optical coating exhibits a first surface average reflectance within a range of from 0.5% to 2.0% across an entire wavelength range of from 840 nm to 860 nm for an incidence angle within a range of from 0 degrees to 6 degrees relative to a normal of the first portion; and the article at the optical coating exhibits a first surface average reflectance within a range from 1.0% to 5.0% across an entire wavelength range of from 930 nm to 950 nm for an incidence angle within a range of from 0 degrees to 6 degrees relative to a normal of the first portion;

wherein, the article at the optical coating exhibits a maximum hardness within in a range of from 8.5 GPa to 15 GPa, wherein the optical coating comprises:

a first layer disposed directly on the substrate, the first layer comprising (i) low refractive index material with a refractive index from 1.44 to 1.55 and (ii) a physical thickness within a range of from 150 nm to 250 nm on the first portion of the substrate;

a second layer disposed directly on the first layer, the second layer comprising (i) high refractive index material and (ii) a physical thickness within a range of from 10 nm to 25 nm on the first portion of the substrate;

a third layer disposed directly on the second layer, the third layer comprising (i) low refractive index material and (ii) a physical thickness within a range of from 30 nm to 50 nm on the first portion of the substrate;

a fourth layer disposed directly on the third layer, the fourth layer comprising (i) high refractive index material and (ii) a physical thickness within a range of from 100 nm to 250 nm on the first portion of the substrate; and a fifth layer disposed directly on the fourth layer, the fifth layer comprising (i) low refractive index material and (ii) a physical thickness within a range of from 60 nm to 150 nm on the first portion of the substrate; and further wherein, the physical thicknesses of each of the first layer through the fifth layer are less on the second portion of the substrate than on the first portion of the substrate.

19. The article of claim 18, wherein the optical coating comprises nine or less layers;

the layer of the high refractive index material of the optical coating disposed furthest from the substrate has a thickness over the first portion of the substrate that is greater than or equal to 100 nm;

at least 50%, by thickness, of a 250 nm thick portion of the total thickness of the optical coating over the first portion that is disposed furthest from the substrate is high refractive index material; and the total thickness of the optical coating disposed over the first portion of the substrate is within a range of from 320 nm to 750 nm, wherein each layer of high refractive index material of the optical coating comprises silicon nitride or silicon oxynitride.

20. An article comprising:

a substrate comprising a first major surface, the first major surface comprising a first portion and a second portion, wherein a first direction that is normal to the first portion of the first major surface is not the same as a second direction that is normal to the second portion of the first major surface; and an optical coating disposed on both the first portion and the second portion of the first major surface, the optical coating forming an anti-reflective surface and comprising a total thickness, wherein the optical coating comprises a repeating period of a layer of a low refractive index material and a layer of a high refractive index material;

the total thickness of the optical coating (i) measured in the first direction normal to the first portion is less than or equal to 800 nm, (ii) has a maximum value at the first portion, and (iii) measured in the second direction normal to the second portion is within a range of from 75% to 90% of the maximum value measured in the first direction normal to the first portion;

the article at the optical coating exhibits a first surface average photopic reflectance less than 1.6% for an incidence angle within a range of from 0 degrees to 10 degrees relative to a normal of the first portion; and the article at the optical coating exhibits a first surface average reflectance within a range of from 0.2% to 1.6% across an entire wavelength range of from 840 nm to 860 nm for an incidence angle within a range of from 0 degrees to 10 degrees relative to a normal of the first portion; and the article at the optical coating exhibits a first surface average reflectance within a range from 0.2% to 2.0% across an entire wavelength range of from 930 nm to 950 nm for an incidence angle within a range of from 0 degrees to 10 degrees relative to a normal of the first portion;

wherein, the article at the optical coating exhibits a maximum hardness within in a range of from 8.5 GPa to 15 GPa, wherein the optical coating comprises:

a first layer disposed directly on the substrate, the first layer comprising (i) low refractive index material with a refractive index from 1.44 to 1.55 and (ii) a physical thickness within a range of from 150 nm to 250 nm on the first portion of the substrate;

a second layer disposed directly on the first layer, the second layer comprising (i) high refractive index material and (ii) a physical thickness within a range of from 10 nm to 25 nm on the first portion of the substrate;

a third layer disposed directly on the second layer, the third layer comprising (i) low refractive index material and (ii) a physical thickness within a range of from 30 nm to 50 nm on the first portion of the substrate;

a fourth layer disposed directly on the third layer, the fourth layer comprising (i) high refractive index material and (ii) a physical thickness within a range of from 100 nm to 250 nm on the first portion of the substrate; and a fifth layer disposed directly on the fourth layer, the fifth layer comprising (i) low refractive index material and (ii) a physical thickness within a range of from 60 nm to 150 nm on the first portion of the substrate; and further wherein, the physical thicknesses of each of the first layer through the fifth layer are less on the second portion of the substrate than on the first portion of the substrate.

21. The article of claim 20, wherein the optical coating comprises nine or less layers;

the layer of the high refractive index material of the optical coating disposed furthest from the substrate has a thickness over the first portion of the substrate that is greater than or equal to 100 nm;

at least 50%, by thickness, of a 250 nm thick portion of the total thickness of the optical coating over the first portion that is disposed furthest from the substrate is high refractive index material; and the total thickness of the optical coating disposed over the first portion of the substrate is within a range of from 320 nm to 750 nm, wherein each layer of high refractive index material of the optical coating comprises silicon nitride or silicon oxynitride.

* * * * *